US009008852B2

(12) United States Patent
Forbes, Jr.

(10) Patent No.: US 9,008,852 B2
(45) Date of Patent: *Apr. 14, 2015

(54) SYSTEM, METHOD, AND APPARATUS FOR ELECTRIC POWER GRID AND NETWORK MANAGEMENT OF GRID ELEMENTS

(71) Applicant: Causam Energy, Inc., Raleigh, NC (US)

(72) Inventor: Joseph W. Forbes, Jr., Raleigh, NC (US)

(73) Assignee: Causam Energy, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,570

(22) Filed: May 29, 2014

(65) Prior Publication Data
US 2014/0277786 A1    Sep. 18, 2014

Related U.S. Application Data

(60) Division of application No. 14/050,328, filed on Oct. 9, 2013, now Pat. No. 8,761,952, which is a continuation of application No. 13/757,772, filed on Feb. 2, 2013, now Pat. No. 8,588,991, which is a continuation of application No. 13/563,535, filed on Jul. 31, 2012.

(51) Int. Cl.
*G05D 3/12* (2006.01)
*G05D 5/00* (2006.01)
*G05D 9/00* (2006.01)
(Continued)

(52) U.S. Cl.
CPC .............. *G05B 13/02* (2013.01); *G05B 19/02* (2013.01); *H02J 3/14* (2013.01); *H02J 13/0062* (2013.01)

(58) Field of Classification Search
CPC ........................................................ G05B 13/02
USPC .......... 700/22, 286–297; 713/300; 340/870.02
See application file for complete search history.

(56) References Cited

U.S. PATENT DOCUMENTS 5,973,481 A    10/1999   Thompson et al.
6,018,690 A     1/2000   Saito et al.
(Continued)

OTHER PUBLICATIONS

Byers J. Risk Management and Monetizing the Commodity Storage Option. Natural Gas & Electricity [serial online]. Jul. 2005; 21 (12):1-8. Available from: Business Source Complete, Ipswich, MA.
(Continued)

*Primary Examiner* — Mohammad Ali
*Assistant Examiner* — Ziaul Karim
(74) *Attorney, Agent, or Firm* — Triangle Patents, PLLC

(57) ABSTRACT

Systems, methods, and apparatus embodiments for electric power grid and network registration and management of active grid elements. Grid elements are transformed into active grid elements following initial registration of each grid element with the system, preferably through network-based communication between the grid elements and a coordinator, either in coordination with or outside of an IP-based communications network router. A multiplicity of active grid elements function in the grid for supply capacity, supply and/or load curtailment as supply or capacity. Also preferably, messaging is managed through a network by a Coordinator using IP messaging for communication with the grid elements, with the energy management system (EMS), and with the utilities, market participants, and/or grid operators.

30 Claims, 36 Drawing Sheets

(51) Int. Cl.

| | | |
|---|---|---|
| G05D 11/00 | (2006.01) | |
| G05D 17/00 | (2006.01) | |
| G05B 11/01 | (2006.01) | |
| G06F 1/00 | (2006.01) | |
| G08B 23/00 | (2006.01) | |
| G05B 13/02 | (2006.01) | |
| G05B 19/02 | (2006.01) | |
| H02J 3/14 | (2006.01) | |
| H02J 13/00 | (2006.01) | |

(56) References Cited

U.S. PATENT DOCUMENTS

| | | | |
|---|---|---|---|
| 6,154,859 A | 11/2000 | Norizuki et al. | |
| 6,366,217 B1 | 4/2002 | Cunningham et al. | |
| 6,583,521 B1 | 6/2003 | Lagod et al. | |
| 6,633,823 B2 | 10/2003 | Bartone et al. | |
| 6,747,368 B2 | 6/2004 | Jarrett, Jr. | |
| 6,891,838 B1 | 5/2005 | Petite et al. | |
| 6,961,641 B1 | 11/2005 | Forth et al. | |
| 7,141,321 B2 | 11/2006 | Mcarthur et al. | |
| 7,142,949 B2 | 11/2006 | Brewster et al. | |
| 7,233,843 B2 | 6/2007 | Budhraja et al. | |
| 7,289,887 B2 | 10/2007 | Rodgers | |
| 7,565,227 B2 | 7/2009 | Richard et al. | |
| 7,715,951 B2 | 5/2010 | Forbes, Jr. et al. | |
| 8,010,812 B2 | 8/2011 | Forbes, Jr. et al. | |
| 8,032,233 B2 | 10/2011 | Forbes, Jr. et al. | |
| 8,145,361 B2 | 3/2012 | Forbes, Jr. et al. | |
| 8,260,470 B2 | 9/2012 | Forbes, Jr. et al. | |
| 8,307,225 B2 | 11/2012 | Forbes, Jr. et al. | |
| 8,315,717 B2 | 11/2012 | Forbes, Jr. et al. | |
| 8,359,124 B2 | 1/2013 | Zhou et al. | |
| 8,364,609 B2 | 1/2013 | Ozog | |
| 8,417,569 B2 | 4/2013 | Gross | |
| 8,457,802 B1 | 6/2013 | Steven et al. | |
| 8,473,111 B1 | 6/2013 | Shankar et al. | |
| 8,571,930 B1 | 10/2013 | Galperin | |
| 8,583,520 B1 | 11/2013 | Forbes, Jr. | |
| 8,588,991 B1 | 11/2013 | Forbes, Jr. | |
| 2002/0019758 A1 | 2/2002 | Scarpelli | |
| 2002/0019802 A1 | 2/2002 | Malme et al. | |
| 2002/0161648 A1 | 10/2002 | Mason et al. | |
| 2002/0198629 A1 | 12/2002 | Ellis | |
| 2003/0149937 A1 | 8/2003 | Mcelfresh et al. | |
| 2003/0176952 A1 | 9/2003 | Collins et al. | |
| 2004/0024483 A1 | 2/2004 | Holcombe | |
| 2004/0044571 A1 | 3/2004 | Bronnimann et al. | |
| 2004/0107025 A1 | 6/2004 | Ransom et al. | |
| 2004/0225514 A1 | 11/2004 | Greenshields et al. | |
| 2005/0021397 A1 | 1/2005 | Cui et al. | |
| 2005/0065742 A1 | 3/2005 | Rodgers | |
| 2005/0080772 A1 | 4/2005 | Bem | |
| 2005/0096857 A1 | 5/2005 | Hunter | |
| 2005/0096979 A1 | 5/2005 | Koningstein | |
| 2005/0097204 A1 | 5/2005 | Horowitz et al. | |
| 2005/0127680 A1 | 6/2005 | Lof et al. | |
| 2005/0138432 A1* | 6/2005 | Ransom et al. | 713/201 |
| 2005/0240315 A1 | 10/2005 | Booth et al. | |
| 2005/0288954 A1 | 12/2005 | Mccarthy et al. | |
| 2006/0020596 A1 | 1/2006 | Liu et al. | |
| 2006/0069616 A1 | 3/2006 | Bau | |
| 2006/0190354 A1 | 8/2006 | Meisel et al. | |
| 2006/0212350 A1 | 9/2006 | Ellis et al. | |
| 2006/0224615 A1 | 10/2006 | Korn et al. | |
| 2006/0276938 A1 | 12/2006 | Miller | |
| 2006/0282328 A1 | 12/2006 | Gerace et al. | |
| 2007/0038563 A1 | 2/2007 | Ryzerski | |
| 2007/0150353 A1 | 6/2007 | Krassner et al. | |
| 2007/0156621 A1 | 7/2007 | Wright et al. | |
| 2007/0156887 A1 | 7/2007 | Wright et al. | |
| 2007/0174114 A1 | 7/2007 | Bigby et al. | |
| 2007/0192333 A1 | 8/2007 | Ali | |
| 2007/0214118 A1 | 9/2007 | Schoen et al. | |
| 2007/0214132 A1 | 9/2007 | Grubb et al. | |
| 2007/0260540 A1 | 11/2007 | Chau et al. | |
| 2008/0010212 A1 | 1/2008 | Moore | |
| 2008/0040223 A1 | 2/2008 | Bridges et al. | |
| 2008/0104026 A1 | 5/2008 | Koran | |
| 2008/0109387 A1 | 5/2008 | Deaver et al. | |
| 2008/0154801 A1 | 6/2008 | Fein et al. | |
| 2008/0177678 A1 | 7/2008 | Di Martini et al. | |
| 2008/0195462 A1 | 8/2008 | Magdon-Ismail et al. | |
| 2008/0249832 A1 | 10/2008 | Richardson et al. | |
| 2008/0263025 A1 | 10/2008 | Koran | |
| 2008/0270223 A1 | 10/2008 | Collins et al. | |
| 2008/0281473 A1 | 11/2008 | Pitt | |
| 2008/0306824 A1 | 12/2008 | Parkinson | |
| 2008/0306830 A1 | 12/2008 | Lasa et al. | |
| 2008/0319893 A1 | 12/2008 | Mashinsky et al. | |
| 2009/0012996 A1 | 1/2009 | Gupta et al. | |
| 2009/0024718 A1 | 1/2009 | Anagnostopoulos et al. | |
| 2009/0040029 A1* | 2/2009 | Bridges et al. | 340/310.11 |
| 2009/0045804 A1 | 2/2009 | Durling et al. | |
| 2009/0055031 A1 | 2/2009 | Slota et al. | |
| 2009/0088907 A1 | 4/2009 | Lewis et al. | |
| 2009/0112701 A1 | 4/2009 | Turpin et al. | |
| 2009/0124241 A1 | 5/2009 | Krishnaswamy et al. | |
| 2009/0125462 A1 | 5/2009 | Krishnaswamy et al. | |
| 2009/0138362 A1 | 5/2009 | Schroedl et al. | |
| 2009/0187344 A1 | 7/2009 | Brancaccio et al. | |
| 2009/0198384 A1 | 8/2009 | Ahn | |
| 2009/0228335 A1 | 9/2009 | Niyogi et al. | |
| 2009/0240677 A1 | 9/2009 | Parekh et al. | |
| 2009/0281673 A1 | 11/2009 | Taft | |
| 2009/0281674 A1* | 11/2009 | Taft | 700/286 |
| 2009/0319415 A1 | 12/2009 | Stoilov et al. | |
| 2010/0076835 A1 | 3/2010 | Silverman | |
| 2010/0106641 A1 | 4/2010 | Chassin et al. | |
| 2010/0138452 A1 | 6/2010 | Henkin et al. | |
| 2010/0169175 A1 | 7/2010 | Koran | |
| 2010/0217452 A1 | 8/2010 | Mccord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0218108 A1 | 8/2010 | Crabtree et al. | |
| 2010/0274407 A1 | 10/2010 | Creed | |
| 2010/0293045 A1 | 11/2010 | Burns et al. | |
| 2010/0306033 A1 | 12/2010 | Oved et al. | |
| 2010/0332373 A1 | 12/2010 | Crabtree et al. | |
| 2011/0025556 A1 | 2/2011 | Bridges et al. | |
| 2011/0055036 A1 | 3/2011 | Helfan | |
| 2011/0060474 A1 | 3/2011 | Schmiegel et al. | |
| 2011/0080044 A1 | 4/2011 | Schmiegel | |
| 2011/0106729 A1 | 5/2011 | Billingsley et al. | |
| 2011/0115302 A1 | 5/2011 | Slota et al. | |
| 2011/0133655 A1 | 6/2011 | Recker et al. | |
| 2011/0145061 A1 | 6/2011 | Spurr et al. | |
| 2011/0161250 A1* | 6/2011 | Koeppel et al. | 705/412 |
| 2011/0172841 A1 | 7/2011 | Forbes, Jr. | |
| 2011/0185303 A1 | 7/2011 | Katagi et al. | |
| 2011/0196546 A1 | 8/2011 | Muller et al. | |
| 2011/0204717 A1 | 8/2011 | Shaffer | |
| 2011/0208366 A1 | 8/2011 | Taft | |
| 2011/0235656 A1 | 9/2011 | Pigeon | |
| 2011/0251730 A1 | 10/2011 | Pitt | |
| 2011/0257809 A1 | 10/2011 | Forbes, Jr. et al. | |
| 2011/0258022 A1 | 10/2011 | Forbes, Jr. et al. | |
| 2012/0196482 A1 | 8/2012 | Stokoe | |
| 2012/0205977 A1 | 8/2012 | Shin et al. | |
| 2012/0221162 A1 | 8/2012 | Forbes, Jr. | |
| 2012/0223840 A1 | 9/2012 | Guymon et al. | |
| 2012/0232816 A1 | 9/2012 | Oh et al. | |
| 2012/0259760 A1 | 10/2012 | Sgouridis et al. | |
| 2012/0296799 A1 | 11/2012 | Playfair et al. | |
| 2012/0316697 A1 | 12/2012 | Boardman et al. | |
| 2013/0035802 A1 | 2/2013 | Khaitan et al. | |
| 2013/0079939 A1 | 3/2013 | Darden, II et al. | |
| 2013/0079943 A1 | 3/2013 | Darden, II et al. | |
| 2013/0144768 A1 | 6/2013 | Rohrbaugh | |

(56) References Cited

U.S. PATENT DOCUMENTS

2014/0025486 A1 1/2014 Bigby et al.
2014/0039703 A1 2/2014 Forbes, Jr.

OTHER PUBLICATIONS

Galvin Electricity Institute: Frequently Asked Questions, printed Apr. 23, 2014, same page available through archive.org unchanged Mar. 1, 2008.

GE Digital Energy Residential Electrical Metering Brochure. Sep. 12, 2012. https://web.archive.org/web/20120912144353/http://www.gedigitalenergry.com/products/brochures/1210-Family.pdf.

Illinois General Assembly: Public Act 094-0977, Effective Date: Jun. 30, 2006.

Kamat R., Oren S. Two-Settlement Systems for Electricity Markets under Network Uncertainty and Market Power Journal of Regulatory Economics [serial online]. Jan. 2004; 25(1):5-37.

Lobsenz G. Maryland Regulators Reject BG&E Smart Grid Proposal. Energy Daily [serial online]. Jun. 23, 2010; (118):3. Available from: Business Source Complete, Ipswich, MA.

* cited by examiner

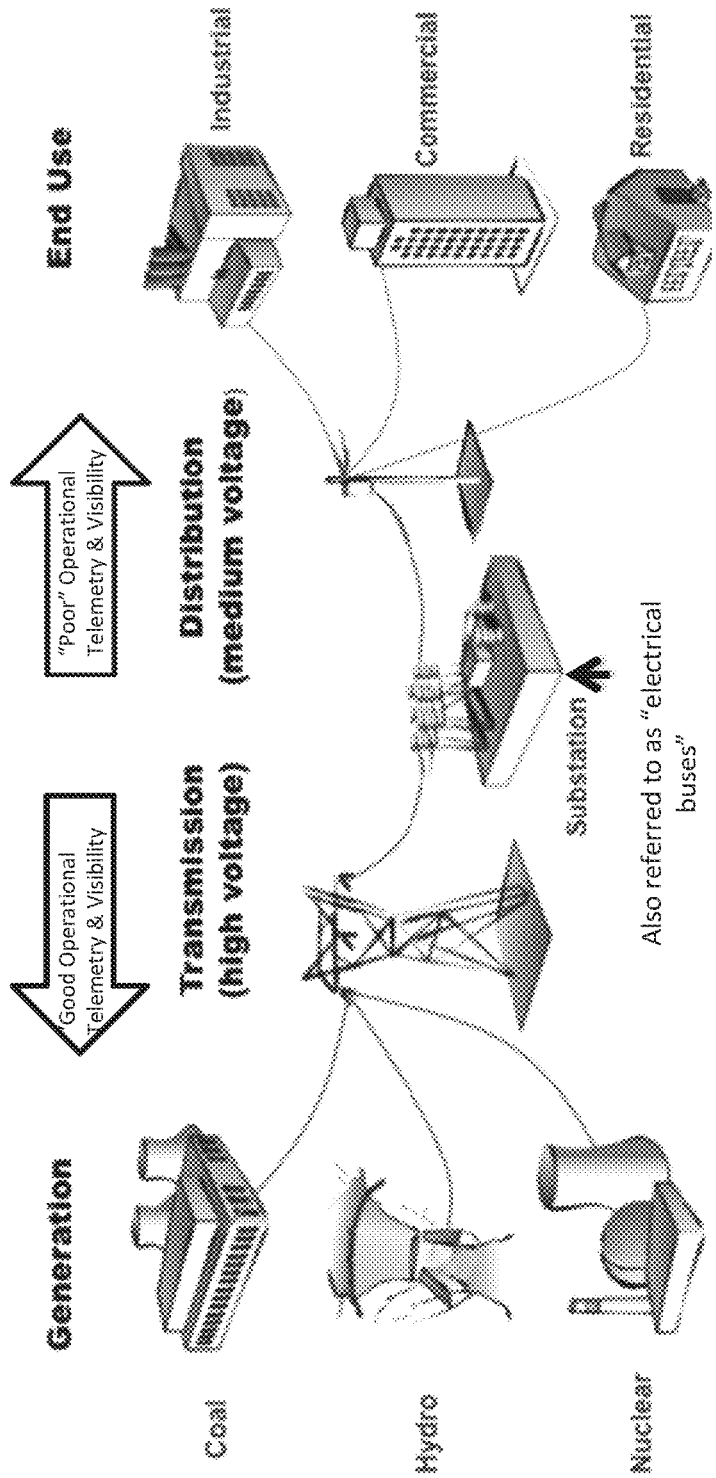
Prior Art Fig. 13

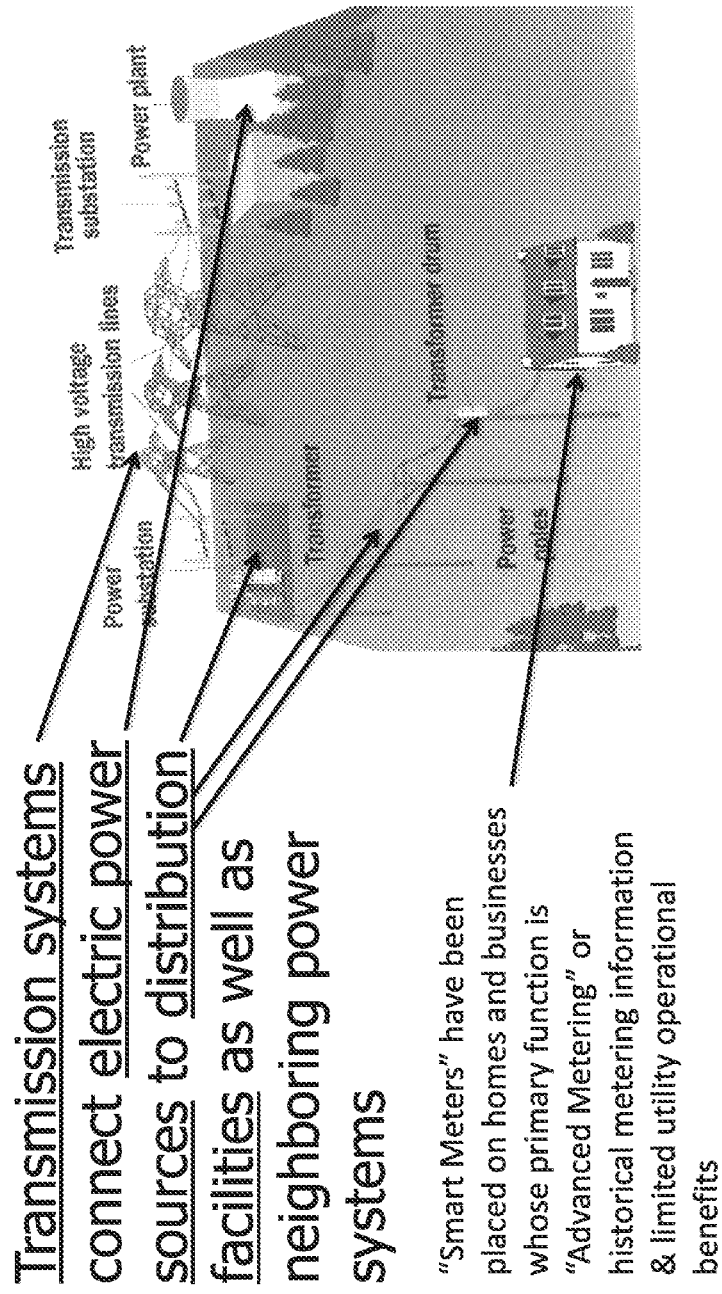
Prior Art Fig. 14

Prior Art Fig. 15

Electricity cannot be stored cost effectively, so supply (generation) must be produced exactly when needed to meet customer demand and to avoid system failure

- Level in —lake must be kept constant at all times...this simply put is grid stability that includes and focuses on frequency (60 Hz) & voltage stability.
- Laws of physics dictate that power flows on path of least resistance, not

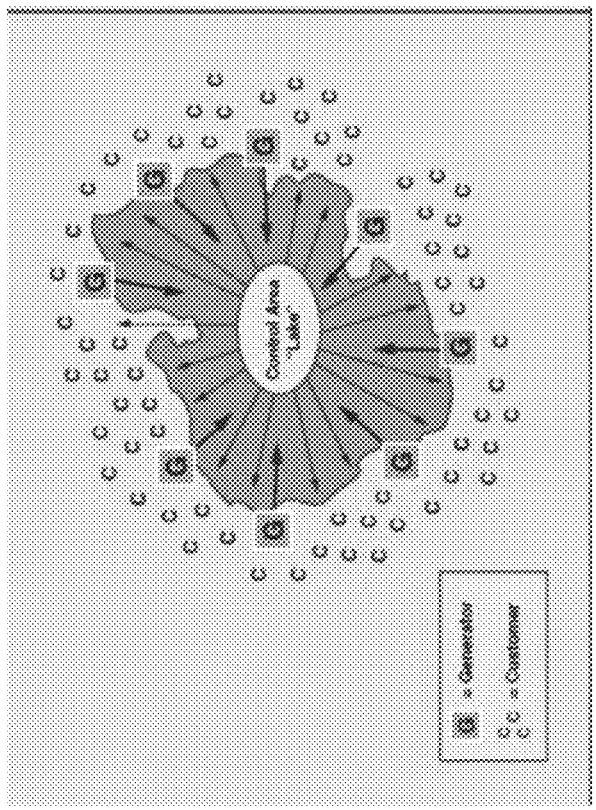

Prior Art Fig. 16
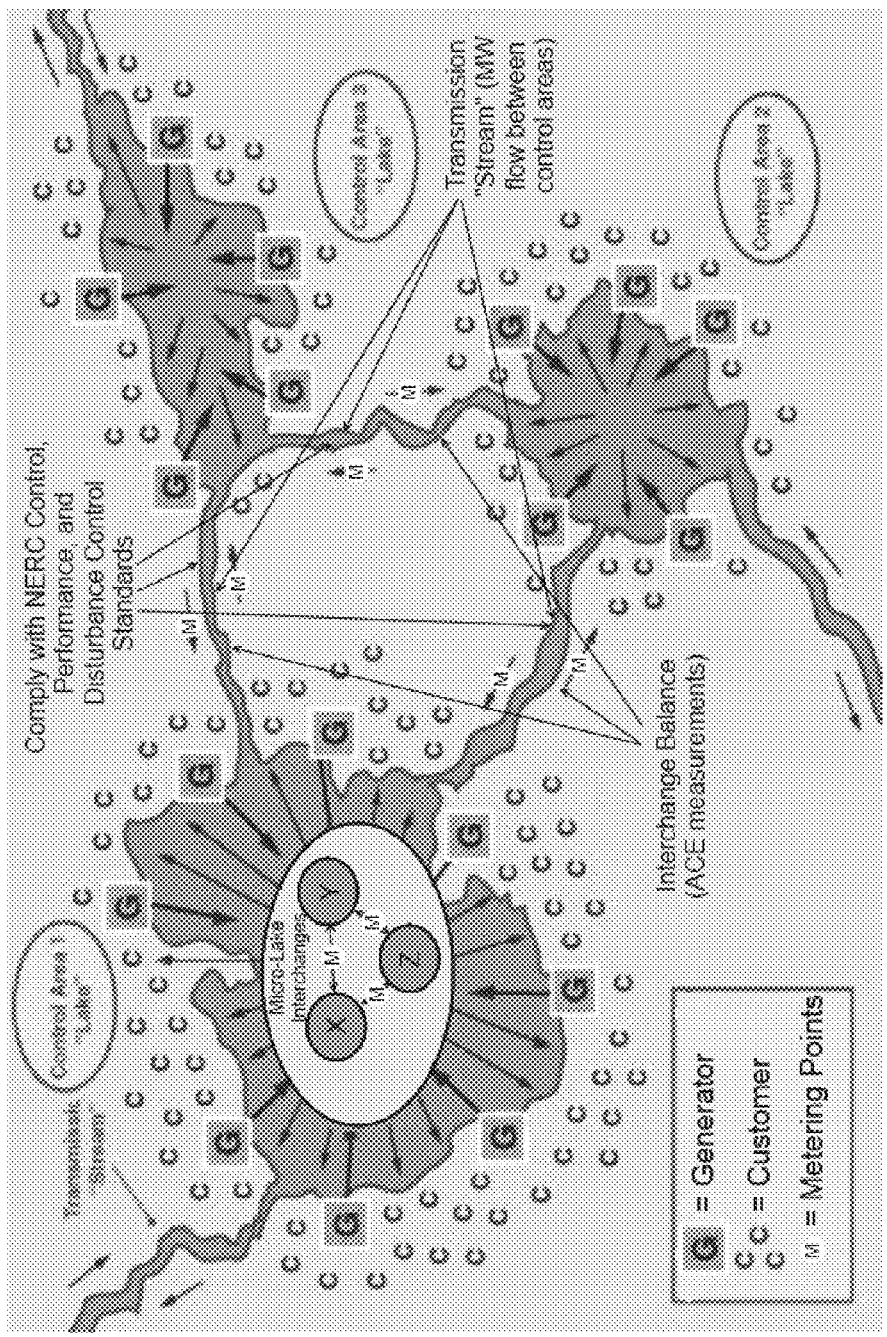
Balance Transmission Flows, Metering Interconnections, and Complying with NERC Standards

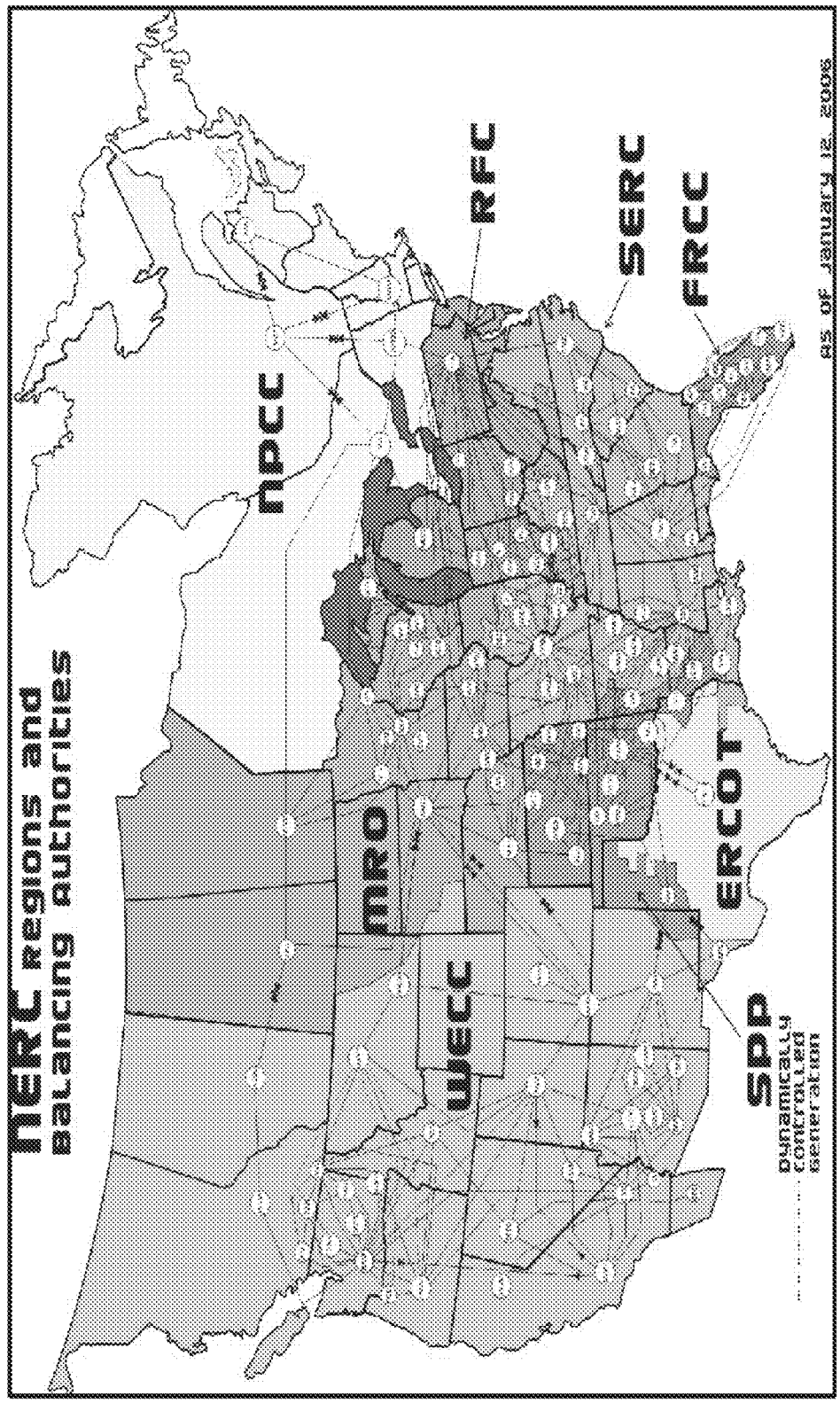
Prior Art Fig. 17

EXAMPLE ADJUSTABLE PARAMETERS:

Consumer-adjustable parameters:

- Pool pump
    - Time of day, day of week, month
- HVAC and water heater temperatures:
    - Seasonal temperature range
    - Away temperatures
    - Time of day temperature schedule
    - Day of week temperature schedule
    - Month of year temperature range
    - Location temperature set points (upstairs, downstairs)
- Windows (open/close)
- Fans
- Dryer – time of use
- Dishwasher – time of use

- Commercial building control
    - Chiller
    - Cooling tower
    - Discharge air
    - Boiler
    - Hydronic
    - Built-up air handling unit Supplier-adjustable parameters:
- Pool pump – time of use
- Water heater – temperature range
- Thermostat – temperature range
- HVAC – temperature range
- Dryer – time of use
- Dishwasher – time of use Rates
- Supplied by one of market participants per spec
- Example: pricing and time of use dependent upon grid stability and usage

FIG. 28

SYSTEM, METHOD, AND APPARATUS FOR ELECTRIC POWER GRID AND NETWORK MANAGEMENT OF GRID ELEMENTS

CROSS-REFERENCES TO RELATED APPLICATIONS

This application is a division of application Ser. No. 14/050,328, filed Oct. 9, 2013, which is a continuation of application Ser. No. 13/757,772, filed Feb. 2, 2013, which is a continuation of application Ser. No. 13/563,535, filed Jul. 31, 2012, each of which is incorporated herein by reference in their entirety.

BACKGROUND OF THE INVENTION

1. Field of the Invention

The present invention relates generally to the field of electrical power management systems, and more particularly, to systems, methods, and apparatus embodiments for electric power grid and network registration and management of grid elements.

2. Description of Related Art

Generally, electric power management systems for an electric power grid are known. However, most prior art systems and methods apply to normal grid management, macro (large) generation subsystems, transmission subsystems for transporting high voltage power bulk power to distributions systems where it is sent to end customers. Prior art to control power load curves include load curtailment where controls managing the system are used to deactivate or reduce power supplied to predetermined service points from the grid. In addition advances in macro-generation and a transformation from Coal based generation to gas based generation has led to new (large) gas fired turbines and their associated subsystems to manage introduction of supply to the grid, but not particularly operable to smaller distributed supply sources or methods or technologies introduce a new elements to the grid wherein those elements are immediately identified, tracked, and managed within the overall electric grid system for meeting the needs and/or requirements of an energy management system (EMS) and/or grid governing authority.

In particular, relevant prior art is known for the management of traditional large scale energy supply and technologies associated with transmission, distribution and consumption of electricity in the power system. Collecting, transmitting, storing, and analyzing information associated with a variety of devices associated with the electric power grid is also known in the art.

By way of example, relevant prior art documents include the following:

U.S. Pat. No. 7,502,698 filed Jul. 5, 2005 by inventors Uenou et al., issued Mar. 10, 2009, and assigned on the face of the issued patent document to IP Power Systems Corp. for Power consumption measuring device and power control system, describes a single phase, 3-wire watthour meter that measures power consumption, alters a contract capacity, controls the stop/start of power supply/distribution, and updates programs from a higher level control apparatus, including a central processing unit, a storing means, a communicating means, and interfaces; the device measures the detailed behavior of a power consumption by totaling a power consumption every 30 minutes (and a clocking process for clocking a standard time and for collecting data within that time), interlocks with a gas leakage detector and a fire alarm, controls opening/closing of rain doors and the operation/stop of Internet home electric appliances, and enables low-cost communication by means of dynamic IP address based communication.

U.S. Pat. No. 5,560,022 for Power management coordinator system and interface, describes a power management system and interface providing a flexible and uniform protocol for controlling power management within a computer system including various software layers and add-in components; a programmable power policy manager, which allows user to define a performance/economy setting for the system that is communicated to all registered devices so that dwell and decay times are set by the device; and a programmable event sequencer, which maintains an event notification sequence and control sequence for power events; a programmable power budgeter that maintains and allocates power on a request basis for system elements; a programmable thermal budgeter that maintains and allocates energy based on thermal considerations; and a computer system including a bus for communicating address and data information, a central processor couple to the bus for executing instructions and processing data, and memory coupled to the bus for containing information, and a power management coordinator that includes a power management core for communication of power management information with system devices within the computer system under a uniform power management protocol, wherein particular devices are add-in devices requiring power management, and one of the devices provides programmable dwell time and decay time periods for power management of the add-in devices, wherein power events are generated by clients and broadcast by power management core to power management clients, including a power event sequencer for maintaining a particular sequence of communication about the power events.

U.S. Pat. No. 8,095,233 filed Oct. 10, 2006 by inventors Shankar et al., issued Jan. 10, 2012 and assigned on the face of the issued patent to American Grid, Inc., for Interconnected premises equipment for energy management, describing a system for facilitating direct monitoring and control of energy-consuming appliances, in real time, using automatic programmatic control and a plurality of human interfacing including local display and control, email, web browser, text messaging, and integrated voice response, and describing a monitoring and control coordinator that provides centralized coordination of functions and one or more communicating appliance interfaces that interact with energy consuming appliances that are interconnected via wired and wireless communication networks and protocols, wherein the system allows a user to regulate energy consumption of a premises for heating and air conditioning systems, including a premises control communication gateway in communication with the monitoring and control coordinator.

U.S. Pat. No. 6,301,528 field Aug. 15, 2000 by inventors Bertram et al., issued Oct. 9, 2001, assigned on the face of the patent document to Robert Bosch GmbH, describes a method and an arrangement for controlling electric consumers in a vehicle that are suggested with a control structure provided for consumers, the control structure including at least a high-ranking consumer management that receives requests from the consumers with respect to consumer power individually or as sums; the control structure including a coordinator for the vehicle electrical system and power generation therefor, and for receiving the sum of the requested consumer power from the consumer management; the vehicle electric system adjusting the requested electric power via orders to the vehicle electrical system components and the consumer management taking the generated electrical power via control of the consumers.

US Patent Application Publication No. 20070067132 for Method and apparatus for routing data streams among intelligent electronic devices, disclosing an intelligent electronic device (IED) for protection, monitoring, controlling, metering, or automation of lines in an electrical power system, wherein the IED is adapted to communicated with a variety of other IEDs, including a communication configuration setting that is configured to allow communication with one of the other IEDs; and further including an input element in communication with the communication configuration setting, whereupon a signal from the input element selects a particular communication configuration setting therein, allowing for the communication with other IEDs. Also, including a data stream management device for routing data streams among IEDs associated with the electrical power system, wherein the data streams are substantially unaltered from sent and received forms, and an IED associated with the data stream management device and adapted to communicate with the other IEDs, wherein assertion of an input element selects a particular communication configuration setting.

U.S. Pat. No. 7,609,158 filed Oct. 26, 2006 issued Oct. 27, 2009 for inventors Banting et al., and assigned on the face of the patent document to Cooper Technologies Co., describes a communications network for an electrical power distribution system, the network communicating monitoring signals and control signals for a network of electrical circuits, the network including a sensor node with a sensor device configured to detect an operating condition of the transmission or distribution systems, a sensor communication node corresponding to the sensor device, and configured to transmit a first wireless signal corresponding to the detected operating condition of transmission/distribution, a control communication node separately provided from the sensor communication node, configured to receive the first wireless signal and transmit a second wireless signal corresponding to the first wireless signal, a gateway device in communication with the control communication node and receiving the second wireless signal, and wherein the sensed electrical signals are broadcast.

U.S. Pat. No. 8,060,259 field Jun. 15, 2007 for inventors Budhraja et al., issued Nov. 15, 2011 and assigned on the face of the patent document to Electric Power Group, LLC, (also see US Patent Application Pub. No. 20100100250) for Wide area, real time monitoring and visualization system, describes a real-time performance monitoring system for monitoring an electrical power grid, including grid portions having control areas, and monitoring of reliability metrics, generations metrics, transmission metrics, suppliers metrics, grid infrastructure security metrics, and markets metrics for the electric power grid, wherein the metrics are stored in a database, and visualization of the metrics is displayed on a computer having a monitor.

US Patent Application Pub. No. 20090119039 filed Nov. 7, 2007 by inventors Banister et al., published May 7, 2009 and assigned on the face to SPROUTLETS, INC., describes an electrical power metering system including a plurality of gated power receptacles, each of them being configured to selectively provide electrical power in response to receiving a wireless signal, and further including a service application configured to receive a request to provide electrical power for one of the receptacles, the request including an identifier that designates the receptacle at which power is requested. A local host application executable on a computing device is configured to send wireless signals via a coordinator module to the receptacle to provide power in response to receiving a communication from the service application that includes the identifier.

In the area of managing supply of energy to the grid, detailed attachment modeling is required; also, due to the requirements that any amount of supply, even micro-scale supply, must comply with standards applicable to full scale utilities or macro-generation supply, this compliance is difficult and expensive. However, there are relevant prior art documents relating to management electric power grids in the field of the present invention.

By way of example, consider the following US patent and US patent application Publication documents:

U.S. Pat. No. 5,560,022 issued Sep. 24, 1996, filed Jul. 19, 1994 by inventors Dunstand, et al., and assigned on the face of the document to Intel Corporation, for Power management coordinator system and interface.

U.S. Pat. No. 6,301,528 issued Oct. 9, 2001, filed Aug. 15, 2000 by inventors Bertram et al., and assigned on the face of the patent to Robert Bosch GmbH for Method and device for controlling electric consumers in a motor vehicle.

U.S. Pat. No. 7,502,698 issued Mar. 10, 2009, filed Jul. 5, 2005 by inventors Uenou et al., and assigned on the face of the patent to IP Power Systems Corp., for Power consumption measuring device and power control system.

U.S. Pat. No. 8,095,233 issued Jan. 10, 2012, filed Oct. 10, 2006 by inventors Shankar et al., and assigned on the face to American Grid, Inc., for Interconnected premises equipment for energy management.

US Patent Application Publication No. 20070067132 published Mar. 22, 2007 and filed Sep. 19, 2006 by inventors Tziouvaras et al., for Method and apparatus for routing data streams among intelligent electronic devices.

US Patent Application Publication No. 20080040479 filed Aug. 9, 2007 by inventors Bridge, et al. and assigned on the face of the publication to V2Green, Inc. for Connection locator in a power aggregation system for distributed electric resources, discloses a method to obtain the physical location of an electric device, such as an electric vehicle, and transforming the physical location into an electric network location, and further including receiving a unique identifier associated with a device in a physical location. See also related publications WO2008073477, U.S. Pat. Application No.'s 20110025556, 20090043519, 20090200988, 20090063680, 20080040296, 20080040223, 20080039979, 20080040295, and 20080052145.

International Patent Application No. WO2011079235 filed Dec. 22, 2010 and published Jun. 30, 2011 by inventor Williams and assigned on the face of the document to Interactive Grid Solutions, LLC for Distributed energy sources system, describes an energy management system that includes distributed energy sources (for example a wind turbine) that communicate with consumer devices and electric utilities, wherein a CPU is in communication with the distributed energy source and is operable to control the flow of energy produced by the distributed energy source.

International Patent Application No. WO2012015508 filed May 2, 2011 and published Feb. 2, 2012 by inventor Cherian, et al. and assigned on the face of the document to Spriae, Inc. for Dynamic distributed power grid control system, describes a control system for a distributed power grid that includes a simulation module operative to directly interface with the operational control of the distributed energy resources (DER) to develop and dynamically modify the control inputs of the distributed power grid, and wherein the distributed control module can simulate control response characteristics of the DER to determine control methodology by conducting decentralized and distributed simulation. See also WO201200879, WO2012015507, US Pat. Application No.'s 20110106321, 20120029720, and 20120029897.

International Patent Application No. WO2012058114 filed Oct. 21, 2011 and published May 3, 2012 by inventor Alatrash, et al. and assigned on the face of the document to Petra Solar, Inc. for Method and system facilitating control strategy for power electronics interface of distributed generations resources, discloses a method and system for implementing a control strategy for distributed generation (DG) units, wherein the DG unit behaves similarly to a synchronous generator.

U.S. Pat. No. 7,949,435 filed Aug. 9, 2007 and issued May 24, 2011 to inventors Pollack, et al. and assigned to V2Green, Inc. on the face of the document entitled User interface and user control in a power aggregation system for distributed electric resources, describes a method and operator interface for users or owners of a distributed power resource, such as an electric vehicle, which connects to a power grid, wherein the user or owner controls a degree of participation of the electric resource power aggregation via the user interface, and further including an energy pricing preference, a vehicle state-of-charge, and a predicted amount of time until the electric resource disconnects from a power grid. See also US Patent Application Pub. Nos. 20090043520 and 20080039989.

US Patent Application Pub. No. 20110282511 filed Mar. 26, 2011 and published Nov. 17, 2011 to inventor Unetich and assigned on the face of the document to Smart Power Devices Ltd for Prediction, communication and control system for distributed power generation and usage, describes an apparatus for obtaining, interpreting and communicating a user reliable and predictive information relevant to the price of electricity service at a prospective time.

U.S. Pat. No. 7,844,370 filed Aug. 9, 2007 and issued Nov. 30, 2010 by inventors Pollack et al. and assigned on the face of the document to GridPoint, Inc. for Scheduling and control in a power aggregation system for distributed electric resources, describes systems and methods for a power aggregation system in which a server establishes individual Internet connections to numerous electric resources intermittently connect to the power grid, such as electric vehicles, wherein the service optimizes power flows to suit the needs of each resource and each resource owner, while aggregating flows across numerous resources to suit the needs of the power grid, and further including inputting constraints of individual electric resources into the system, which signals them to provide power to take power from a grid.

US Patent Application Pub. No. 20090187284 filed Jan. 7, 2009 and published Jul. 23, 2009 by inventors Kreiss et al. for System and method for providing power distribution system information, describes a computer program product for processing utility data of a power grid, including a datamart comprised of physical databases storing utility data applications comprising an automated meter application configured to process power usage data from a plurality of automated meters, a power outage application configured to identify a location of a power outage, and a power restoration application configured to identify a location of a power restoration. See also US Pat. Application No.'s 20110270550, 20110270457, and 20110270454.

The increased awareness of the impact of carbon emissions from the use of fossil fueled electric generation combined with the increased cost of producing base load, intermediate, and peak power during high load conditions has increased the need for alternative solutions utilizing new power technologies as a mechanism to defer, or in some cases eliminate, the need for the deployment of additional generation capacity by electric utilities, generating utilities, or distributing utilities or any grid operator or market participant whose primary function is to facilitate the production, distribution, operation and sale of electricity to individual consumers. Existing electric utilities are pressed for methods to defer or eliminate the need for construction of fossil-based or macro large scale electricity generation while dealing with the need to integrate new sources of generation such as renewable energy sources or distributed energy resources whose production and integration into the electric grid is problematic.

Today, a patchwork of systems exist to implement demand response load management programs, dispatch of macrogeneration, and energy management and control for both supplying "negawatts", supply and grid stability to the electric utility grid whereby various radio subsystems in various frequency bands utilize "one-way" transmit only methods of communication or most recently deployed a plurality of proprietary two-way methods of communications with electric customers or their load consuming device and measurement instruments including, by way of example, "smart meters." In addition, macro generation is controlled and dispatched from centralized control centers either from utilities, Independent Power Producers (IPPs) or other Market Participants that utilize point to point primarily "Plain old telephone service" POTS dedicated low bit rate modems or nailed time division multiplex (TDM) circuits such as T-1s that supply analog telemetry to Energy Management Systems or in some cases physical dispatch to a human operator to "turn on" generation assets in response to grid supply needs or grid stress and high load conditions. Under traditional Demand Response technologies used for peak shaving, utilities or other market participants install radio frequency (RF)-controlled relay switches typically attached to a customer's air conditioner, water heater, or pool pumps, or other individual load consuming devices. A blanket command is sent out to a specific geographic area whereby all receiving units within the range of the transmitting station (e.g., typically a paging network) are turned off during peak hours at the election of the power utility. After a period of time when the peak load has passed, a second blanket command is sent to turn on those devices that have been turned off. This "load shifting" has the undesired effect of occasionally causing "secondary peaks" and generally requires consumer incentives for adoption.

Most recent improvements that follow the same concepts are RF networks that utilize a plurality of mesh based, nonstandard communications protocols that utilize IEEE 802.15.4 or its derivatives, or "ZigBee" protocol end devices to include load control switches, programmable thermostats that have pre-determined set points for accomplishing the "off" or "cut" or reduce command simultaneously or preloaded in the resident memory of the end device. These networks are sometimes referred to in the industry as "Home Area Networks" or (HANs). In these elementary and mostly proprietary solutions, a programmable thermostat(s) or building control systems (PCTs) move the set point of the HVAC (or affect another inductive or resistive device) or remove a resistive device from the electric grid thus accomplishing the same "load shifting" effect previously described. All of these methods require and rely on statistical estimations and modeling for measuring their effectiveness and use historical information that are transmitted via these same "smart meters" to provide after-the-fact evidence that an individual device or consumer complied with the demand response event. Protocols that are employed for these methods include "Smart Energy Profiles Versions 1 & 2" and its derivatives to provide utilities and their consumers an attempt at standardization amongst various OEMs of PCTs, switching, and control systems through a plurality of protocols and interfaces. These methods remain crude and do not include real time, measurement, verification, settlement and other attributes necessary to have their Demand Response effects utilized for effective Operating Reserves with the exception of limited programs for "Emergency" Capacity Programs as evidenced by programs such as the Energy Reliability Council of Texas' (ERCOT's) Emergency Interruptible Load Service (EILS). Furthermore, for effective settlement and control of mobile storage devices such as Electric Vehicles, these early "Smart Grid" devices are not capable of meeting the requirements of Federal Energy Regulatory Commission (FERC), North American Electric Reliability Corp. (NERC) or other standards setting bodies such as the National Institute of Science & Technology (NIST) Smart Grid Roadmap.

While telemetering has been used for the express purpose of reporting energy usage, no cost effective techniques exist for calculating power consumption, carbon gas emissions, sulfur dioxide ($SO_2$) gas emissions, and/or nitrogen dioxide ($NO_2$) emissions, and reporting the state of a particular device under the control of a two-way positive control load management device or other combinations of load control previously described. In particular, one way wireless communications devices have been utilized to de-activate electrical appliances, such as heating, ventilation, and air-conditioning (HVAC) units, water heaters, pool pumps, and lighting or any inductive or resistive device that is eligible as determined by a utility or market participant for deactivation, from an existing electrical supplier or distribution partner's network. These devices have typically been used in combination with wireless paging receivers or FM radio carrier data modulation, or a plurality of 2-way proprietary radio frequency (RF) technologies that receive "on" or "off" commands from a paging transmitter or transmitter device. Additionally, the one-way devices are typically connected to a serving electrical supplier's control center via landline trunks, or in some cases, microwave transmission to the paging transmitter. The customer subscribing to the load management program receives a discount or some other form of economic incentive, including direct payments for allowing the serving electrical supplier (utility), retail electric provider or any other market participant to connect to their electrical appliances with a one-way load control switch and deactivate those appliances during high energy usage periods. This technique of demand response is used mostly by utilities or any market participant for "peak shifting" where the electric load demand curve is moved from a peak period to a less generation intensive time interval and are favored by rate-based utilities who earn capital returns of new power plants or any capital deployed to operate their electric grids that are approved by corresponding Public Utility Commissions. These methods are previous art and generally no conservation of energy is measured. In many instances, secondary peak periods occur when the cumulative effect of all the resistive and inductive devices are released from the "off" state simultaneously causing an unintended secondary peak event.

While one-way devices are generally industry standard and relatively inexpensive to implement, the lack of a return path from the receiver, combined with the lack of information on the actual devices connected to the receiver, make the system highly inefficient and largely inaccurate for measuring the actual load shed to the serving utility or compliant with measurement and verification for presenting a balancing authority or independent system operator for operating reserves. While the differential current draw is measurable on the serving electric utility's transmission lines and at electrical bus or substations, the actual load shed is approximate and the location of the load deferral is approximated at the control center of the serving utility or other statistical methods are considered to approximate the individual or cumulative effect on an electric utility grid. The aforementioned "two-way" systems are simultaneously defective in addressing real time and near real time telemetry needs that produce generation equivalencies that are now recognized by FERC Orders such as FERC 745 where measurable, verifiable Demand Response "negawatts", defined as real time or near real time load curtailment where measurement and verification can be provided within the tolerances required under such programs presented by FERC, NERC, or the governing body that regulate grid operations. The aforementioned "smart meters" in combination with their data collection systems commonly referred to as "Advanced Metering Infrastructure" generally collect interval data from meters in HISTORICAL fashion and report this information to the utility, market participant or grid operator AFTER the utility or grid operator has sent notice for curtailment events or "control events" to initiate due to high grid stress that includes lack of adequate operating reserves to meet demand, frequency variations, voltage support and any other grid stabilizing needs as identified by the utility or grid operator and published and governed by FERC, NERC, or other applicable regulations.

One exemplary telemetering system is disclosed in U.S. Pat. No. 6,891,838 B1. This patent describes details surrounding a mesh communication of residential devices and the reporting and control of those devices, via WANs, to a computer. The stated design goal in this patent is to facilitate the "monitoring and control of residential automation systems." This patent does not explain how a serving utility or customer could actively control the devices to facilitate the reduction of electricity. In contrast, this patent discloses techniques that could be utilized for reporting information that is being displayed by the serving utility's power meter (as do many other prior applications in the field of telemetering).

An additional exemplary telemetering system is disclosed in U.S. Patent Application Publication No. 2005/0240315 A1. The primary purpose of this published application is not to control utility loads, but rather "to provide an improved interactive system for remotely monitoring and establishing the status of a customer utility load." A stated goal of this publication is to reduce the amount of time utility field personnel have to spend in the field servicing meters by utilizing wireless technology.

Another prior art system is disclosed in U.S. Pat. No. 6,633,823, which describes, in detail, the use of proprietary hardware to remotely turn off or turn on devices within a building or residence. While initially this prior art generally describes a system that would assist utilities in managing power load control, the prior art does not contain the unique attributes necessary to construct or implement a complete system. In particular, this patent is deficient in the areas of security, load accuracy of a controlled device, and methods disclosing how a customer utilizing applicable hardware might set parameters, such as temperature set points, customer preference information, and customer overrides, within an intelligent algorithm that reduces the probability of customer dissatisfaction and service cancellation or churn.

Attempts have been made to bridge the gap between one-way, un-verified power load control management systems and positive control verified power load control management systems. However, until recently, technologies such as smart breakers and command relay devices were not considered for use in residential and commercial environments primarily due to high cost entry points, lack of customer demand, and the cost of power generation relative to the cost of implementing load control or their ability to meet the measurement, telemetry, verification requirements of the grid operator or ISO. Furthermore, submetering technology within the smart breaker, load control device, command relay devices or building control systems have not existed in the prior art.

One such gap-bridging attempt is described in U.S. Patent Application Publication No. US 2005/0065742 A1. This publication discloses a system and method for remote power management using IEEE 802 based wireless communication links. The system described in this publication includes an on-premise processor (OPP), a host processor, and an end device. The host processor issues power management commands to the OPP, which in turn relays the commands to the end devices under its management. While the disclosed OPP does provide some intelligence in the power management system, it does not determine which end devices under its control to turn-off during a power reduction event, instead relying on the host device to make such decision. For example, during a power reduction event, the end device must request permission from the OPP to turn on. The request is forwarded to the host device for a decision on the request in view of the parameters of the on-going power reduction event. The system also contemplates periodic reading of utility meters by the OPP and storage of the read data in the OPP for later communication to the host device. The OPP may also include intelligence to indicate to the host processor that the OPP will not be able to comply with a power reduction command due to the inability of a load under the OPP's control to be deactivated. However, neither the host processor nor the OPP determine which loads to remove in order to satisfy a power reduction command from an electric utility, particularly when the command is issued by one of several utilities under the management of a power management system. Further, neither the host processor nor the OPP tracks or accumulates power saved and/or carbon credits earned on a per customer or per utility basis for future use by the utility and/or customer. Still further, the system of this publication lacks a reward incentive program to customers based on their participation in the power management system. Still further, the system described in this publication does not provide for secure communications between the host processor and the OPP, and/or between the OPP and the end device. As a result, the described system lacks many features that may be necessary for a commercially viable implementation.

Customer profiles are often used by systems for a variety of reasons. One reason is to promote customer loyalty. This involves keeping information about not only the customer, but about the customer's actions as well. This may include information about what the customer owns (i.e., which devices), how they are used, when they are used, etc. By mining this data, a company can more effectively select rewards for customers that give those customers an incentive for continuing to do business with the company. This is often described as customer relationship management (CRM).

Customer profile data is also useful for obtaining feedback about how a product is used. In software systems, this is often used to improve the customer/user experience or as an aid to testing. Deployed systems that have customer profiling communicate customer actions and other data back to the development organization. That data is analyzed to understand the customer's experience. Lessons learned from that analysis is used to make modifications to the deployed system, resulting in an improved system.

Customer profile data may also be used in marketing and sales. For instance, a retail business may collect a variety of information about a customer, including what customers look at on-line and inside "brick-and-mortar" stores. This data is mined to try to identify customer product preferences and shopping habits. Such data helps sales and marketing determine how to present products of probable interest to the customer, resulting in greater sales.

However, the collection of customer profile information by power utilities, retail electric providers or any other market participant that sells retail electric commodity to end customers (residential or commercial) has been limited to customer account information of gross electrical consumption and inferential information about how power is being consumed but requires customers to take their own actions. Because power utilities, REPs, market participants typically are unable to collect detailed data about what is happening inside a customer's home or business, including patterns of energy consumption by device, there has been little opportunity to create extensive customer profiles.

Thus, none of the prior art systems, methods, or devices provide complete solutions for power management including grid elements and network management including messaging over communication networks and energy management over the electric power grid network, including the grid elements that are attached to the electric grid, and further management of these for creating operating reserves for utilities and market participants. Therefore, a need exists for a system and method for active power load management that is optionally capable of tracking power savings for the individual customer as well as the electric utility and any other market participant to thereby overcome the shortcomings of the prior art.

SUMMARY OF THE INVENTION

The present invention provides systems, methods, and apparatus embodiments for electric power grid and network registration and management of grid elements. Accordingly, grid elements are transformed into active grid elements following initial registration of each grid element with the system, preferably through network-based communication between the grid elements and a Coordinator. Also preferably, messaging is managed through a network by a Coordinator using IP messaging for communication with the grid elements, with the energy management system (EMS), and with the utilities, market participants, and/or grid operators. Furthermore, the Coordinator according to the present invention is operable for receiving information communicated from grid elements, authenticating, and registering grid elements, thereby transforming them into active grid elements that are operable for predetermined functionality within the electric power grid or for downloading to the grid element its intended function after initial registration. The Coordinator is further operable for communicating data with a database, and to provide an overall assessment of electric grid operations (normal or emergency) including but not limited to energy flows within the system, grid stabilization information, operating reserves, capacity, settlement, and combinations thereof.

Following registration, the multiplicity of active grid elements function in the grid for control, reporting, status, grid operations (normal or emergency), any source of macro supply capacity/energy, supply as distributed energy resources from a plurality of methods, supply/energy through storage devices, and/or load curtailment as supply or capacity, wherein the registered, active grid elements and their corresponding activities and information associated with those activities deliver electric supply to the electric grid, curtail load sources, control active or passive grid elements used in the operation of the grid, or any other device that is attached to the electric grid for its normal or emergency functions and are tracked and managed in accordance with regulations and standards governing the electric power grid.

Accordingly, one aspect of the present invention is to provide system for electric power grid network management including: at least one grid element constructed and configured for electrical connection and network-based communication with a server and/or a processor operatively coupled with memory; wherein the grid element is transformed into at least one active grid element after initial connection with the server and/or the processor operatively coupled with the memory via a network, preferably a communications network, wherein the registration is preferably automatic and/or autonomous.

Another aspect of the present invention is to provide an apparatus for smart electric power grid communication including: a grid element constructed and configured for electrical connection and network-based communication with a server associated with an electric power grid; wherein the grid element is transformed into an active grid element after initial connection with the electric power grid, and preferably wherein each active grid element has a unique identifier. By way of example and not limitation, at least one of the grid elements is a control device that operates, programs and updates select load consuming device(s) associated with the electric power grid (including but not limited to control systems, thermostats, controllers, anything that controls the device, switch gear, large control systems operating from a control center or box with interface to a large control system; transformation process includes whatever control systems are attached to the electric devices, their databases, tables, memory, Asics, firmware. Software, operating systems or combinations thereof and/or grid elements).

Also, in one aspect of the present invention a method for electric power grid network management is provided, including the steps of: providing at least one grid element constructed and configured for electrical connection and network-based communication with a server; the at least one grid element communicating a message to the server, wherein the message is preferably standards-based or proprietary; the at least one grid element automatically into at least one active grid element for functioning actively within the electric power grid, wherein the at least one grid element making an initial connection with the server via a network. Also, methods may further include the step of: connecting the at least one grid element to an electric power grid. Also preferably, the at least one grid element is operable for sending and/or receiving a message via communication with the server via a network, and the message is routed by a coordinator to the server. Messages are sent via the network and include Internet Protocol (IP)-based messaging.

These and other aspects of the present invention will become apparent to those skilled in the art after a reading of the following description of the preferred embodiment when considered with the drawings, as they support the claimed invention.

BRIEF DESCRIPTION OF THE DRAWINGS

PRIOR ART FIG. 13 is a schematic diagram illustrating generation, transmission, distribution, and load consumption within a traditional electric power grid.

PRIOR ART FIG. 14 is a schematic diagram illustrating traditional transmission systems that connect to electric power sources to distribution facilities, including smart metering and advanced metering.

PRIOR ART FIG. 15 is a schematic diagram illustrating power generation or supply balancing with customer demand for electric power within a grid.

PRIOR ART FIG. 16 is a schematic diagram illustrating balancing areas and their interaction for power generation or supply balancing with customer demand for electric power within a grid.

PRIOR ART FIG. 17 is a schematic diagram illustrating regions and balancing areas and their interaction for power generation or supply balancing with customer demand for electric power within a grid.

FIG. 28 is a table of consumer-adjustable parameters as examples for systems and methods components according to the present invention.

DETAILED DESCRIPTION OF THE PRESENT INVENTION

Figure 1:
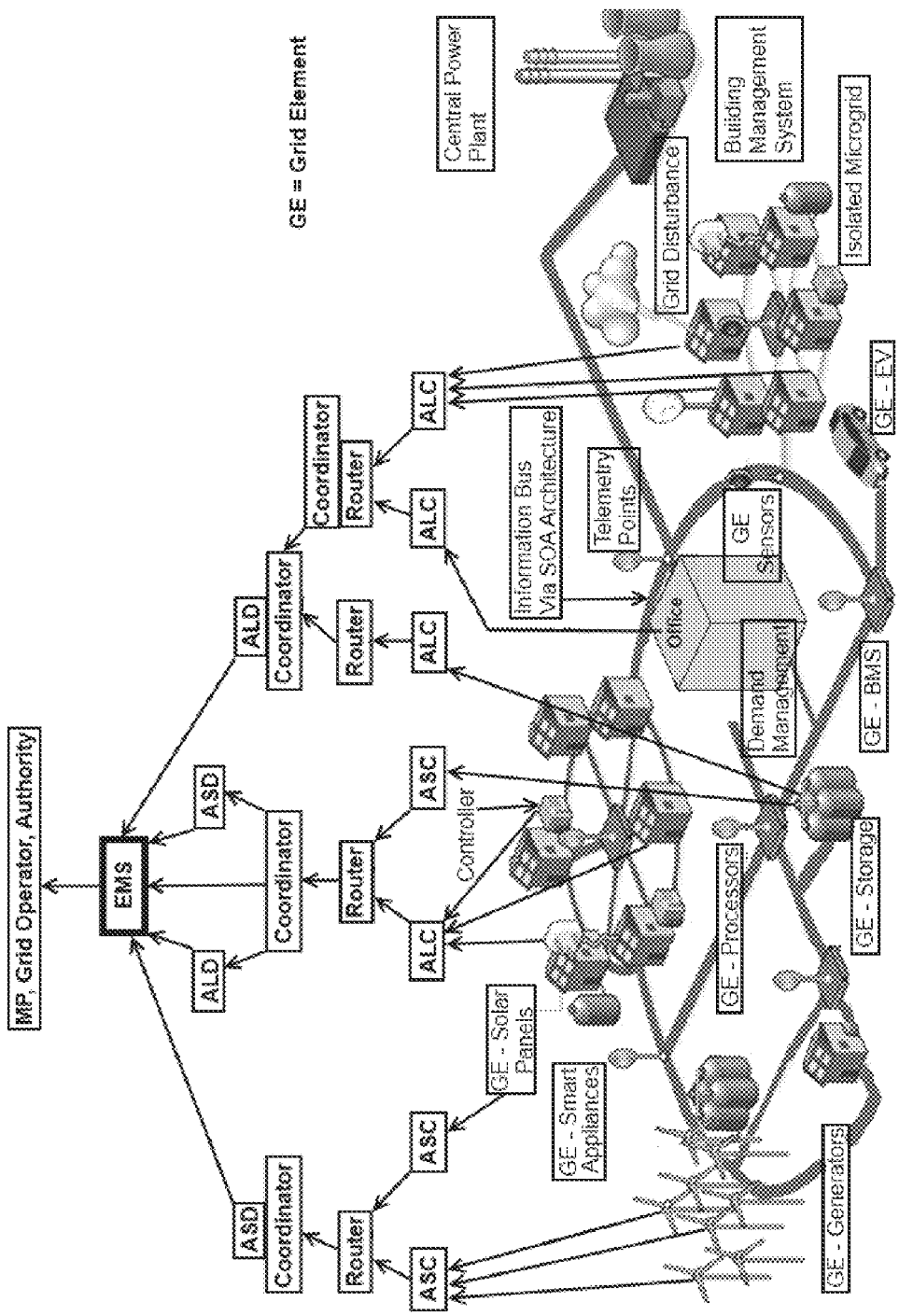
FIG. 1 is a schematic diagram illustrating a coordinator and grid elements within a system and methods of the present invention.

The present invention provides systems, methods, and apparatus embodiments for electric power grid and network registration and management of grid elements. Accordingly, grid elements are transformed into active grid elements following initial registration of each grid element with the system, preferably through network-based communication between the grid elements and a Coordinator. Also preferably, messaging is managed through a network by a Coordinator using IP-based messaging for communication with the active grid elements, with the energy management system (EMS), and with the utilities, market participants, and/or grid operators subsystems necessary for electric grid operations. Following initial registration, the multiplicity of active grid elements function in the grid for reporting, telemetry, command & control, status, normal or emergency electric grid operations in the generation subsystems (of all generation capacities and types) that supply capacity/energy to the electric grid, storage devices that supply capacity and energy to the electric grid and/or load curtailment acting as supply or capacity (as in FERC 745), wherein the registered, active grid elements and their corresponding activities and information associated with those activities are tracked and managed in accordance with regulations and standards governing the electric power grid.

According to the present invention, at least one grid element of the grid element(s) includes transmission or distribution control node(s), monitoring node(s), telemetry node(s), routing node(s), electrical routing node(s), fault protection node(s), generation node(s), load control node(s), devices (active & passive), sensors, etc., wherein a node may further include an interface and/or an attachment to the grid. The grid operations include functionality that is provided by a multiplicity of different grid elements associated with supply, command/control, monitoring, and curtailment activities as separate activities for active grid elements.

Overall, the systems and methods, and apparatus of the present invention provide grid element(s) and their registration for initializing their functionality within the electric power grid, wherein the registration transforms the grid element(s) into active grid element(s) through network-based communication with a server and/or a processor operatively coupled with a memory. The functionality of each grid element, following registration and transformation into active grid element(s), varies according to the grid element itself and its physical connection to the electric power grid. In many instances, the active grid elements function to provide power supply and/or curtailment as power supply, and/or capacity for same, that provides for grid stability, operating reserves, and/or other reserves of an electric power grid. However, in every case, any active grid element registered with the electric power grid management system must be operable for network-based communication with the server and/or the processor operatively coupled with memory. More preferably, grid elements communicate through a Coordinator via messaging communicated over a network, wherein the messaging is internet protocol (IP)-based messaging, or proprietary communications network protocols and transported by a plurality of network methods as described hereinbelow.

The present invention provides a system for electric power grid element and network management including: at least one grid element constructed and configured for electrical connection and network-based communication with a server and/or a processor operatively coupled with a memory; wherein the grid element is transformed into at least one active grid element after initial connection with the server and/or the processor operatively coupled with the memory via a network. Preferably, the transformation for grid elements is automatic and/or autonomous. In one embodiment of the present invention, the server and/or processor coupled with memory initiates the transformation of the at least one grid element into the active grid element. In another case, the at least one grid element transmits a signal or communicates a message to the server at the point of initial connection with the server via the network, and/or the at least one grid element communicates a signal or a message to initiate its transformation via registration with the electric power grid; preferably, the signal or the message is routed through a Coordinator, which routes the message to a grid operator's appropriate subsystem depending on the function of the grid element. For grid stability, supply, and curtailment technologies functioning as supply as contemplated by FERC Order 745 the message must be routed to an EMS. Also, preferably, the message further includes at least one of: a geodetic reference, a grid element identifier, a grid element type, a grid element function, a grid element capacity and or energy capability, a grid element profile, a grid element attachment point reference, grid element telemetry capabilities and requirements based upon its function, a grid element power supply value (PSV), a grid element power trade block (PTB) value, a grid element balancing authority association, a grid element owner identifier, a grid element compatibility identifier, and combinations thereof.

Also preferably, the network-based communication is a standards-based communication or a proprietary communications protocol, and the communication is routable through a router and/or through a Coordinator, wherein the Coordinator receives and sends messages through a communications router. The message includes a derived Power Supply Value that meets the minimum requirements for measurement, verification and reporting accuracy as determined by the Governing Entity that regulates the operation of the electric power grid that includes utilities, market participants and/or grid operators such that the derived PSV may be settled in the appropriate power market by a settlement manager or appropriate market participant or entity determining economic benefits associated with the provision of supply and/or curtailment by the active grid elements registered and functional within the electric power grid and responsive to the needs and requirements of the grid. Also, the message has a deliver priority including at least one of a plurality of methods to include priority access flags, virtual private networks, independent identifying addresses (MAC, IP, Electronic Serial Numbers), manufacturers specific identifying codes, or combinations thereof, wherein the methods comply with standards as determined by the governing entity that regulates grid operations for utilities, market participants or grid operators. Also, the active grid element(s) may further include at least one mobile or network device having at least one access point name (APN) for providing a priority of delivery for the message.

The present invention provides for a plurality of grid elements that transform into a corresponding plurality of active grid elements after initial connection with the server via the network, and the at least one grid element includes at least one electrical device, a device that consumes electric power from an electric power grid, and/or a device that provides power to an electric power grid, a control device, that operates, programs, and/or updates other of the active grid elements. So then grid elements are also selected from the group consisting of: a sensor, a transmission reporting or control device, a distribution system reporting or control device, a power-consuming device, an appliance, any inductive device that consumes power, any resistive device that consumes power, a meter, a switch, a controller, a control device, a thermostat, a building control system, a security device, and combinations thereof. Also, at least one of the grid elements is under the control of an energy management system (EMS) associated with the electric power grid.

Following the registration through the Coordinator, the transformation relating to the active grid element enables the active grid element to provide operating reserves and/or grid stabilization for the electric power grid, and the transformation is registered in a database, and the database is registered with an ISO, BA, Market Participant, NERC, utility service area, and/or FERC. For security and management by the Coordinator, preferably each of the at least one grid elements has a unique grid element identifier associated with it.

The present invention also provides a multiplicity of databases constructed and configured in network-based communication for receiving registration data from a multiplicity of active grid elements, wherein at least one Coordinator for routing messages from the multiplicity of active grid elements through the network connecting the databases, and wherein servers operating the databases exchange information associated with the active grid elements for affecting electric grid operations, reporting, and/or stabilization, including service oriented architecture (SOA), published APIs, private APIs, and combinations thereof. Also, registration of grid elements and information or data relating to their transformation into active grid elements, including the attributes of the active grid elements, are stored in the databases for predetermined periods of time for use with economic and energy accounting settlement associated with the active grid elements, and the registration information associated with active grid elements is used to determine attachment points to the electric power grid for distribution and transmission of power, and may be further combined with information about the generation, transmission, and distribution system of the electric power grid, stored in the database, and processed with analytics to simulate modeling for attachment of active grid elements to the electric power grid. Furthermore, the registration information associated with active grid elements is used for communication with an EMS or other grid subsystems necessary for normal or emergency grid operations. Additionally, a registration is made for each active grid element, and the registration complies with regulations and/or standards established by FERC, NERC, ISO, and/or a governing authority for the electric power grid. In any case, the server communicates a message to each of the at least one active grid elements after the initial connection and registration through the coordinator via the network, wherein the message is an IP-based message, which is preferably transmitted over a plurality of Ethernet capable communications networks, wired or wirelessly transmitted over a communications network.

In preferred embodiments of the present invention, the system further includes an interface that facilitates communication of the message with the grid elements, the interface including an IP-based interface, which is selected from the group consisting essentially of WiMax, High Speed Packet Access (HSPA), Evolution for Data Only (EVDO), Long Term Evolution (LTE), any first or second generation wireless transport method such as EDGE, or Code Division Multiple Access, Ethernet, any proprietary Layer 1-4 protocol that contains or is capable of transporting an Internet Protocol message, and combinations thereof. The present invention may further include a security interface associated with each of the grid elements operable to receive security system messages from at least one remotely-located security system, wherein the security interface is standards-based or determined by the governing entity that regulates grid operations for utilities, market participants or grid operators.

In another embodiment of the present invention, an apparatus for smart electric power grid communication is provided, including: a grid element constructed and configured for electrical connection and network-based communication with a server associated with an electric power grid; wherein the grid element is transformed into an active grid element after initial connection with the electric power grid, and wherein the grid element includes a unique identifier. Preferably, the transformation is automatic and/or autonomous, following initial activation of the grid element, and then the grid element is authenticated, registered, and then performs the function intended to do within the grid.

Preferably, the grid element transmits a signal or a message to the server, more preferably through a Coordinator, for registering with the electric power grid, and communicates wirelessly with the server, preferably via IP messaging with the server after attachment to the electric power grid. Such apparatus embodiments for active grid elements include or are selected from the group consisting of: a sensor, a power-consuming device, an appliance, a meter, distribution and/or transmission elements, telemetry elements, power supplying device, storage device, controller, and combinations thereof.

In methods for electric power grid network management, the present invention includes the steps of: providing at least one grid element constructed and configured for electrical connection and network-based communication with a server, energizing the at least one grid element and/or connecting the at least one grid element to an electric power grid; the at least one grid element making an initial connection with the server via a network and communicating a message to the server; and the at least one grid element automatically into at least one active grid element for functioning actively within the electric power grid. Preferably, the method further includes the step of: the at least one grid element sending and/or receiving a message via communication with the server via the network, wherein the message is routed by a coordinator to the server. Also preferably, the communication is wireless transmission, and includes wireless IP-based messaging.

In operation of the system and methods of the present invention, the communication further includes power event messages that further include at least one of: status of device(s), supply source(s), and/or demand; location of attachment; line losses; distribution and transmission capacity information; and combinations thereof, and the power event messages are based upon inputs initiated from a market participant, a utility, or an electric grid operator. Also, the power event messages include information about PSV or PTB associated with the at least one grid element.

While present invention relates generally to the field of electrical power control systems and more particularly to systems, methods, and apparatus embodiments for transforming grid elements into active grid elements following an initial registration with the electric power grid through a coordinator, following transformation of the grid elements to active grid elements, the electric power grid is functional for active management of power supply from any electric power generation source or storage device for introduction to an electric power grid, and/or load curtailment for consideration as supply. Preferably, these systems and methods and any apparatus embodiments of the present invention are in compliance with standards that are currently contemplated and are changing in response to the recognized need in the United States and other countries where the electric utility grid is not fully developed, but the demand for energy is expected to grow substantially over the life of the invention (e.g., NERC, FERC orders 745, 750, 755, etc.). Once transformed into active grid elements, the present invention systems, methods, and apparatus embodiments are operable to further provide for actively managing power supply from any generation source supply or storage and/or power supply from curtailment events applied to load consuming devices, thereby creating operating reserves for utilities and market participants, while optionally tracking power savings for both the individual customer, broadly defined as any consumer of electrical power whether this is an individual residential consumer, a large commercial/industrial customer or any combination thereof inclusive of retail electric providers and market participants, as well as the electric utility or electric power generation source supply (GSS), whether generating or distributing power for the electric power grid. Therefore, active grid elements include functionality for power generation supply, power storage supply, and/or load curtailment as supply, as well as load-consuming elements, telemetry elements, sensors, meters, controls, and combinations thereof. Where active grid elements change location or attachment to the electric power grid, then their active grid element attributes change accordingly to indicate the new, updated location and/or attachment point information or data. Where a portion of the electric power grid changes due to normal operation, or due to any element being out of service for any reason, including dysfunction of distribution and/or transmission of electric power along the lines to active grid elements and/or the communications network changes or has dysfunction, then preferably, the active grid elements are acknowledged by the system through the coordinator upon their reconnection with the grid and/or communications network. Furthermore, any active grid element is replaced with a new or substitute grid element, or taken out of service for more than a predetermined period of time, then the replacement or substitute grid element must be registered to be transformed into an active grid element as with any new grid element being introduced into service at any location or attachment point associated with the electric power grid. Where reconfiguration, repair, or other updating occurs, corresponding information related to the reconfiguration, repair, or other updating associated with each active grid element is communicated through the coordinator and updated in the database.

The following descriptions and definitions are included herein for the purpose of clarifying terms used in the claims and specification of the present invention, in addition to explanation of the relevant prior art, including the PRIOR ART figures and those figures illustrating the present invention.

Power Distribution Engineering: Fundamentals and Applications, James J. Burke, Marcel Dekker, Inc., NY (1994), describes basic power electric power systems, including distribution and transmission throughout an electric power grid, and grid elements and basic functionality of grid elements, is incorporated herein by reference in its entirety. Also, acronyms and abbreviations and definitions for terms related to electric power grids and systems and grid elements associated therewith, and regulations and authorities related thereto, are known in the art, and are also defined in the book Creating Competitive Power Markets: the PJM Model, Jeremiah D. Lambert, Pennwell (2001), and are incorporated herein by reference.

When curtailment or supply is provided in a distributed manner from a plurality of sources through some of the grid elements of the present invention, capacity is also created on the transmission and distribution system that is used to carry the physical energy to the load consuming devices, and/or the attachment point of the supply devices, and those consumers at their attachment point to the grid. This is sometimes referred to in both the industry and the description of the present invention as a "service point" and can represent any attachment point along an electric grid whereby the physical layer of wires meets the physical attachment of either load or supply that is used in accordance with the present invention. The creation of capacity for these "wired" networks is in itself new to the art, and is tracked with the other messaging described in the present invention via the Coordinator and with specific messaging that is used and identified for the purpose of transmission and distribution capacity created along every grid element that is used to distribute electric power in the electric power grid. These created capacities are preferably aggregated by service point, by attachment wires, by transformer, by feeder wire, by substation/electrical bus, by transmission line(s), by grid area, by geodetic points, by utility or MP service area, by LMP, by balancing authority, by state, by interconnect, by ISO, and combinations thereof. Thus, created capacity by active grid elements according to the present invention, includes both the actual capacity due to supply introduction or load curtailment, and/or the location of the capacity created, which is a function of the attachment point and with respect to the electrical bus (substation) and/or transmission feeder that is supplying it.

The present invention provides systems, apparatus, and methods for managing a multiplicity of grid elements that function within an electric power grid. Following registration and transformation into active grid elements, the system provides for transmission and distribution of electric power supplied by an electric utility and/or other market participants to a multiplicity of the active grid elements (including but not limited to devices and nodes), some of which consume power, some supply power, some store power, and combinations. Active grid elements may function within the grid to provide for supply and/or load curtailment as supply. Each of the active grid elements have a Power Supply Value (PSV) associated with its energy consumption and/or reduction in consumption and/or supply (through generation and/or storage). And each grid element further operates to communicate (send and/or receive) messaging that is preferably managed through a network by a Coordinator using IP-messaging for communication with the active grid elements, with the energy management system (EMS), and with the utilities, market participants, and/or grid operators. However, in some cases, messaging is provided between grid elements without passing through a Coordinator.

Before describing in detail exemplary embodiments that are in accordance with the present invention, note that the embodiments reside primarily in combinations of system and apparatus components, and processing steps, communications, protocols, messaging and transport all related to actively managing power load or supply on an individual subscriber basis and optionally tracking power savings incurred by both individual subscribers and an electric utility or other market participant, all of which directly involve active grid elements of the present invention. Accordingly, the systems, apparatus, and method steps components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used in accordance with the description of the present invention NERC is described and defined as follows: http://www.nerc.com/files/Glossary_12Feb08.pdf Balancing Authority (BA), as used in accordance with the description of the present invention is defined as the responsible entity that integrates resource plans ahead of time, maintains load-interchange-generation balance within a Balancing Authority Area, and supports Interconnection frequency in real time. Balancing Authority Area (BAA), as used in accordance with the description of the present invention is defined as the collection of generation, transmission, and loads within the metered boundaries of the Balancing Authority. The Balancing Authority (BA) maintains load-resource balance within this area (BAA).

Also, if demand changes so abruptly and quantifiably as to cause a substantial fluctuation in line frequency within the utility's electric grid, the utility must respond to and correct for the change in line frequency. To do so, utilities typically employ an Automatic Generation Control (AGC) process or subsystem to control the utility's regulating reserve. This subsystem when coupled with transmission, generation and distribution telemetry, processors, and industry standard software in its aggregate is referred to as an Energy Management System (EMS) as exemplified and manufactured for the energy sector by many OEMs such as, by way of example, GE, OSIsoft, and Areva. To determine whether a substantial change in demand has occurred, each utility monitors its Area Control Error (ACE). A utility's ACE is equal to the difference in the scheduled and actual power flows in the utility grid's tie lines plus the difference in the actual and scheduled frequency of the supplied power multiplied by a constant determined from the utility's frequency bias setting.

The aggregation of the longstanding, unmet needs in the relevant art is the basis for new innovation, including solutions offered by the present invention, having systems and apparatus components that include the following attributes:

a. The system, apparatus, methods and devices utilize standards-based OSI Layer 1-4 communications protocols with a plurality of security encryption methods.

b. The communication layer is Internet Protocol (V4 or V6 or its derivatives thereof) based such that the messages, instructions, commands, measurements and telemetry is transmitted via physical layer delivered Ethernet, first generation wireless communications methods (analog or digital), second generation communications methods such as Code Division Multiple Access (1XRTT), Enhanced Data Rates for GSM Evolution (EDGE), third generation protocols such as Evolution for Data Only (EVDO), High Speed Packet Access (HSPA), Fourth Generation protocols Long Term Evolution (LTE), IEEE 802.11 (X) "WiFi", or any derivative standard approved by the IEEE, International Telecommunications Union or any domestic or international standards body or any proprietary protocols that can operate in near real time and contain an Internet Protocol packet for the transmittal of their command, control, telemetry, measurement, verification, and/or settlement information, whether wired or wireless.

c. The command and control for the purpose of (b) can be created and controlled from a centralized processor, a distributed processing apparatus, or at the device level.

d. The aggregation of these methods result in the creation of real time load curtailment that may be classified broadly as "Demand Response", macro or distributed generation and can be native load (i.e., real-time supply) as required by the electric power grid where the invention is utilized, and also be utilized to create Operating Reserves as defined by NERC, FERC, and/or any other governing body that regulates the operation of an electric power grid and/or utilities or other market participant providing power to an electric power grid.

FIG. 1 is a schematic diagram illustrating at least one coordinator and a multiplicity of grid elements within a system and methods of the present invention. Grid elements illustrated for example, and not limitation of the present invention, include smart appliances, smart meters, building control systems, sensors, storage devices, power generators (including alternative energy sources like wind, solar, water, etc.), active load clients (ALCs), active load directors (ALDs), active supply clients (ASCs), active supply directors (ASDs), controllers, coordinators, distribution elements, transmission elements necessary for grid operations and stability, and combinations thereof. Following registration with the system, and transformation to active grid elements for managed participation within the electrical power grid and corresponding systems and methods of the present invention, the active grid elements communicate with and through at least one coordinator and to the energy management system (EMS) or other grid operations subsystems, such as RTO/ISO operations systems, transmission operation systems, distribution operation systems, and function according to their intended purpose. By way of example and not limitation, a smart meter provides meter functions to track and communicate load consumed by one or more active grid elements and/or devices; a thermostat or building control system provides for HVAC and/or environmental conditions indication and control, including temperature management, humidity, lighting, security, etc.

Figure 2:
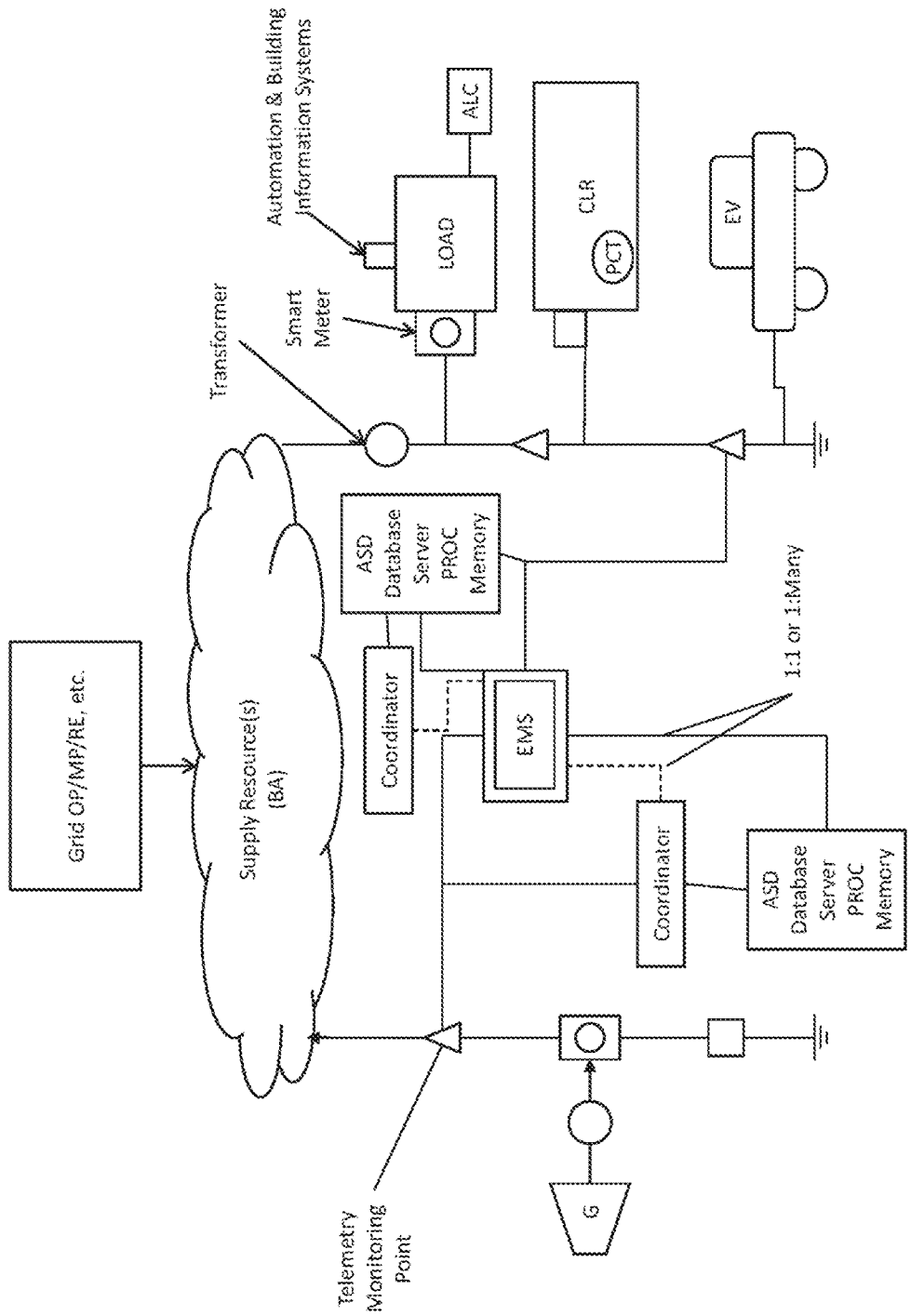
FIG. 2 is a schematic diagram illustrating grid elements, attachment points, and telemetry through a network associated with the systems of the present invention.

FIG. 2 is a schematic diagram illustrating grid elements, attachment points, and telemetry through a network associated with the systems of the present invention. FIG. 2 illustrates at least one controlling or participating entity, selected from the group consisting of a grid operator, utility, market participant, retail electric provider and/or distributor, and combinations thereof, an EMS, in electrical power connection and communication with a multiplicity of active grid elements, all within at least one balancing authority (BA), and all connected through an electrical power grid and communications network(s). The active grid elements provide telemetry and messaging relating to a multiplicity of grid element attributes and/or grid element factors, including but not limited to attachment point information, geodetic information, status, capacity, grid element identifier(s), grid element profile(s), power consumption and flows (instantaneous and historical), and combinations thereof. Preferably communication among active grid elements and the controlling or participating authority is provided over a network and routed through at least one coordinator via Ethernet and/or IP connectivity. A counter may also be included for tracking packets, and packet switching and routing is provided within the systems and methods of the present invention, wherein network communication for energy routing and energy information routing is provided with a messaging structure having layering, similar to an Open Systems Interconnection (OSI) model including layers for application, presentation, session, transport, network, data link, and physical communication functions, which defines the communications tasks of the system, and which provides a vertical set of layers forming a communication infrastructure for interconnection over public and private networks. Information describing general OSI model communication structures and functionality is known to one of ordinary skill in the art and described in Data and Computer Communications by William Stallings, MacMillan N.Y. (1985), which is incorporated herein by reference in its entirety.

The structure of OSI modeling for the systems and methods of the present invention are considered to provide communications networks for use in coordination with the physical structure and network of the electric power grid and the active grid elements registered therewith, and may further include TCP/IP. Ideally, the OSI model for communication network would be integrated with the physical network for electric power distribution and transmission, including active grid elements and controls, database, server, coordination with supply and load, etc. The present invention provides for the application of an energy network (i.e., the electric power grid) and a communications network, including the OSI-based model, and coordination to integrate the messaging with the power movement through the system.

Figure 3:
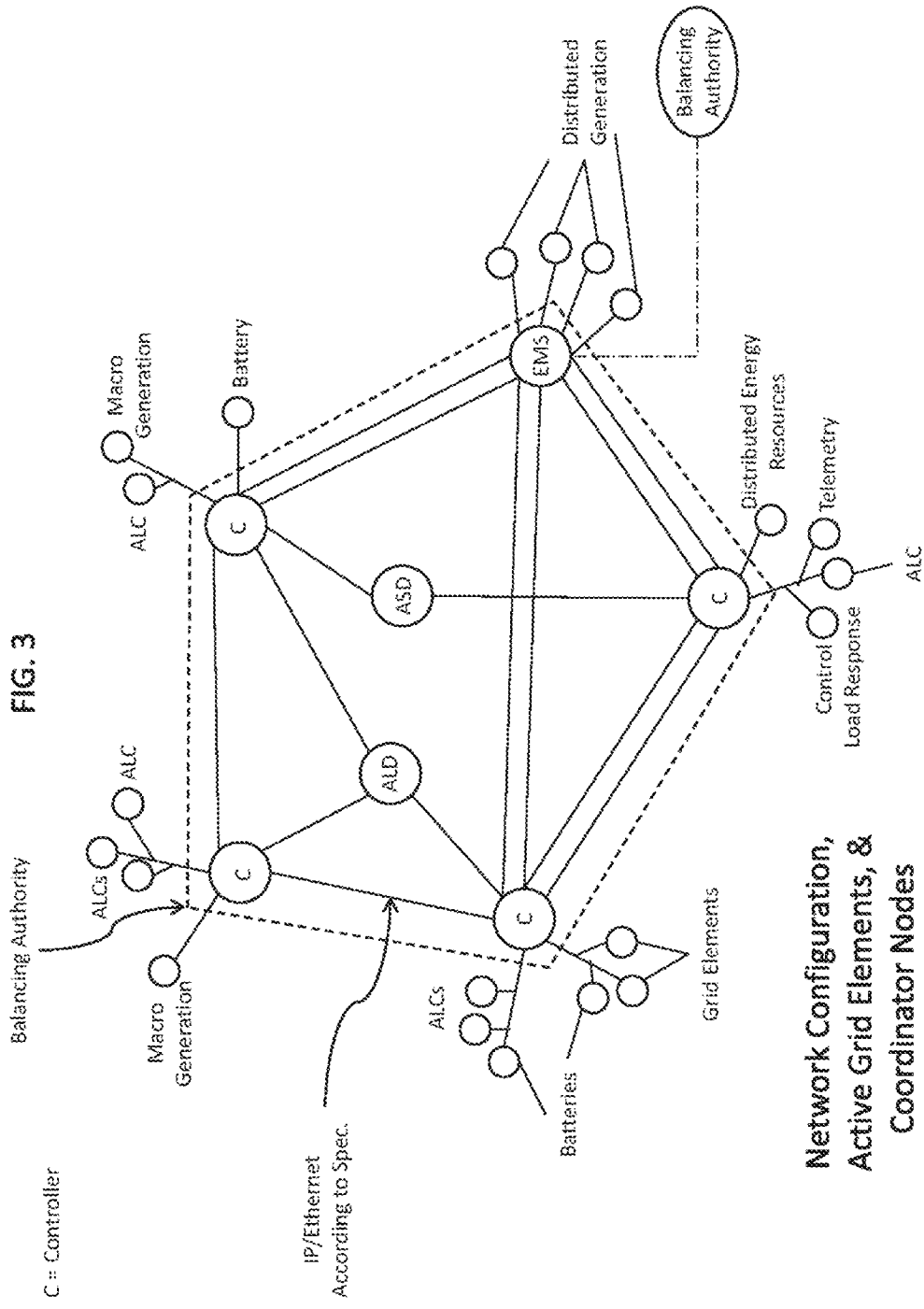
FIG. 3 is a schematic diagram illustrating an exemplary network node configuration for grid elements registration and communication.

FIG. 3 is a schematic diagram illustrating an exemplary network node configuration for grid elements registration and communication. In one embodiment of the present invention, the network for communication involving active grid elements and the coordinator and/or other grid elements includes a packet-switched network that is used to accept packets from a source node and deliver them to a destination node, such as in the case wherein a grid element makes initial registration with the system by sending an initial communication to a coordinator, and the coordinator responds and the systems and methods of the present invention then provide for automatic and/or autonomous transformation into active grid elements, wherein at the moment of registration the active grid elements are functional within the electric power grid to perform their designated or predetermined operations and roles or functions. FIG. 3 illustrates an example network configuration illustrating a multiplicity of paths or routes through a network for communication and energy routing within the electric power grid. The connections between active grid elements and coordinator(s) and other active grid elements are illustrated. In preferred embodiments of the present invention, at least one balancing authority (BA) includes at least one coordinator in network-based communication with a multiplicity of active grid elements, and further connected in electrical and data communication connections with at least one source of power and at least one EMS. By way of example, a new grid element prior to registration with the system of the present invention initiates a signal or message via the network following its initial energizing with power from any source (battery or externally-supplied power), wherein initial message includes at least one of the following: unique grid element identifier, equipment identifier, class of service information, capability, capacity, function information, geodetic information (GPS, physical address, etc.), attachment point, IP address information, communication format and content information, security, authentication information, and combinations thereof. Thus, after initial energizing of the at least one grid element, the grid element searches for at least one network available for communication with the electric power grid, preferably with the coordinator, and determines how to engage with the coordinator or at least to establish initial network communication with the coordinator, identification of network protocol, etc. A network identifier is included in the transformation and network interface for each of the at least one grid elements. Preferably, messaging between the at least one grid element and the at least one coordinator is provided by IP-based messaging over the network. Following the initial response and registration of the at least one grid element, there is a transformation into at least one active grid element, which provides that each of the at least one active grid elements is operable to function automatically and/or autonomously for its predetermined function within the electric power grid, including telemetry at predetermined intervals, continuously, or when change in state occurs for each of the at least one active grid elements.

In preferred embodiments of the present invention, the registration of grid elements may be provided using one or more of the following for providing unique identification for each grid element: messaging and/or signaling between active, inactive, IP address, V4, V6, proprietary, mesh or direct, TDM or pots, analog or digital telemetry, RFIDs, and combinations thereof. A registration for grid elements may further include registration into a home network or a visitor network, and/or movement of any of the active grid elements (following transformation after initial registration) to different locations or geographies and/or to different or new attachment points provides for at least one update of status for the movement or change for that active grid element. Attachment points are preferably provided in a location register that is defined by proximity to an electric bus or substation within the electric power grid, or any other predetermined geodetic location within the physical structure of the electric power grid.

Figure 5:
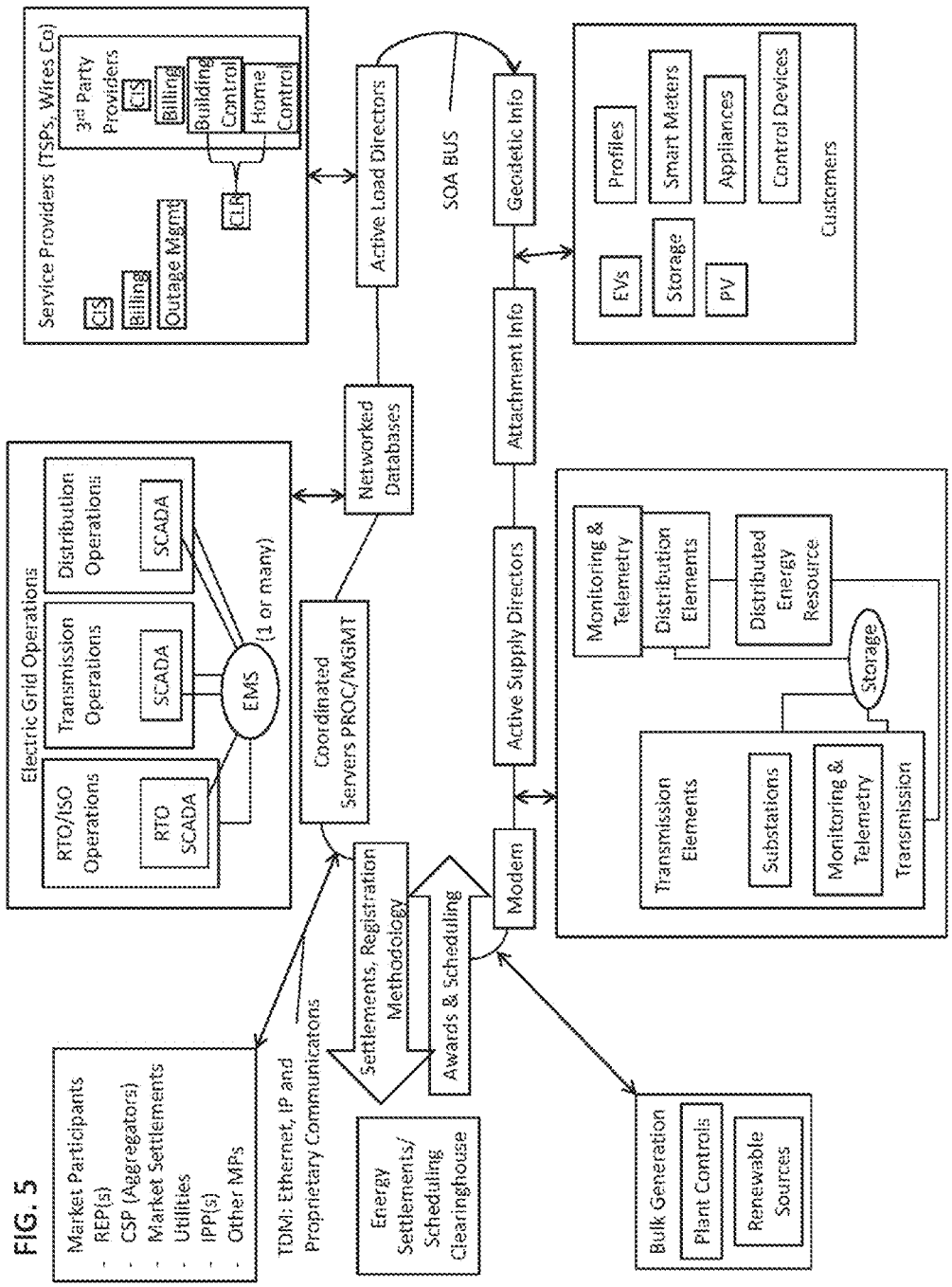
FIG. 5 is a schematic diagram showing energy systems operations and communications network-based connections.

FIG. 5 is a schematic diagram illustrating a distribution automation communications network as part of systems and methods of the present invention, including a main communications ring having a multiplicity of active grid elements associated therewith, and further including at least one master control center and corresponding database, SCADA master, AMR master, switches and electrical network lines and connections (copper wire) and communications network lines and connections (fiber) and at least one distributed ring having a multiplicity of active grid elements associated therewith. In this exemplary network sector, the active grid elements and electrical power network and communications network are included within one balancing authority (BA). Several active grid elements function as meters and/or smart meters and provide for automated meter telemetry through the network from the grid elements to at least one coordinator. In a typical network architecture, at least one core network for a balancing authority is provided, and wherein a multiplicity of grid elements are constructed and configured in electric power transmission and/or distribution connection and network-based communication connection for sending and receiving messages between each of the grid elements and at least one Coordinator.

Figure 6:
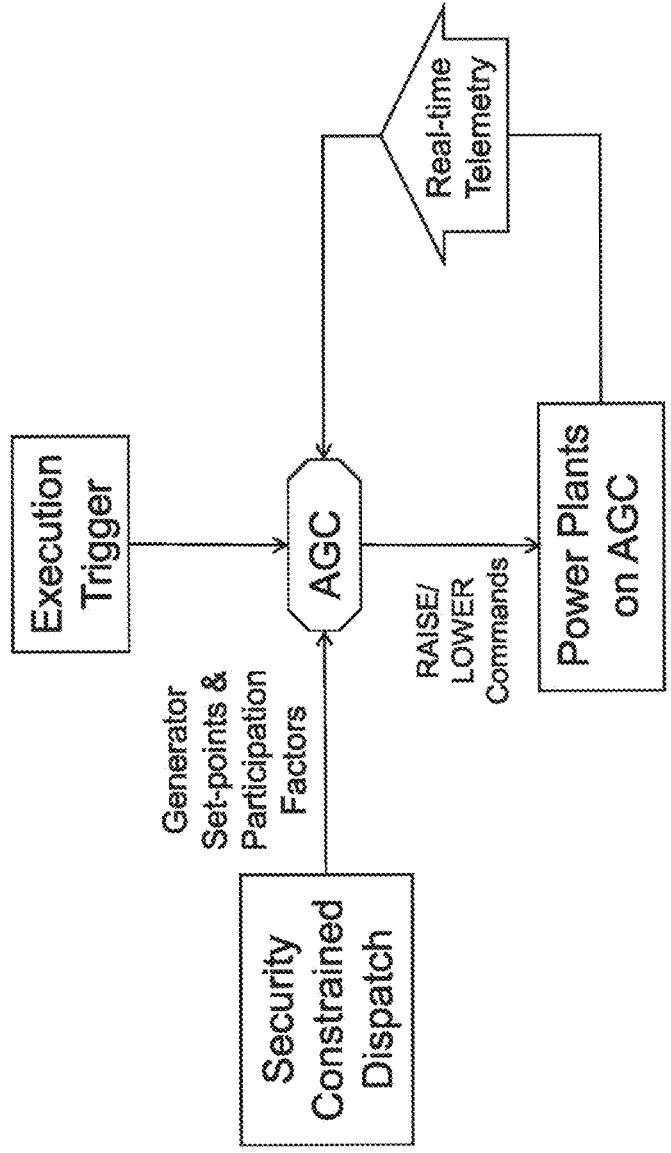
FIG. 6 is a schematic diagram showing a basic AGC/energy management system (EMS) representation.

FIG. 6 is a schematic diagram showing energy systems operations and communications network-based connections as part of systems and methods of the present invention, including compatibility and/or compliance with NIST standards applicable to transmission and/or distribution lines for the electric power grid in communications network connectivity with a multiplicity of grid elements, market participant(s), utility or electric power generator supplier and/or third party energy provider (for GSS, as described hereinbelow), an energy market clearinghouse (ECM), an aggregator for providing at least one power trading block (PTB) for settlement for energy supply and/or curtailment as supply providing by at least one of a multiplicity of grid elements, including power consuming devices, ALCs, ALDs, ASCs, ASDs, and at least one coordinator.

Figure 7:
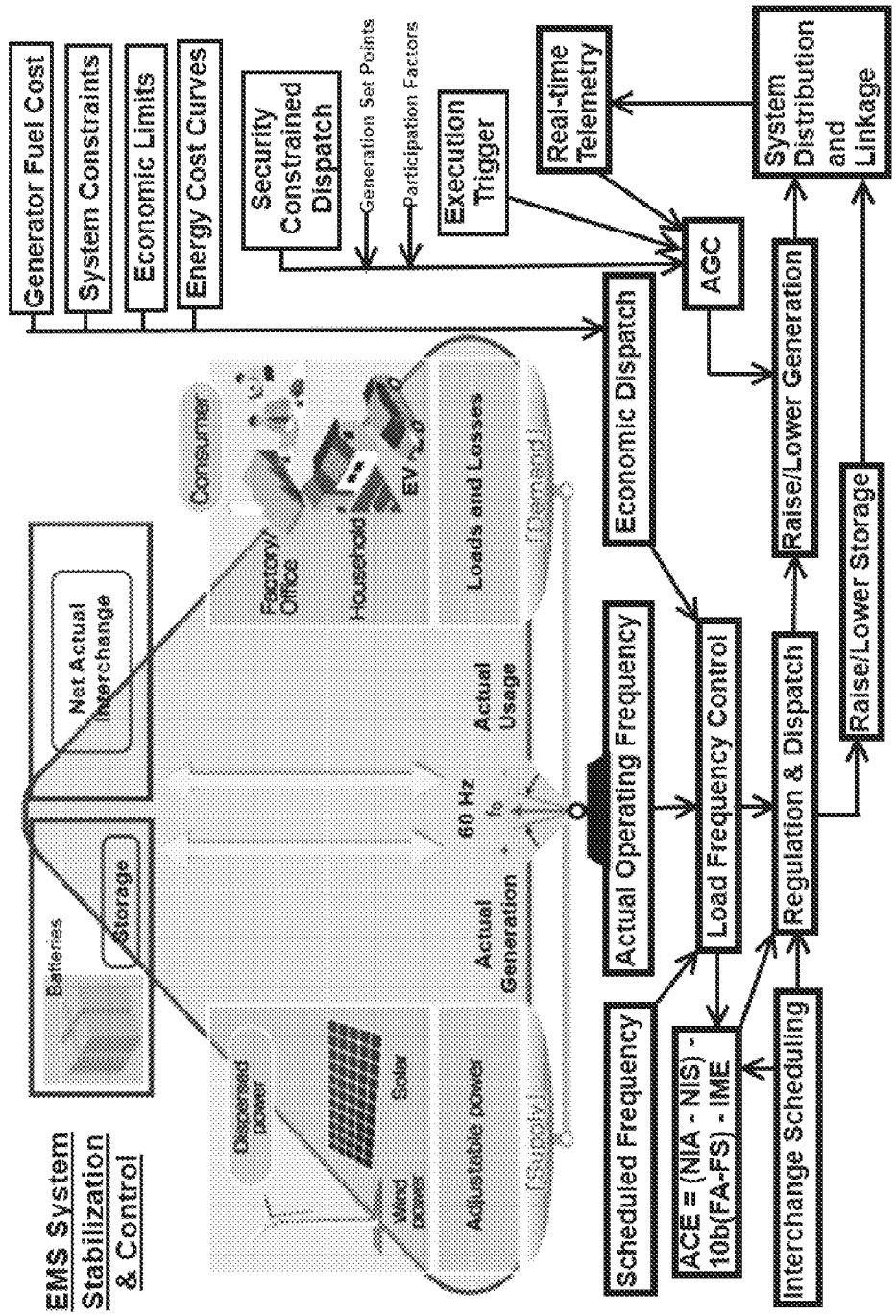
FIG. 7 is a schematic diagram illustrating an energy management system (EMS) as part of the system of the present invention.

FIG. 7 is a schematic diagram showing a basic AGC/energy management system (EMS) representation.

Figure 8:
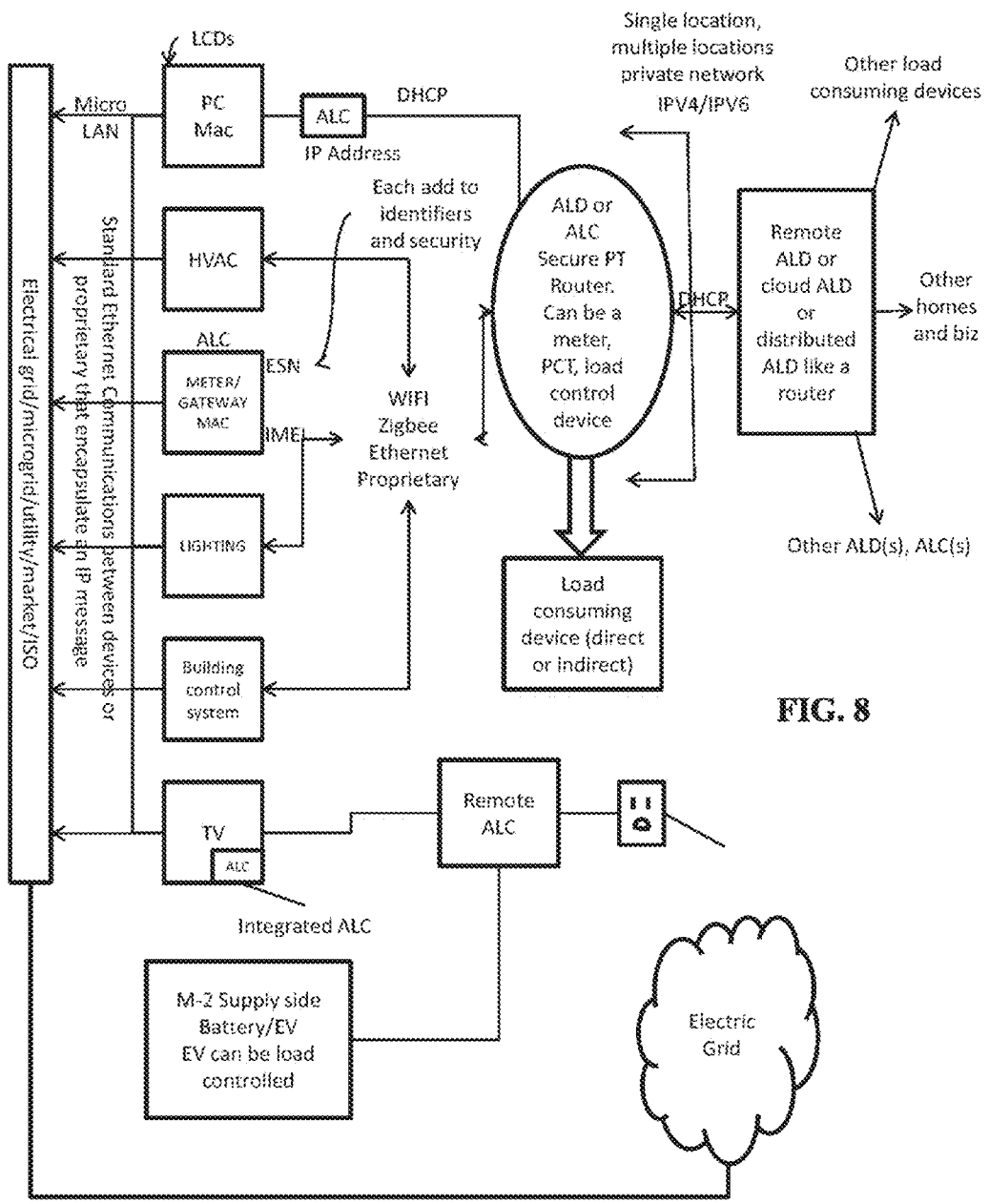
FIG. 8 illustrates a schematic diagram of an IP-based active power management system in accordance with an exemplary embodiment of the present invention.

By way of introduction to the present invention, FIGS. 1 and 8 illustrate a schematic diagram of an IP-based active power management (load and supply) system having active grid elements in accordance with an exemplary embodiment of the present invention. This diagram shows analogies for how active grid elements having predetermined functionality as load-consuming devices are addressable with IP-based messaging within the communications network by an active load director (ALD) and/or Coordinator, by comparison to basic communication networks such as the Internet. Similarly, Active Supply Director (ASD) and Active Supply Client or Element (ASC) provide for the corresponding management of electric power available or actually supplied to the electric power grid, whether by Generation Source Supply (GSS) elements or by Storage Source Supply (SSS), including battery or fuel cell, or compressed air, stored water, or any subsystem that includes a potential for discharging electricity as stored energy to the electric power grid, available for discharge or actually discharged into the grid. In any case, whether electric power supply for the grid is provided by generation or load curtailment, the supply is evaluated and rated by Power Supply Value (PSV) and Power Trade Block (PTB), which indicates the amount of power, including aggregated amounts acceptable for settlement by the grid, which are communicated by the active grid elements through the Coordinator and then to an energy management clearinghouse for settlement based upon PSV, PTB, and market factors associated with and communicated by the active grid elements and timing, duration, quality, type of event (for supply and/or demand response) within the electric power system energy management to the coordinator. Preferably, all information required for settlement is communicated within the systems and methods and by apparatus embodiments of the present invention, automatically and/or autonomously and preferably with IP-based messaging via the network; this information is routed by at least one coordinator and stored in memory in a database that is accessible by the energy management clearinghouse.

Each active grid element associated with supplying power and/or providing load curtailment within the electric power grid, includes with its attributes at least one Power Supply Value (PSV) associated with its activity and function within the grid. Power Supply Value (PSV) is estimated, modeled, measured, and/or determined or calculated at the meter or submeter, building control system, supply source, or at any device or controller that measures electric power within the standard as supplied by the regulatory body(ies) that govern the regulation of the grid. PSV depends on operating tolerances, operating standard for accuracy of the measurement. Notably, the PSV provides a uniform, systematic unit for addressing the power curtailment or power supply that is responsive to an energy management system (EMS) or equivalent for providing grid stability, reliability, frequency as determined by governing authority, grid operator, market participant, utility, and/or regulations applicable to the electric power grid operations. The PSV enables transformation of curtailment or reduction in power, in addition to the introduction of power supply to the grid, at the device level by any system, apparatus, and/or device that sends or receives an IP message to be related to or equated to supply as presented to the governing entity that accepts these values and award supply equivalence. PSV may be provided in units of electrical power units, flow, monetary equivalent, and combinations thereof. The PSV and/or PTB addresses the longstanding unmet need within the electric power management systems for a consistent or standard unit(s) that provide for blocks or bundles of energy are introduced, aggregated, and settled; the prior art nowhere teaches or discloses these functional units. Thus, the present invention includes a PSV that provides a unit for measuring and settling for each active grid element the power available for/introduced to the electric power grid and/or the curtailment power available (consistent with FERC orders 745, 750, 755 all published in 2011, which are incorporated herein by reference in their entirety) as a requirement for providing supply to the power grid, and, particularly wherein the supply to the power grid is provided for grid stability, voltage stability, reliability, and combinations thereof. Notably, "high performance reserves" from FERC order 755 covers for "deadband", i.e., the time between receipt of reg-up/reg-down, recognition of that order, and response to impact on the grid, which is about 5 minutes for high performance reserves, which are faster for supply than the traditional utilities.

PSV is preferably settled as traditional power delivery or curtailment systems at the nearest interconnection point, Location Marginal Price (LMP), node, transmission interconnection, balancing authority, utility service area, retail electric provider service area, ISO, state, and combinations thereof, i.e., settlement is available at the point of delivery and/or acceptance (or attachment point), and is facilitated by ALC, ASC, Coordinator, metering device, smart meter, submeter, and combinations thereof, or any revenue grade device accepted by the governing authority to determine PSV and/or settlement for each active grid element. Also preferably, PSV includes consideration for line losses proximal to those devices and/or grid elements, if not through real-time metrics then through modeling and/or estimation. Furthermore, regarding PSV and other metrics, where no real-time metrics for verification and settlement exist, modeling is used. Preferably, analytics is used in connection with the present invention for modeling, estimation, optimization, and combinations, such as those analytics taught by U.S. Pat. Nos. 8,180,622, 8,170,856, 8,165,723, 8,155,943, 8,155,908, 8,131,401, 8,126,685, 8,036,872, 7,826,990, 7,844,439, 7,840,395, 7,729,808, 7840396, 7844440, 7693608, and US Patent Application Publication Nos. 20070239373, 20080262820, 20080263469, 20090076749, 20090083019, 20090105998, 20090113049, 20100023309, 20100049494, 20100168931, 20100268396, 20110082596, 20110082597, all of which are incorporated herein by reference in their entirety.

The present invention methods, systems, devices, and apparatus provide transformation of grid elements to active grid elements following their automatic registration with IP-based messaging communicated via the network and preferably through a coordinator. Following registration, the active grid elements operate according to their respective intended functions, and also preferably continue to have automatic communications and messaging via the network through at least one coordinator. Because of the automatic and preferably autonomous registration and ongoing messaging, active grid elements operate collectively for managing flow of power for an electric grid, micro grid, or other system, or combinations thereof, more particularly the supply of electric power for the grid, whether by generation, storage for discharge, electric vehicles (EV), which function as transportable storage and load consuming devices, either standalone or in aggregate, (and must be tracked to ensure proper settlement and grid stability management), and/or load curtailment, and function to ensure grid stability and to supply electric power from any source of power generation, storage, and/or curtailment that equates to supply.

According to the present invention, grid stabilizing metrics including voltage, current, frequency, power factor, reactive and inductive power, capacitance, phase control, and/or any other grid metric that is required by a grid operator, market participant, utility, and the like, to operate and maintain electric power grid stability as determined by the grid operator or the governing entity therefor. Preferably, these metrics are monitored and/or measured at a multiplicity of points, and more preferably using active grid elements and their attributes and status information throughout the electric power grid, including but not limited to locations within or at the distribution system, transmission system, electrical bus (substation), generation source, supply control devices, load control devices, load consuming devices (particularly those involved in curtailment activities), at least one Coordinator, and combinations thereof. The metrics apply to any size and type of active grid element, regardless whether the generation source is macro in nature, e.g., large scale generation such as large coal, nuclear, gas or other traditional or non-traditional sources of generation, micro-grid generation, emergency back-up power generation, alternative energy generation, e.g., wind, solar, etc., or a power storage device or fuel cell that is potentially available for discharge.

Figure 4:
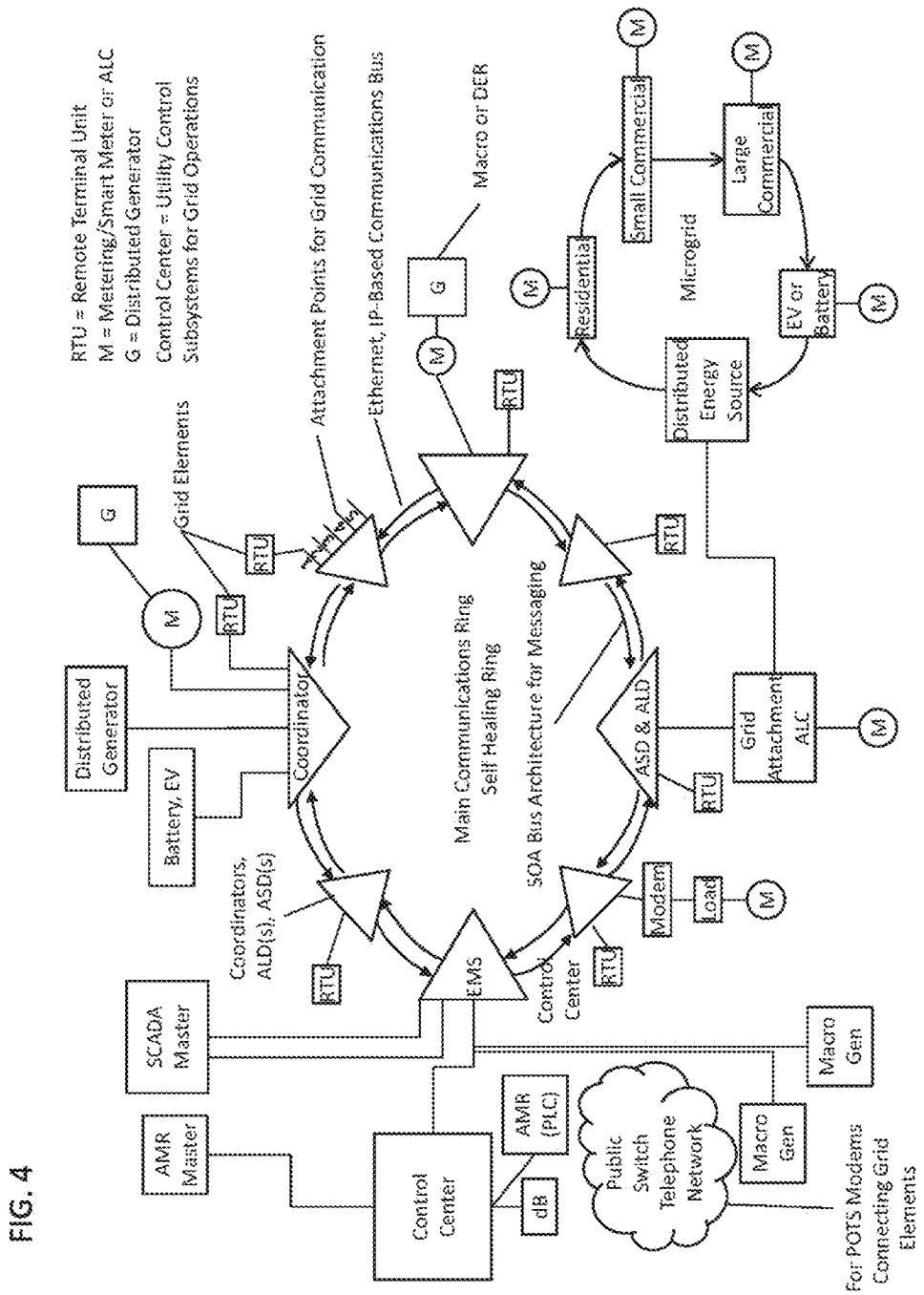
FIG. 4 is a schematic diagram illustrating a distribution automation communications network.

Also, at least one of the active grid elements may include client devices or the associated power consuming or generation control devices have the ability to independently execute commands from an Active Load Director (ALD), Active Load Client (ALC), a $3^{rd}$ party Energy Management System (EMS), Active Supply Director (ASD), Coordinator, Generation Source Supply (GSS), Storage Source Supply (SSS), transmission/distribution capacity, messaging, settlements, security, and combinations thereof, that provide for both load consuming and generation to engage with the electric power grid at attachment points with assured grid stability as indicated by the grid stability metrics for compliance with requirements of the grid operator, utility, market participant, grid governing authority, and/or any other regulations applicable to the electric power grid. All of these active grid elements preferably receive their commands and send communications and/or messaging via an IP message via a Coordinator or Layer 3 router capable of handling all current and future iterations of IP messaging contemplated during the life of this invention. FIG. 6 is a schematic diagram showing a basic AGC/energy management system (EMS) representation as part of the system of the present invention. As shown in FIG. 6, a detailed EMS with automatic generation control and distributed energy resource (DER) (FIG. 3 and FIG. 4), and load resources (L and CLR in FIG. 3 and FIG. 4) is provided according to the present invention.

Also preferably, all messaging to and from active grid elements is controlled, managed, and transmitted through the Coordinator, which communicates between the many active grid elements, including and following their initial registration, and the EMS and/or grid operator, utility, governing authority, and combinations thereof. More preferably, all commands and communications are routed through and by the Coordinator, which is constructed and configured for direct and/or wireless communication with the multiplicity of grid elements, and further includes components of processor, memory, persistence layer, memory cache, messaging engine, security interface, status and/or change-in-status indicator, geodetic locator, telemetry, connections with the network, software operable for managing and changing the connections, database with software operable for storing and analyzing data associated with transmission and distribution attachments, service points, active grid elements, registration, authentication, PSV, PTB, identification, capacity and capability of load and supply, software version control for active grid elements, software improvement control, software for settlement, and combinations thereof. Other switch elements, which may be included as active grid elements, that may be applicable to the Coordinator, and are included with the present invention include customer identification and authentication, customer security, attachment information and capacities, reservations for utilizing the transmission and distribution system, signaling to the electric grid or its operator the plurality of all the above. The Coordinator functions as an "energy router" whereby the messaging required to route supply, demand and transmission/distribution capacity to and from the grid is differentiated from pure communications routing and relates to grid stability and improved grid performance. Thus, the Coordinator is not merely functional as a traditional telecommunications router, but further includes the aforementioned messaging, management, and control functionality required for supply or curtailment to the electric power grid. The Coordinator is consistent with compliance as contemplated in the aforementioned FERC orders where frequency deviations, security, and grid performance are all now needed in an era of aging grid infrastructure and a changing and dynamic load environment where the legacy macro grid and the interim "Smart Grid" elements are not capable of responding to the new needs that FERC and NERC have identified and charged the market participants to solve, which have not yet been solved by any prior art, but which are addressed by the present invention. The energy routing function of the coordinator serves as a traffic manager, and a messaging engine, to track all the active grid elements, secure reservations and settlement information on the electric power grid and the interface for one-to-many (i.e., one port for EMS to the many active grid elements under the control of an EMS and supplying grid stability from the many to the one) allowing for microelements and distributed generation and distributed load curtailment to perform with the macro grid without taxing and destroying the legacy infrastructure beyond its capabilities and limitations; the Coordinator is further operable for tracking and maintaining status of all devices within its defined boundaries, or as described hereinabove with respect to PSV, or determined by the governing authority for the grid, which includes a balancing area, an ISO, a utility, a market participant, and combinations thereof. FIG. 1 (in addition to other figures) provides a schematic diagram illustrating the Coordinator as part of the system and methods of the present invention. Additionally, since the Coordinator operates as "energy router" it is operable to register all new grid elements, it functions to "reserve" a message to introduce it to the network; once registered through the Coordinator and introduced into the electric power grid and communications network, including storage of its active grid element attributes in a database, each active grid element is also updated via messaging by, to and through the Coordinator.

Preferably, the Coordinator manages all registered active grid elements according to their characteristics, profiles associated therewith, location, and capability for responsiveness to the various electric power grid resource requirements. The Coordinator further operates to match and prioritize these registered active grid elements and provides messaging of their information and/or matching and prioritization to communication elements, including wireless and/or wireline carriers, so that the messaging is then prioritized through any or all of the networks for communication of any messages to the utility, market participant, grid operator, EMS, and combinations thereof, based upon the grid resource requirements at any given time. Thus, the Coordinator provides priority "flags" on messaging that may be communicated over existing telecommunications infrastructure to provide grid stability and resources messaging with priority messaging over other information transmitted through those communications networks regardless if they have been configured to offer priority or "class" of service or not, VPNs or not. In particular, since electric power generation, distribution and transmission is part of critical infrastructure and provides an asset for national security in many countries, including the United States of America, the present invention provides for enhanced critical infrastructure security with the priority messaging associated with the Coordinator and allows the Coordinator to take advantage of new chip and ASIC technologies that will accommodate multiple routes, VPNs, APNs, and IP addresses per active grid element, ALC, ASD, GSS, SSS, Smart Meter, Service Point, transmission, distribution element or combinations thereof.

The Coordinator is operable for and includes Layer 1-4 for communication, but additionally, and significantly, the Coordinator further tracks and communicates and controls where elements are attached to the grid, makes or communicates decisions about how the resources are used either with or without communication to any active grid element, including but not limited to ALD or ASD, or EMS, communicates the status of any and all active grid elements to legacy distribution automation and transmission reporting subsystems and provides for new methods for direct contribution by active grid elements to the grid stability through load curtailment and/or supply from any source, and for settlement of same, and the security, authentication, initial registration of the devices with the grid, ALD, ASD, market participant, grid operators, their legacy subsystems and/or EMS for the electric power grid; and change of status for those active grid elements; and combinations of these, while simultaneously facilitating and routing those messages to the appropriate subsystem to achieve the supply, curtailment, and/or grid stability requested by the legacy subsystems, or through the present invention, all with IP-based messaging. Most preferably, using digitally encrypted secure IP messaging delivered through a network via Ethernet, wireless messaging, or proprietary methods, including carrier-grade wireless and/or wired networks for communication.

The Coordinator operates further for communication of all telemetry, settlement, tracking, and combinations thereof for each active grid element. All active grid elements associated with the grid for supply and/or load curtailment are registered with the Coordinator and are routed within one or more ports within the EMS, for example as illustrated in the Figures; thus, the Coordinator and its application or functionality within the electric power grid, sending the signals, telemetry and messaging for primary frequency control, grid stability, control events, dispatch schedules for supply sources (both pre-scheduled and dynamic/real time in response to electric power grid conditions), and combinations thereof through messaging and coordination with the active grid elements. The Coordinator also preferably includes functionality for clearing and reporting to and with transmission reservations subsystems associated with the active grid elements. By way of example, prior art transmission reservations subsystems can be represented by companies such as OATI's OASIS transmission reservation system (illustrated at the Internet website www.oatioasis.com), which is overseen and regulated by FERC, but whose clearing and reporting is deficient in enabling reservations below macro transmission levels, and whose reservation systems include "firm" capacity and "non-firm" capacity that has very little value since its reliability is not assured. The present invention solves many of these problems and creates "actual measurable and verifiable transport capacity" by enhancing power distribution, settlement, and combinations thereof, by grid element, by service point, by device and by consumer. Additionally, telemetry for settlement for curtailment, supply from storage, and combinations thereof, area managed through the Coordinator. The Coordinator is further constructed, configured, and operable in IP-based or proprietary messaging communication, for providing a routing and control architecture and methods analogous to the OSI model used in telecommunications networks worldwide, applied for all active grid elements management and for supply, whether GSS or SSS, and load curtailment management for any of the multiplicity of active grid elements, and grid stability. The messages contemplated by this type of energy routing and capacity creation in itself creates the potential for a new standard for achieving FERC and NERC goals while seamlessly integrating into legacy subsystems of current art of macro electric utility architecture.

The method, system and apparatus embodiments of the present invention further provide that the active grid elements are operable to send change in state messages in lieu of a constant stream of IP messages via a telemetry path. The change-in-state messages provide the ability to only communicate the "deltas" (or change in state) and have the ALD, ASD, and/or server transmit, send, or stream the telemetry from the last "known value" until that last known value has changed, by communicating a "delta" message, rather than constantly streaming values, and may use "machine to machine" communications, text telemetry, or any low bit rate telemetry method that meets the requirements as established by the governing entity, but is capable of complying while simultaneously utilizing the transmission bandwidth and latency that is available at a service point or active grid element location. These change-in-state messages associated with the active grid elements preferably include the necessary information to report the Power Supply Value (PSV), PTB, and/or any other grid stability messages on an event basis rather than merely a telemetry basis and to send those messages through a server, and are transmitted to an energy management system (EMS) via a format as determined by the grid operator, microgrid operator, and/or other grid control entity while simultaneously achieving primary frequency control and grid stability at the service point and/or active grid elements and storing at the ALC, ASD, ALD, ASD or combinations thereof the necessary information in granular format sufficient to transmit for settlement or measurement & verification processes later either when better transmission speeds are available or retrievable by a manual intervention such as a smart phone, tablet or drive by apparatus where the memory may be downloaded to a mobile client.

The systems, methods, and apparatus embodiments of the present invention further provide for commands issued either directly by the EMS, Coordinator, ASD, ASC, ALD, ALC, load consuming device, "Smart Electric Meter" and its subcomponents (processor/memory), or by programming any active grid element, for example, a client device such as a programmable thermostat or building control system, wherein the commands anticipate the activation of a load curtailment event for any load consuming device (such as an HVAC system, a system profile that has been programmed for supply side indices such as market price of power or Operating Reserves or load side indices that take a consumer's preferences into account, or any other sensor) or the activation of a supply or demand event for any supply source associated with the electric power grid.

Just prior to the activation of the load consuming device a precise measurement of total load as measured by the meter or submeter, ALC, or load consuming device is made as to ascertain its contribution to the total amount of electricity prior to the activation of the load consuming device. Similarly, for ASD, ASC, or any supply source, GSS or SSS, electric supply availability and electric supply existing at the attachment point(s) is determined. Measurements by the same aforementioned measuring elements are made after the registration of the grid elements and their transformation into active grid elements, whether a load consuming or supply device or other function. Either through a baseline measurement or with precise timing of measuring the "before" and "after" load or supply contribution by the active grid element is recorded in the ALC or ASC, device, or passed or routed to the Coordinator or the EMS via an IP message utilizing one of the aforementioned communications methods to the ALD, ASD, and/or Coordinator, or is stored in the ALD, ASD, and/or Coordinator until a "change-in-state" message for the grid element(s) is communicated directly to the ALD, ASD, and/or Coordinator, so that it might be used in the calculation of load removed, "cut", reduced, or "added", or supply available or supply provided, in response to an ALD, ASD, and/or Coordinator, a pre-programmed load curtailment or supply profile, or in response to commands from an Energy Management System (EMS), or correspondingly, the ALC, ASC, Coordinator, a pre-programmed supply profile, or combinations thereof, or in response to commands from an EMS (preferably via the Coordinator) for active supply management from any supply source, whether generation, storage, or combinations thereof.

The following examples illustrating embodiments for the systems, methods, and apparatus of the present invention for registration and management of active grid elements follow the FERC regulations 745, 750, and 755 introduced in 2011 for Load Curtailment, Supply from Storage, and Supply from Generation.

Figure 9:
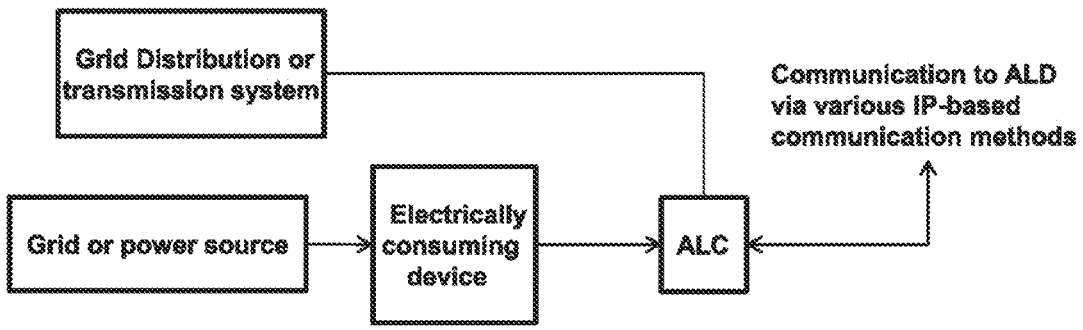
FIG. 9 is a schematic diagram illustrating an exemplary active load client (ALC) smart meter use case example according to the present invention, wherein the ALC is shown as a component of the system of FIG. 8.
Figure 10:
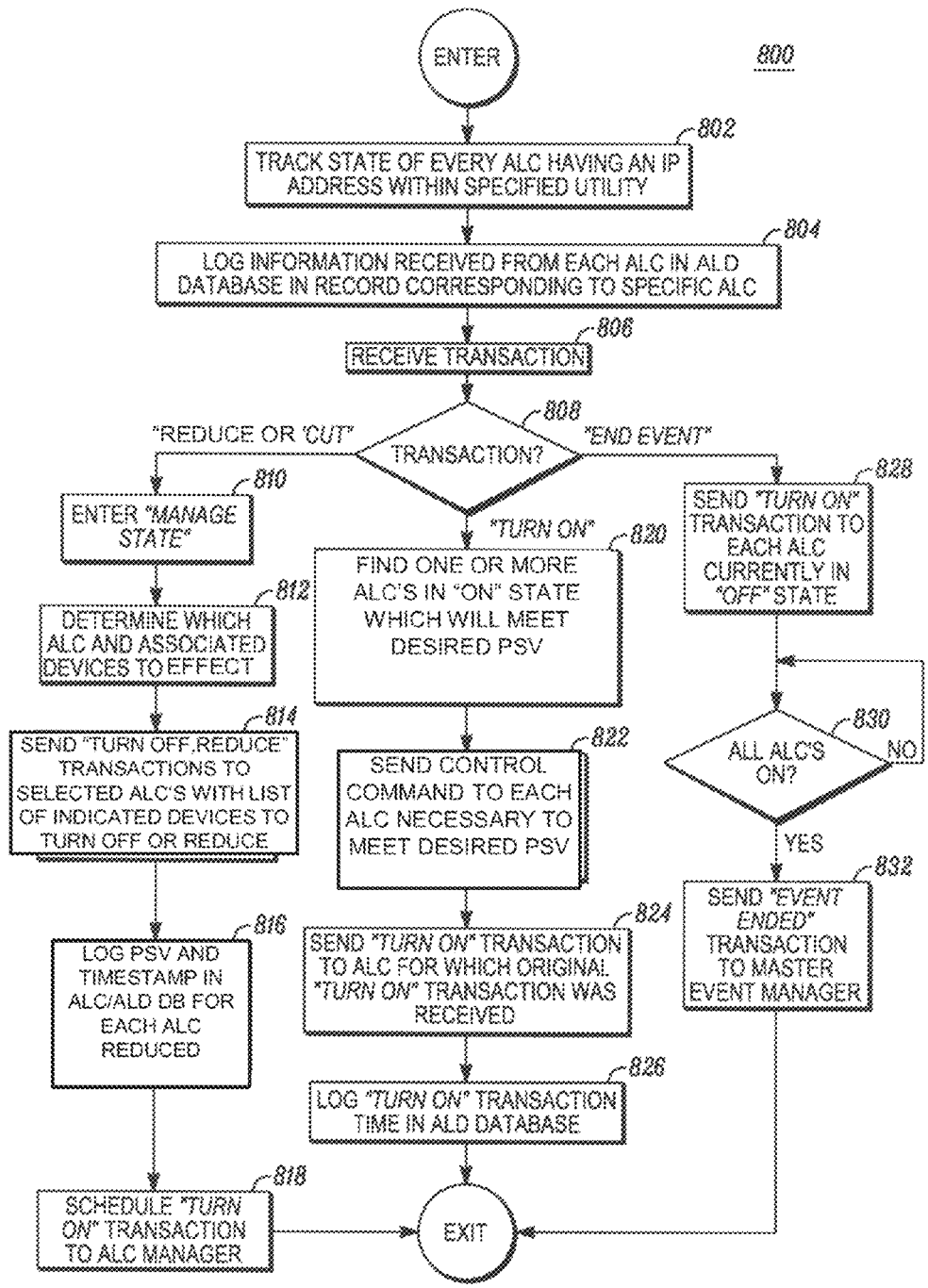
FIG. 10 illustrates a flow diagram of methods according to the present invention for tracking state of ALCs having an IP address within an electric power grid system.
Figure 11:
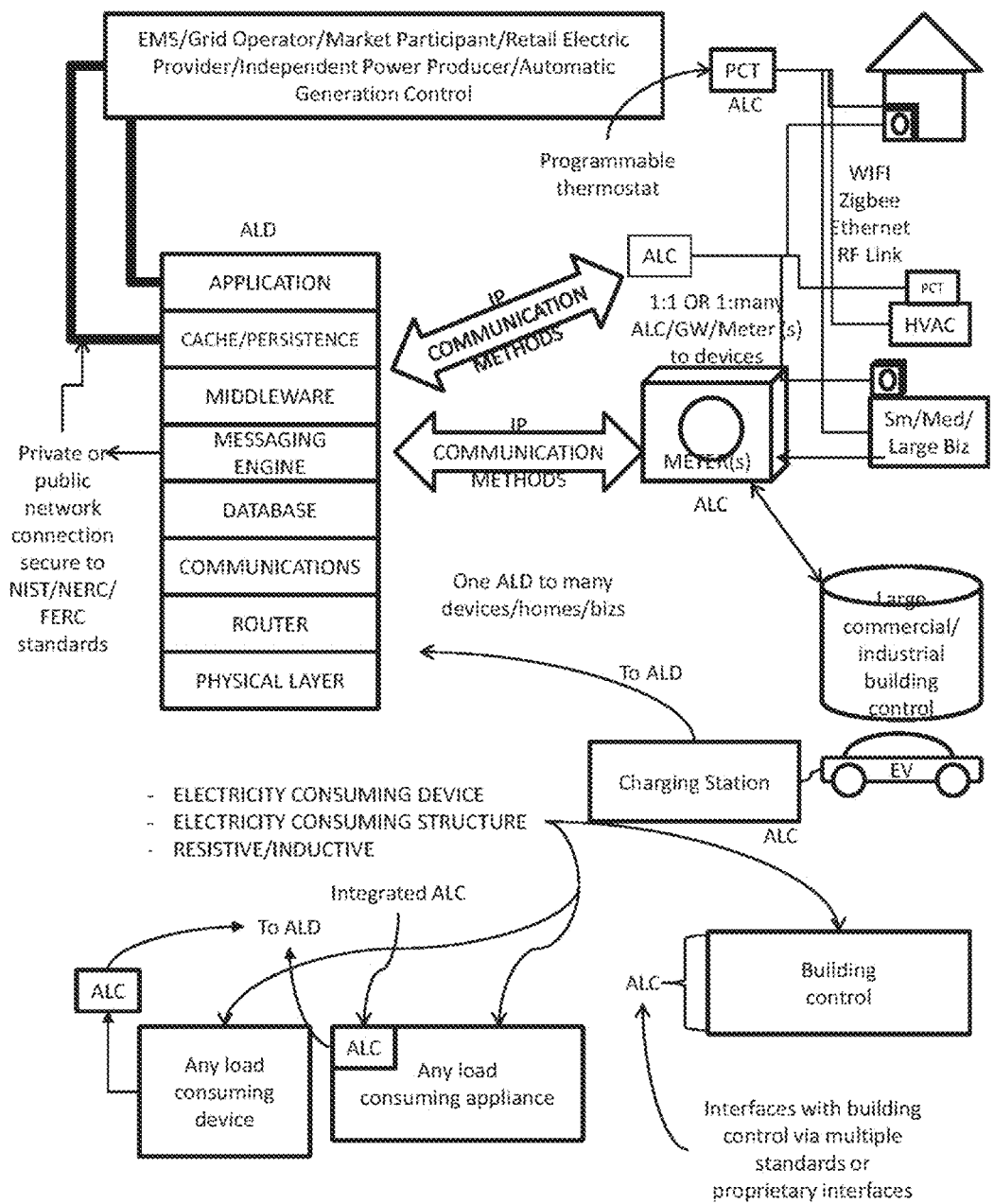
FIG. 11 is a schematic diagram illustrating an exemplary system arrangement for conservation voltage reduction.

Relating to the load curtailment for providing a supply equivalent, FIG. 8 provides a schematic diagram illustrating an exemplary grid element as active load client (ALC) smart meter use case example according to the present invention, wherein the ALC is shown as a component of the system of FIG. 9. Additionally, or alternatively, by way of example and not limitation, smart breakers and command relay devices, are active grid elements following their registration according to the present invention, and may be considered and operated as submeters for measurement and verification purposes. In other method steps for the present invention, FIG. 10 illustrates a flow diagram of methods according to the present invention for tracking state of active grid elements as ALCs having an IP address within an electric power grid system. FIG. 11 is a schematic diagram providing an overview of an IP-based active energy management system (EMS) in accordance with the present invention, including active grid elements as ALC, ALD, IP-based communication, load control devices and power consuming devices, which are described in more detail in the following specification. As illustrated, the EMS/Grid Operator/Market Participant/Retail Electric Provider/Independent Power Producer/Automatic Generation Control component(s) of the system of the present invention are in networked communication with active grid elements (in this example, ALD(s)) via IP-based communication methods, for communicating with these active grid elements about load control events to control devices and/or ALCs for managing load consumed by power consuming devices. A variety of system elements are illustrated for exemplary purposes, to show the interaction between the active grid elements.

Figure 12:
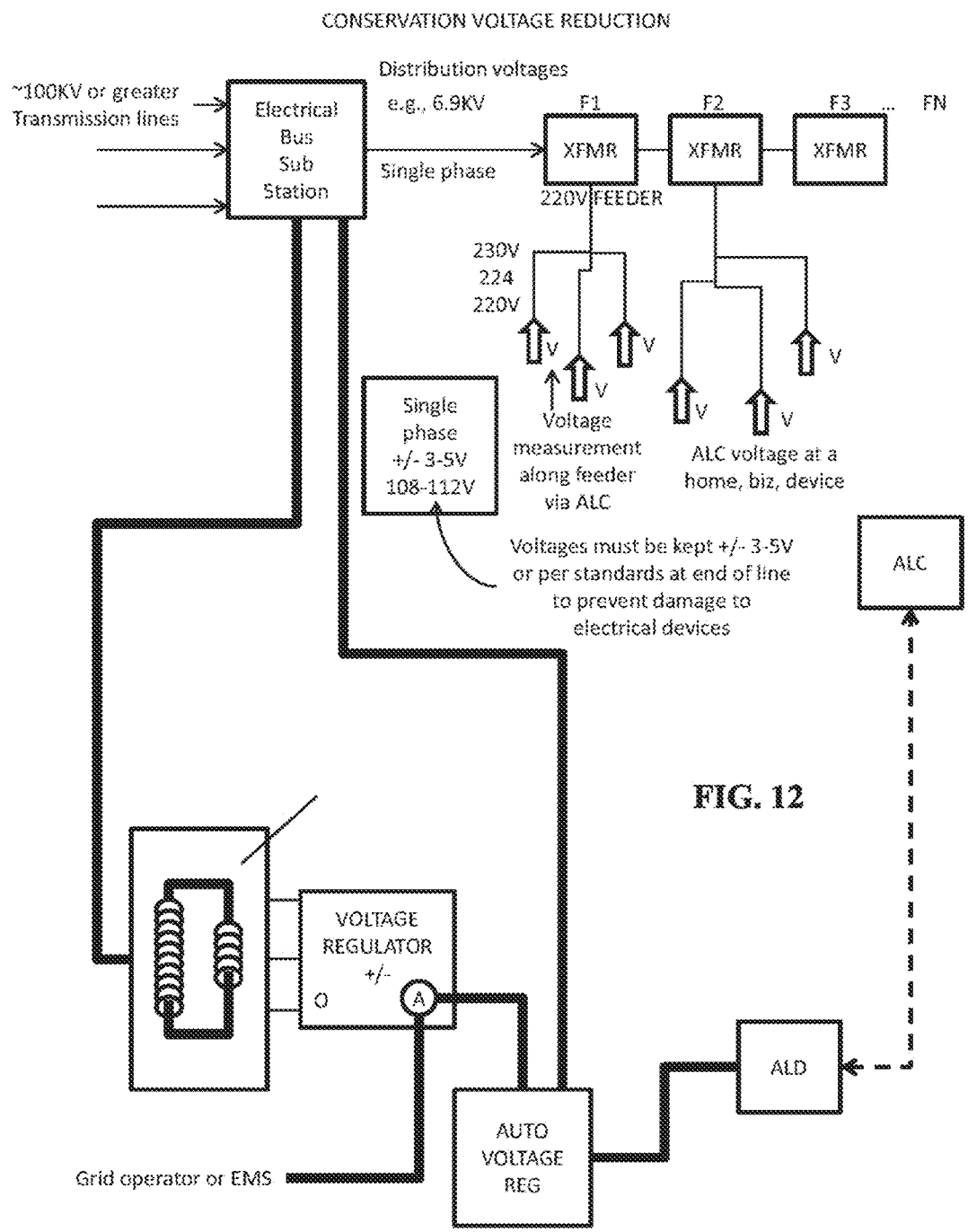
FIG. 12 is a schematic diagram an IP-based active energy management system in accordance with the present invention, including components of ALC, ALD, IP-based communication, load control devices and power consuming devices.

In another aspect of factors addressed by the present invention, FIG. 12 is a schematic diagram illustrating an exemplary system arrangement for conservation voltage reduction (CVR). Transmission lines, illustrated on the left side of the diagram, transfer electric power from the power generation source, which may be a utility, to an electrical bus or substation, where it is transformed to provide distribution voltages (e.g., about 6.9 kV in this example and single phase) to additional transformers, indicated as F1, F2, F3, . . . FN, where voltage measurement along the feeder via ALC(s). Under current standards, voltages must be kept at between about +/−3% and about +/−5%, but in any case maintained as required by standards, for final distribution at the end of the line to prevent damage to power consuming devices. The active grid elements functioning as ALCs preferably transmit voltage information and line loss information to the other active grid elements functioning as ALD(s). The active grid elements therefore establish a phase/voltage "locked" loop to automatically control the voltages so that the CVR creates megawatts of operating reserves according to the methods and systems of the present invention.

Also, by way of introduction to the commercial application of the present invention, considering basic operations of the electric power grid is helpful, in conjunction with the PRIOR ART figures referenced herein. PRIOR ART FIG. 13 is a schematic diagram illustrating generation, transmission, distribution, and load consumption within a traditional electric power grid. PRIOR ART FIG. 14 is a schematic diagram illustrating traditional transmission systems that connect to electric power sources to distribution facilities, including smart metering and advanced metering.

PRIOR ART FIG. 15 is a schematic diagram illustrating power generation or supply balancing with customer demand for electric power within a grid. PRIOR ART FIG. 16 is a schematic diagram illustrating balancing areas and their interaction for power generation or supply balancing with customer demand for electric power within a grid, where utilities are connected by transmission lines and balancing areas. PRIOR ART FIG. 17 is a schematic diagram illustrating regions and balancing areas and their interaction for power generation or supply balancing with customer demand for electric power within a grid. These balancing areas (BAs) provide for opportunities for the electric power grid and/or a multiplicity of grids that are constructed and configured for networked communication and power distribution therebetween. In one embodiment of the present invention, communication with active grid elements passes through or is routed by at least one Coordinator for providing the one-to-many coordination of communication, messaging, etc. between the many active grid elements and the EMS, inside a given BA or between BAs, which may involve at least one Coordinator for each BA, thereby providing for managed, coordinated cross-communication of status, change-in-status, grid stability metrics, control messages, and combinations thereof.

The present invention systems and methods provide herein below for power trade blocks or power trading blocks (PTBs) for facilitating the collaboration across balancing areas and regions for supply and load curtailment management, for increasing power available, operating reserves, and/or grid stability. In preferred embodiments of the present invention, at least one PTB is introduced and/or provided to the electric power grid, including method steps of: valuing, trading, selling, bartering, sharing, exchanging, crediting, and combinations thereof. Thus the present invention provides for electric trading market across BAs or microgrids or individual active grid elements, including load consuming customers or supply sources, whether generation, storage, or distribution or transmission.

Telemetry, measurement, verification, PSV, PTB, and other factors described herein, in compliance with FERC 745, 750, and 755, provide with the present invention the capacity for active grid elements functioning for providing curtailment as operating reserves to be compensated for megawatts at the clearing price, and for supply to be provided or indicated as available to be provided, and compensated or settled for megawatts at the clearing price. Clearing prices are either determined by many attributes including their location of where the power is delivered or accepted by a generator of power or a purchaser of power. The term "Locational Marginal Pricing (LMP)" refers to a node where power is either delivered from a generator or accepted by a purchaser. A node corresponds to a physical bus or collection of buses within the network or any other geodetically defined boundary as specified by the governing entity. A load or supply zone is defined as an aggregation of nodes. The zonal price is the load-weighted average of the prices of all nodes in the zone. A hub is defined as the representative selection of nodes to facilitate long-term commercial energy trading. The hub price is a simple average of LMPs at all hub locations. An external or proxy node is defined as the location that serves as a proxy for trading between ISO-Balancing area and its neighbors. According to the present invention, the at least one grid element(s) includes transmission or distribution control node, monitoring node, telemetry node, routing node, electrical routing node, fault protection node, generation node, load control node, devices (active & passive), sensors, etc., wherein any node includes an interface and/or an attachment.

For vertically integrated utilities that do not have open markets as ISOs, their delivery or acceptance of power can occur at their boundaries of their "Balancing Area", which is defined as the geography where their transmission and distribution system extends and is subject to grid stability maintained by that utility. Balancing Authority boundaries can also be delivery points or (LMP) pricing points. It should be noted that vertically integrated utilities are subject to the same FERC and NERC rules as decoupled utilities in ISOs, except in vertically integrated utilities, local public utility commissions have more authority to enforce and enhance rules since the rate base is being charged for improvements to the grid within the balancing area (BA) that the utility serves. Three FERC orders (745, 750, 755; all from 2011) apply to electric power grid load management and distributed supply, including active grid elements and their registration and functionality within the system according to methods and apparatus embodiments for present invention. The trend in the world market is to inject market forces to utilities such that they must follow new FERC rules that permit the use of demand response technologies/load curtailment technologies to promote the need for fewer large scale, primarily fossil fuel power plants.

Power is generally traded in terms of "Capacity" the reserved peak amount of power that a generator agrees to reserve for the utility, market participant, or REP; and "Energy" is defined as the amount of power consumed by the utility, market participant, REP or any entity that is authorized to buy, sell or distribute power for the electric power grid, consumers, particularly commercial accounts, also purchase power in this manner. Energy is settled on the wholesale market in "MegaWatt Hours", which is defined as one (1) million watts of electricity consumed at a metering point, or interchange of power such a LMP, transmission tie point between two utilities, a commercial customer large enough to consume such an amount, a utility (generating or distributing) or a market participant including a REP that generally purchases the power from a generating utility and utilizes the distribution network to supply its power purchased at the wholesale level and distributes its power to end consumers/customers generally in smaller increments of measurement "kilowatt hours (kWH)." These increments are important due to the introduction of programs involving utilizing curtailment technologies enabled by FERC Order 745, 750, 755 whereby utilities, market participants, REPs and CSPs may aggregate their curtailment/DR and/or supply in increments of "kW-representing a capacity figure" and "kWH" which represents avoided energy. Peak "capacity" charges are settled based upon intervals whereby the instantaneous peak (kW/MW) determines the "capacity" charge.

In particular, by way of more detailed explanation, in 2011, FERC issued a series of orders (745, 750, 755) that have had a pronounced impact on the injection of new technologies, particularly distributed load resource, curtailment, demand response technologies, and distributed supply sources, to the market to be implemented across all of the US and with direct applicability to World markets. FERC Order 745, issued Mar. 15, 2011 and adopted April 2011, and which is incorporated herein by reference in its entirety, provides that utilities, market participants, CSPs, REPs or any other entity that can aggregate a minimum trading block of power that can be accepted into the market, BA, or utility service area or regional trading area (RTO) must be compensated for such curtailment/load resource and demand response technology at the clearing price at the nearest LMP as though it was generation; this provides that active grid elements associated with these supply and/or curtailment activities may be individually tracked, managed, reported, and compensated based upon their individual contribution to the aggregated settlement. Said plainly, "Negawatts" have the same value as "Megawatts." Controversial, particularly to those utilities that still have the antiquated practice of rate base recovery of assets to insure profits, the conditions of which these "Negawatts" are compensated as "Megawatts" place a high value on those curtailment/load resource/demand response technologies that can create utility Operating Reserves for the benefit of grid stability. Operating Reserves, previously defined, come in different capacity and energy products or their equivalencies in the case of curtailment/load resources/demand response and are compensated at the nearest LMP based upon their ability to perform to the same level of measurement, verification, responsiveness (latency) and settlement as generation. This high standard has the practical effect of rewarding those advanced technologies that can perform as generation equivalencies (load resources), while still allowing capacity products (traditional and advanced demand response) to also participate in the market and perform the valuable function of providing capacity and energy resources without the need for transmission losses (avoided power avoids transmission of kWH/MWH to the endpoint, therefore freeing up transmission and distribution lines to carry power elsewhere where it is needed). It should be noted that most utilities do not have accurate measurements of distribution losses below their electrical bus (substation levels) and as such high performance, IP-based active grid elments and corresponding service points that allow this information to be brought forward to the utility operations promote the Operating Reserves and "Negawatts" and add to their value.

Related US patents and patent applications, including U.S. application Ser. No. 13/172,389, filed Jun. 29, 2011, which is a continuation of U.S. application Ser. No. 12/715,195, filed Mar. 1, 2010, now U.S. Pat. No. 8,032,233, which is a divisional of U.S. application Ser. No. 11/895,909 filed Aug. 28, 2007, now U.S. Pat. No. 7,715,951, all of which are incorporated herein by reference in their entirety; these documents include descriptions of some active load management within power grids, and provide additional background and context for the present invention systems and methods.

Also, in this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

By way of definition and description supporting the claimed subject matter, preferably, the present invention includes communication methodologies for messaging via a communication layer. IP-based communications over a network are most preferred. Correspondingly, and consistent with the communication methodologies for messaging according to the present invention, as used throughout this specification, figures and claims, the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard(s), the term "WiMax" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMax, other communications protocols may be used, including but not limited to a "1G" wireless protocol such as analog wireless transmission, first generation standards based (IEEE, ITU or other recognized world communications standard), a "2G" standards based protocol such as "EDGE or CDMA 2000 also known as 1XRTT", a 3G based standard such as "High Speed Packet Access (HSPA)" or Evolution for Data Only (EVDO), any accepted 4G standard such as "IEEE, ITU standards that include WiMax, Long Term Evolution "LTE" and its derivative standards, any Ethernet solution wireless or wired, or any proprietary wireless or power line carrier standards that communicate to a client device or any controllable device that sends and receives an IP based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments of the invention described herein may be comprised of one or more conventional processors and unique stored program instructions that control the one or more processors to implement, in conjunction with certain non-processor circuits, some, most, or all of the functions for managing power load distribution and tracking individual subscriber power consumption and savings in one or more power load management systems as described herein. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Recently, the IEEE and ITU have released improved WiMax and Long Term Evolution wireless standards that have facilitated the consideration of new technologies to improve the response and control of power load control devices employing smart breaker and smart disconnect switches that include advanced smart meters where IP multimedia gateways are embedded or attach as separate connected printed circuit boards, submetering technologies that possess sufficient "revenue grade" metrology such that the measurements provided by these devices may be accepted for settlement purposes. The term "revenue grade" is an industry term, as will be appreciated by one of ordinary skill in the art, a percentage of accuracy determined by ANSI, which means that power measurement must be within ½% of the actual value being consumed. Thus, calibration standards are provided accordingly to OEMs of power measuring devices and/or chips. In embodiments of the systems and methods of the present invention, these calibration standards are met via components including a chipset and related software, and the transmittal of the power measurement information via IP-based communications as set forth hereinabove. Baselining techniques that provide a reference power usage point, sampling techniques that allow for verification of the power "state" and power consumption data for electricity consuming devices (inductive or resistive), reactive power, Power Factor, start-up current, duty cycles, voltage, consumption forecasts and most importantly real-time or near real time power measurement sampling, etc. are required to derive a Power Supply Value (PSV) that includes an American National Standards Institute (ANSI), ISO, grid operator, governing body revenue measurement, etc., which is preferably aggregated to reach the size of at least a single Power Trade Block (PTB) unit for the purposes of optimally monetizing the active load management from the customer perspective. PTBs are dependent on a grid operator, regional transmission operator, or independent system operator to determine the capacity size (in kW or MW) or energy data in (kWH or MWH) that can be accepted for bidding, trading, settlement by the utility, the end consumer/customer, the market participant, the CSP, demand response aggregator or any entity authorized by the government entity that regulates grid operators such as FERC, NERC etc. Generally due to measurement, verification, transmission and/or distribution modeling (which considers the impact to the grid from the curtailment activities at any geodetic location on the grid, but generally modeled by electrical bus or substation), the minimum acceptable PBT is 100 kW at the time of the present invention. This limitation is not expected to be permanent, given these advancements in measurement/verification, the near real time or real time IP/Ethernet based telemetry capabilities presented by a plurality of various communications methods as discussed in this embodiment and the advancements in service oriented architecture based (SOA) software and hardware subsystems, when combined with an ALD and ALC that can perform at a sublevel such that the minimum PTB can be determined at the device, home, building, service point, commercial, industrial, transformer, feeder, substation, transmission line and any sub-point along the transmission and distribution feeder system of an electrical grid as so long as minimum telemetry, measurement, verifications, validation are met and are capable of being aggregated to a minimum PTB acceptable to the grid operator, ISO, RTO, BA or any other increment of grid topography used now or in the future for settling power block increments by sub-PTB.

Embodiments of the present invention expand upon and enhance prior technologies by, among other things, employing WiMax, High Speed Packet Access (HSPA), Evolution for Data Only (EVDO), both considered $3^{rd}$ generation wireless standards, Long Term Evolution (LTE), considered at the time of the invention as a "4G" standard and its derivative standards that are most assuredly to be introduced during the life of this invention, IEEE 802.11 (X) also known as "WiFi" and its derivative standards inclusive of "Multiple Input Multiple Output" (MIMO), as set forth in the communication methodologies hereinabove, a plurality of proprietary mesh and point to point communications solutions or any Internet Protocol (IP)-based load control in a system with the ability to monitor and measure, in real time or in sufficient time increments to satisfy the telemetry performance standards as established by the Government or governing bodies (ex: National Electric Reliability Corporation (NERC), the Federal Energy Reliability Commission (FERC) the amount of power deferred, conserved or removed (or carbon, $SO_2$, or $NO_2$ eliminated), such as by way of example the Kyoto or Copenhagen Protocols that set up carbon credits. These improvements allow new options for electric utilities or any market participant to defer or invest in new power generation that is friendlier to the environment.

IP-based power management is advantageous over existing systems for many reasons. This is particularly true for communications and control that employ Internet Protocol Version 6 (V6) whereby each of the multiplicity of active grid elements, including but not limited to load consuming device (ALC), meter, load control device, programmable thermostat (PCT), building control system or any device utilized for the measurement and control of power, and any supply-related element or device and related sensors and controllers, and their corresponding derivation of PSV and/or PTB for the purpose of power management, whether curtailment or supply, can have its own static IP address, virtual private network with enhanced security, to provide for operating reserves acceptable to the grid regulator, operator, or equivalent. Revenue grade metrology and IP-communication of a unique identifier, such as by way of example and not limitation, a static IP address or dynamically assigned IP address through IP V4 to provide for a unique identifier at that time, for each of the grid elements or device(s), control device(s), the Coordinator, and combinations thereof are critical for the real-time aggregation of PSVs to form at least one PTB corresponding to the load curtailment event. Thus, every piece of hardware having an IMEI (international manufacturer equipment identifier) and electronic serial numbers or MAC address are combinable with IP V6 so that each device has a unique identifier that provides for enhanced security and settlement. Other well established methods of secure transmission include the use of encryption "keys" widely used amongst the transmission of information between two IP based or proprietary solutions for the secure communication of PSVs, PTBs, equipment identifiers, "states", or any other grid stabilizing command, control or status message necessary to implement advanced load curtailment, load resources, or demand response for purposes of creating or aggregating individual load sources, groups of load sources, or any sub increment to create Operating Reserves and other grid stabilizing reserves that improve grid stability and operation. And correspondingly, for all supply availability and/or actual supply provided or introduced to the electric power grid for each active grid element, PSVs and PTBs, are aggregated as power supply sources in groups, or any sub increment to create distributed power supply for introduction at any predetermined attachment points, geographic locations, and combinations thereof, provided that it complies with all requirements, by way of example and not limitation, FERC, NERC, governing authority rules and requirements, etc.

For example, the Coordinator provides for positive control allows a system controller to receive a response from any active grid element at any location following its automatic registration with the electric power grid. Once functioning as intended, the active grid element communicates additional messaging, for example, which indicates that the actual target device has turned "off" or "on", or reduced, as in the case of a variable speed inductive device or a variable power consuming resistive device whereby complete operation is not interrupted but power consumption is reduced to create the operating reserve via curtailment of some but not all of the power from the power consuming device. Correspondingly, for any active grid elements that function as power supply, GSS or SSS elements provide for electric power supply available for introduction through attachment points for the grid. Additionally, each active grid element includes an unique active grid element identifier, which may include an equipment identifier, but which is completely unique to each active grid element. Also, for each active grid element, its IP address is either dynamically assigned when the grid element is registered automatically with the system (e.g., through use of the dynamic host configuration protocol (DHCP)) or statically assigned by the serving IP network, thereby providing enhanced security to protect against an act of random terrorism or sabotage inadvertently shutting down power services. Existing power management systems, including those utilizing radio subsystems that operate in unlicensed and uncontrolled spectrum bands such as the FCC is in bands, do not address security problems adequately and thus are more likely susceptible to hostile or malicious acts. Further embodiments of these active grid element identifiers include the use of MAC addresses, standards based encryption keys, and the normal encryption technologies that are inherent with the use of standards based communications methods such as HSPA, EVDO and LTE where packets are encrypted from the point they leave the radio base station or in some cases the router and even the application layer itself. Further embodiments include Virtual Private Network (VPN) and VPN tunnels that form virtual physical layer connections via an IP transport layer.

The market for electric power forecasts its needs on a predetermined basis, e.g., at least one day ahead of the event for load curtailment or supply request. Load amounts for generation or curtailment are provided for at least one location, geography, BA, and/or attachment point for the grid; also, corresponding pricing for those load amounts, depending upon the timing for the event, are also provided. Standby and clearing of energy supply are provided. These are generally controlled by an energy trader in the market. Allocation is made for regulating reserves, operating reserves, ancillary resources, real-time energy, and combinations thereof. For example a bid is submitted to ERCOT. The status of each active grid element, including load-consuming devices and supply sources is provided through messaging, preferably through the Coordinator; also, the Coordinator provides for information and messaging relating to active grid element or device identification, capacity, status, etc. The Coordinator is the routing, status, capacity, identifier, tracking, and/or control communicator between the multiplicity of active grid elements and the EMS or control server, ASD. By reference to FIG. 8, ALC communicates its status through an ALD, ASD, and/or the Coordinator to the EMS and/or grid operator. The communication occurs through the various methods and components identified herein. The message from the active grid element and/or device, including identification of the element or device, capacity, availability for supply or load curtailment, etc. Significantly, each grid element must be registered with the grid to be activated functionally, to then provide for active grid element functional participation in the grid for the predetermined, intended function of the respective active grid element. In preferred embodiments, this registration occurs through the Coordinator and via IP messaging, and the telemetry is provided as required by the grid for those specific active grid elements, and depending upon their participation, function, and/or role in the grid. For example, telemetry streams at different rates for regulating reserves (real-time or change state every six seconds) and dead band controlled separately by the EMS, through the Coordinator, and for each of the active grid elements, including but not limited to ALD/ASD, controller, etc.

IP-based systems are also bandwidth or network efficient. For example, IP devices are controlled via the 7-layer Open Systems Interconnection (OSI) model whereby the payload of each packet can contain a message or "change in state" or any other message required in the previous embodiments for purposes of stabilizing, statusing and the creation of Operating Reserves for an electric grid or microgrid and does not require synchronous communication. This method of transmission (for example "UDP" communications) allows for very minimum overhead and low data rates on a broadband network. IP Networks can also establish Transport Control Protocol/Internet Protocol (TCP/IP) messaging formats for transport of messaging. For proprietary 'mesh' networks whose bandwidth performance is very poor and an IP message may be encapsulated in a proprietary data packet that may or may not contain encryption, an efficient asynchronous communication method may be the only way to send out a plurality of messages and message type for command and control or status reporting. Additionally, IP devices can report many states that are important to an electric grid operator, market participant. These states supply compliance information necessary for the entity to receive command and control to insure the safe and reliable operation of the grid, but are also necessary for measurement, verification, telemetry, settlement and Power Supply Values (PSVs) to provide the information needed to comply with the grid operator's standards to deliver Operating Reserves or any Demand response products where the end results improve grid stability and will allow the consumer, utility, market participant, REP, CSP etc. to receive monetary compensation for supplying these products as contemplated in FERC Order 745. These commands, including "no power" for outage or for simple demand response compliance measured and verified at the device level, the meter level, the electrical bus level or a plurality of all the above. Furthermore these commands are aggregated and presented to the grid operator or utility so that "many" end points, or active grid elements, can be simultaneously operated as one resource and responsive to an EMS. For example, the active load client 300 may be implemented with a battery backup mechanism to provide backup or auxiliary power to the active load client 300 when AC power is lost. In this case, when battery backup is invoked, the active load client can report a "no power" condition. Alternatively, a "no power" condition may be assumed if an active load client fails to timely respond to a message (e.g., a poll or other message) from the ALD server, particularly where multiple active load clients in a geographic area fail to timely respond to the ALD server messaging or multiple UDP packets receive no acknowledgement. Because the geographic location of each customer premises and active load client may be known at the time of installation or thereafter (e.g., using GPS coordinates), such network outages may be located on a per meter basis, or per load consuming device basis.

A multiplicity of use cases for communications relating to the active grid elements is provided under the systems and methods of the present invention. Messaging under the present invention includes any and all commands, queries, etc. that relate to the profiles of the devices, "health" of the grid, status information, etc. Profiles automatically drive what is started, when, for controlled restart, rather than only controlled restart commanded by the utility; the present invention provides for either the profiles and/or the utility to communicate for command and control, in particular for providing for grid stability and/or supply resource information.

Further embodiment allows the ALD, ASD, and/or Coordinator server to provide prior to the loss of communication or power a set of profiles or commands to be executed at the active grid elements level such that they operate automatically and autonomously providing the operating reserves that the grid operator or utility desires, storing the measurement and verification information for transmittal later, or in the case of a power loss, very precise "re-start" procedures such that the simultaneous impact of a power restoration from a grid operator does not have the adverse effect of overloading the generation and distribution system. These embodiments of a "controlled restart" may also apply to a Customer Profile where the most mission critical devices at a consumer location are prioritized, known to the utility via a Power Supply Value and other load characteristics such as power factor, voltage, current, reactive power or any other grid stabilizing metric that is reported historically by the active grid elements such that the grid operator or the customer can use these autonomous profiles, autonomous active grid elements and memory in same to create "microgrids" that autonomously operate independent of the macro-grid operator and provide grid stabilizing load resources to those consumers that are isolated via the microgrid where other supply sources that can power and operate the microgrid either under the operation of a computer controlled system and apparatus or a separate utility or microgrid operator exists and may operate autonomously until communication with a host ALD or Coordinator is re-established.

One of the most beneficial advantages of an IP-based power management system, as provided in one embodiment of the present invention, is accurate reporting of the actual amount of power available for the creation of Operating Reserves via a distinct PSV value and associated with the active grid elements at the time the reserves are needed, a forecast of Power available via the customer profiles due to a plurality of methods that include known "expected" behavior of customer and load consuming devices, the baseline methods previously described, and the ability to allocate different types of operating reserves based upon the Grid Operator, CSP, MP, Utility, and equivalent's needs at the given condition of the grid as well as power saved by each customer on an individual basis. Embodiments of the present invention monitor and calculate precisely how many kilowatts (or carbon credits) are being generated or saved per each of the active grid elements instead of merely providing an estimate. These values are stored in a Power Supply Value (PSV) associated with the active grid elements, wherein the historical consumption, the real time consumption, the baseline consumption data as provided by standards supplied by the governing body (NAESBY, FERC, NERC) establish the PSV that is used for transmitting via the IP message the information necessary for grid stabilizing operating reserves. Furthermore, embodiments of the present invention provide means for tracking the actual amount of deferred load and pollutants according to generation mix, serving utility and geographic area, and tracking by active grid elements individual contributions. These deferred pollutants are recognized as "Renewable Energy Credits" as exemplified by the recently passed North Carolina Law known as Senate Bill 567, where these PSV derived "Negawatts" count towards a generating and distributing utilities obligations for supplying renewable energy as a percentage of their total generation mix. According to the present invention, if active grid elements have metrics and telemetry that confirm their corresponding curtailment or supply is measured, verified, settled within the parameters established, then utility can accept the supply (aggregated by active grid elements to provide at least one PTB) that would have been available in the case of curtailment event, then renewable energy credits are available to the active grid element(s) level, i.e., megawatts equal renewable energy credits on a per active grid element basis.

The present invention provides systems and methods for managing power supplied over an electric power grid by an electric utility and/or other market participants to multiple active grid elements, each of which having a Power Supply Value (PSV) associated with its energy consumption and/or reduction in consumption. Preferably, according the systems and methods of the present invention, generation of the PSV includes estimating and/or baselining. Furthermore, PSV applications for carbon credits may be geodetically dependent, measured, or computed based upon electricity consumed from a source for each of the active grid elements; for carbon credits, PSV is then based upon fossil fuel electricity eliminated through efficiency, reduction and baselining, provided that the PSV is measurable and verifiable.

The present invention systems, methods, and apparatus embodiments provide for any active grid element (i.e., any grid element following its registration initially with the system) to communicate, in IP format or any proprietary messaging, any message that improves, modifies, enhances, changes, and combinations thereof, the characteristics in memory, ASIC, metrology, location, security, status, change-in-state, and combinations thereof, including PSV, PTB, or other information about participation in activities in the grid, including grid stability enhancement, load curtailment, real-time energy management, supply availability, metrology tables, device assignment, and combinations thereof. More preferably, all messaging, including initial registration for grid elements prior to their activation and transformation into active grid elements, and any updates, are provided between the multiplicity of active grid elements and the Coordinator, and managed from and through the Coordinator for one-to-many communications with the EMS, grid operator, supervisory control and distribution control and automation, transmission control, or any active grid management system.

Power flow from supply sources, whether GSS or SSS, to the grid, and/or power flow through the grid to the power consuming devices is selectively introduced, enabled, reduced and disabled by one or more active grid elements controlled and/or managed by the Coordinator, and measured with PSV and PTB accuracies for each of the active grid elements that are able to be recognized by the governing bodies within revenue grade metrology such that the active grid element(s) becomes in essence a sub-meter with PSV values that can report over the IP connection, preferably through the Coordinator, a plurality of states for any active grid element or device, necessary for grid stability and control over each ALC/ASC via the ALD/ASC such that each distribution point on the grid may be stabilized at each point of the distribution or transmission system to effect grid stabilization holistically rather than reacting to conditions as they occur. Power control messages from a controlling server, preferably communicated through the Coordinator, indicate amounts of electric power to be reduced and/or Operating Reserves to be created, and/or supply to be introduced at predetermined attachment points or location, and an identification of at least one controllable device to be instructed to disable, reduce or consume more a flow of electric power to one or more associated power consuming devices depending on the type of Operating Reserves needed at the time of activation by the ALD through the IP connection to the associated ALC to create the desired Operating Reserve or grid stabilizing reserves. Notably, the power control commands include a power inquiry command requesting the server to determine an amount of electric power available (PSV) for temporary reduction or increase from supply or adding to supply (for example, Auto Reg up for regulating reserves/Reg Down) by a requesting electric utility, market participant or electric power grid operator(s) and wherein the command processor issues an associated power control event message responsive to the power inquiry command, the server further comprising: a database that stores current power usage information for the at least one electric utility or electric power grid operator(s), wherein the event manager (or Coordinator) accesses the utility database responsive to receipt of the associated power control event message and communicates a response to the power inquiry command indicating the amount of power available for temporary reduction based on the current power usage information and the corresponding Power Supply Value (PSV), estimated, derived or generated therefrom, for each of the active grid elements. This polling command also functions as an "alert" to provide the active grid elements via the ALC/ASC to report the PSV, PTB, state, reactive power, voltage, current, or any other grid stabilizing metric to the ALD/ASD such that the ALD/ASD can by electrical bus, by regional transmission organization, by Balancing Authority, by microgrid, by individual consumer or by individual transformer or any other system at any point on the distribution system of the grid or microgrid a plurality of information such that the ALD/ASD/Coordinator can prioritize the order, the type of curtailment, reduction in power or profile to effect to stabilize the grid or microgrid or to supply the utility, REP, market participant, CSP or other an instantaneous and accurate snapshot of the available resource for dispatch and to prepare the active grid elements to look for a priority message delivered via an IP flag or specially formatted message so that the message combined with the Alert has the grid stabilizing effect. Thus, the present invention systems and methods provide for creation of the grid stability product and/or operating reserve; messaging is used for status, grid "health", down to active grid elements level.

In preferred embodiments of the present invention, operating reserve messages are prioritized over network, including over other traffic on the network. Furthermore, priority messaging is further includes so that on standards-based or proprietary communications networks that have sufficient speed, measurement (PSV) and are responsive to an EMS and/or Coordinator that have network priority over other packets, such that emergency and/or critical infrastructure protection power management commands receive priority over any other power control commands, to transmit those messages over other non-critical traffic.

In one embodiment of the present invention, a system for managing power on an electric power grid that is constructed and configured for supplying and receiving power from a multiplicity of sources, where the power flows to a plurality of active grid elements or is generated by a plurality of active grid elements, including power generation and storage solutions, that are enabled and disabled by a plurality of active grid elements including controllable devices, wherein the system includes: a server comprising a command processor operable to receive or initiate power commands and issue power event messages responsive thereto, at least one of the power commands requiring a reduction or increase in an amount of electric power consumed by the plurality of active grid elements functioning as power consuming devices or introduction or availability for introduction of distributed power supply by active grid elements including GSS or SSS; an event manager operable to receive the power control event messages, maintain at least one power management status relating to each client device and issue power control event instructions responsive to the power control event messages that may be initiated from a market participant, a utility, or an electric grid operator; a database for storing, information relating to power consumed by the plurality of power consuming devices and based upon the amount of power to be reduced to each of the power consuming devices or power supply source (GSS or SSS), generating at least one power supply value (PSV) or change in PSV associated with each active grid element, including transmission line losses in proximity associated with the location or attachment or service point of the active grid element; and a client device manager operably coupled to the event manager and the database, the client device manager selecting from the database, based on the information stored in the database, at least one client device to which to issue a power control message indicating at least one of an amount of electric power to be reduced or increased or introduced by distributed supply source, and/or identification of at least one controllable device to be instructed to disable a flow of electric power to one or more associated active grid elements functioning as power consuming devices responsive to receipt of a power control event instruction requiring a reduction in a specified amount of electric power; the plurality of controllable device and corresponding device interfaces facilitating communication of power control instructions to the controllable devices, the power control instructions causing the at least one controllable device to selectively enable and disable a flow of power to the power consuming device(s); and a device control manager operably coupled to the controllable device interfaces for issuing a power control instruction to the controllable devices through the controllable device interfaces, responsive to the received power control message, the power control instruction causing the controllable device(s) to disable a flow of electric power to at least one associated power consuming device for reducing consumed power, and based upon the reduction in consumed power, generating another (at least a second) power supply value (PSV) corresponding to the reduction in consumed power or power supplied or available for supply.

This embodiment may further include a combination of a processor, database, event manager, preferences manager and market conditions to include price of electric power, grid stabilization events and location of customer relative to the grid operator's generation, transmission, and distribution elements would effect a change on the electric grid by a change in the power consuming devices utilizes some or all of the information provided by the grid operator, market participant, or utility to automatically or manually through a plurality of communications methods (smart phone, tablet computer, computer, text response, phone message) elect to curtail or consume power to effect a change to the normal operation of a plurality of active grid elements in exchange for credits, economic/monetary incentives, rewards programs, or carbon/green credits. This provides that active grid elements receives a real time or near real time signal from a grid operator that alerts them to an economic event that would allow them to make substantial compensation for curtailing or accepting power at that minimum time interval for both reporting and responding as established by the governing entity. This is real-time pricing for grid stress/stabilization or very high commodity pricing.

Preferably, market pricing conditions via a customer profile that can be loaded to a smart phone, tablet, or any web-enabled appliance for accepting or modifying a profile or moreover a profile that automated controls based upon previously selected economic messages.

One embodiment of the present invention active grid elements and their registration is applied to controlling power distribution for a variety of electric utility companies, market participant (MP) or any other electric power grid operator(s) by actively monitoring the amount of power needed by each MP and supplying the required power by redirecting power from participating customers. In this embodiment, customers agree to allow the power management system to disable certain power-consuming devices during peak loading times of the day. In one example for active grid elements, smart breakers, load control switches (submetering ALCs) or any other device that can be interfaced or added within an electric consuming device or added at the point where the electric consuming devices receives power from a wall socket or any other electrical connection which have the ability to be switched on or off remotely, are installed for specific devices in an electric service control panel accessed by a known IP address following the initial registration of the grid elements. Alternatively, IP-addressable smart appliances may be used. The power management system determines the amount of steady-state power each device consumes when turned on and logs the information in a database for each subscriber. For example, a current sensor on each smart appliance or within each smart breaker or power measurement circuit that is incorporated in the device that serves as a de-facto ALC with metrology sufficient to be accepted as a PSV for aggregation to the ALD for the creation of Operating Reserves may measure the amount of current consumed by each monitored device. An active load client then multiplies the amount of current consumed by the operating voltage of the device to obtain the power consumption, and transmits the power consumption to the ALD server. When the serving utility needs more power than it is currently able to supply, the power load management system automatically adjusts the power distribution by turning off or reducing specific loads on an individual device or subscriber basis. Because the amount of power consumed by each specific load is known via the PSV and aggregated via the PBT, the system can determine precisely which loads to turn off or reduce and tracks the power savings generated by each customer as a result of this short-term outage.

Furthermore, based upon the reduction in consumed power, the systems and methods of the present invention provide for generating at the control center a power supply value (PSV) corresponding to the reduction in consumed power by the power consuming device(s). Importantly, the PSV is an actual value that includes measurement and verification of the reduction in consumed power; such measurement and verification methods may be determined by the appropriate governing body or authority for the electric power grid(s). Power Supply Value (PSV) is calculated at the meter or submeter or at building control system or at any device or controller that measures power within the standard as supplied by the regulatory body(ies) that govern the regulation of the grid. PSV variations may depend on operating tolerances, operating standard for accuracy of the measurement. PSV further includes forecasting, statistical sampling, baselining, and combinations thereof. The PSV enables transformation of curtailment or reduction in power at the device level by any system that sends or receives an IP message to be related to or equated to supply as presented to the governing entity that accepts these values and award supply equivalence, for example of a power generating entity or an entity allowed to control power consuming devices as permitted by the governing body of the electric power grid, e.g., FERC, NERC, etc.

PSV may be provided in units of capacity, demand, electrical power flow, time, monetary equivalent, energy and combinations thereof. Thus, the PSV provides an actual value that is confirmed by measurement and/or verification, thereby providing for a curtailment value as a requirement for providing supply to the power grid, wherein the supply to the power electric power grid is provided for grid stability, voltage stability, reliability, and combinations thereof, and is further provided as responsive to an energy management system or equivalent for providing grid stability, reliability, frequency as determined by governing authority for the electric power grid and/or grid operator(s).

Figure 18:
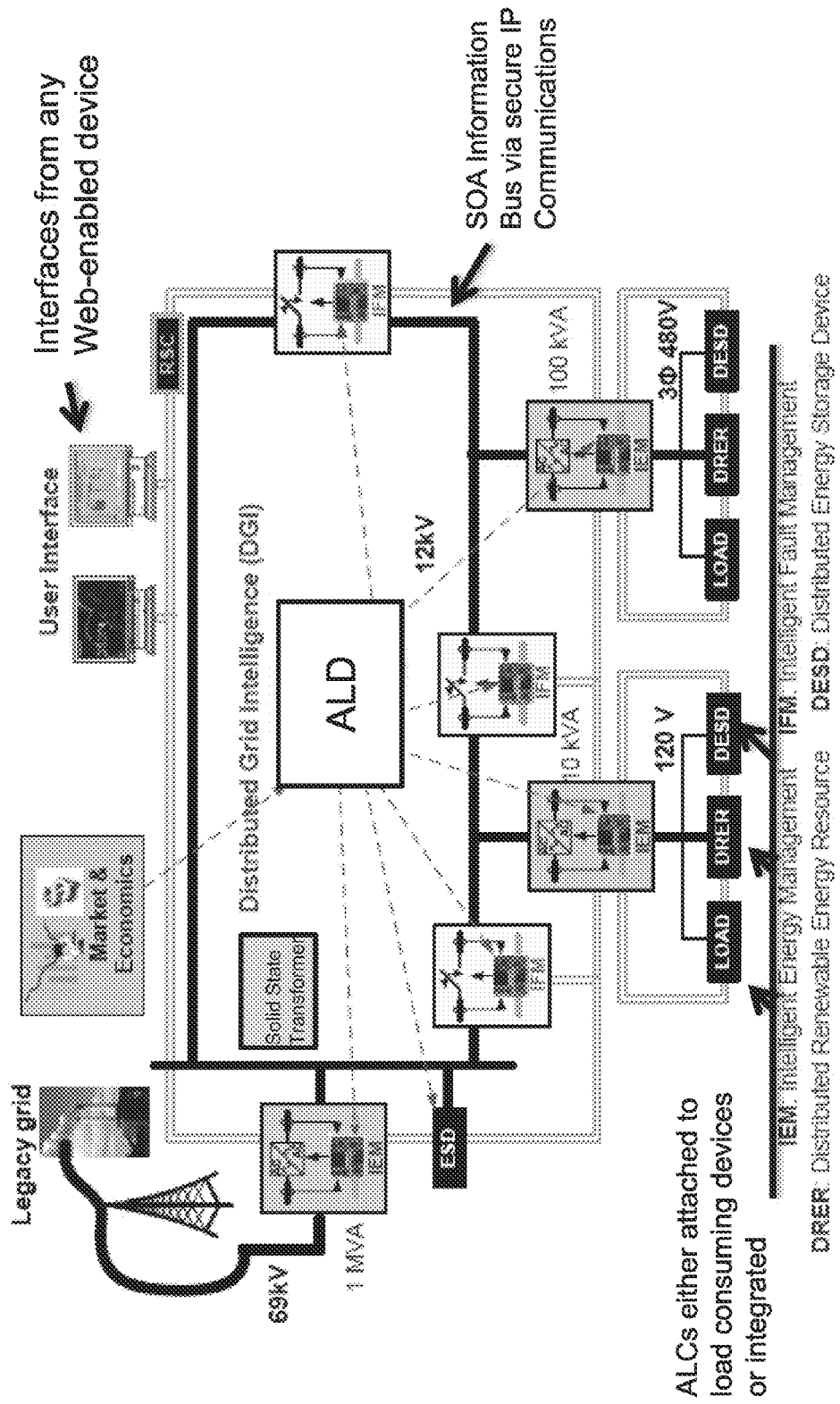
FIG. 18 is a schematic diagram illustrating components including ALD, ALC, and IP communications for distributed grid intelligence within systems of the present invention.

The present invention can be more readily understood with reference to the Figures. FIG. 18 provides a schematic diagram illustrating active grid elements including ALD, ALC, and IP communications for distributed grid intelligence within systems of the present invention.

Figure 19:
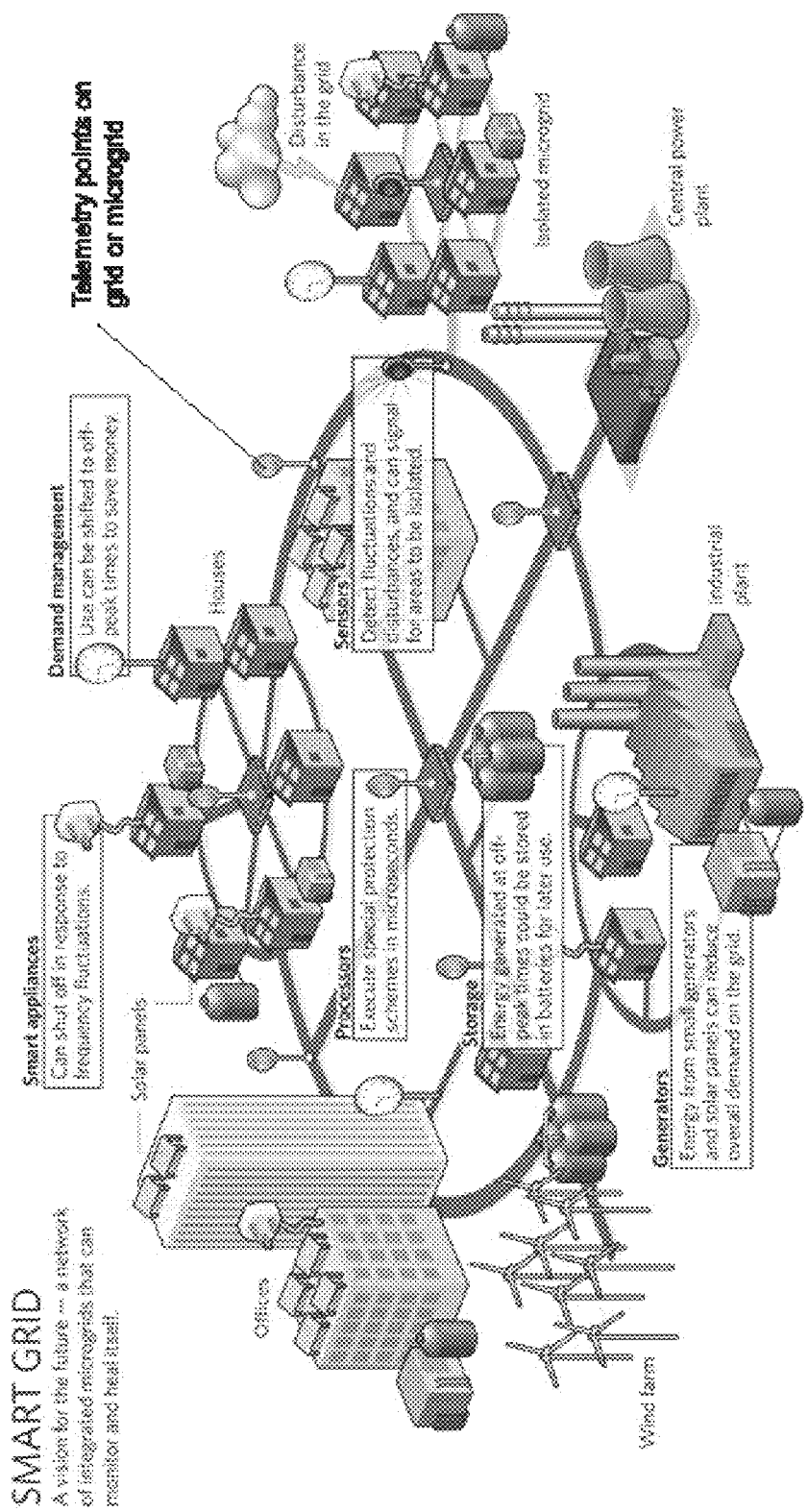
FIG. 19 is a schematic diagram that illustrates smart grid with decentralized networks according to systems and methods of the present invention.
Figure 20:
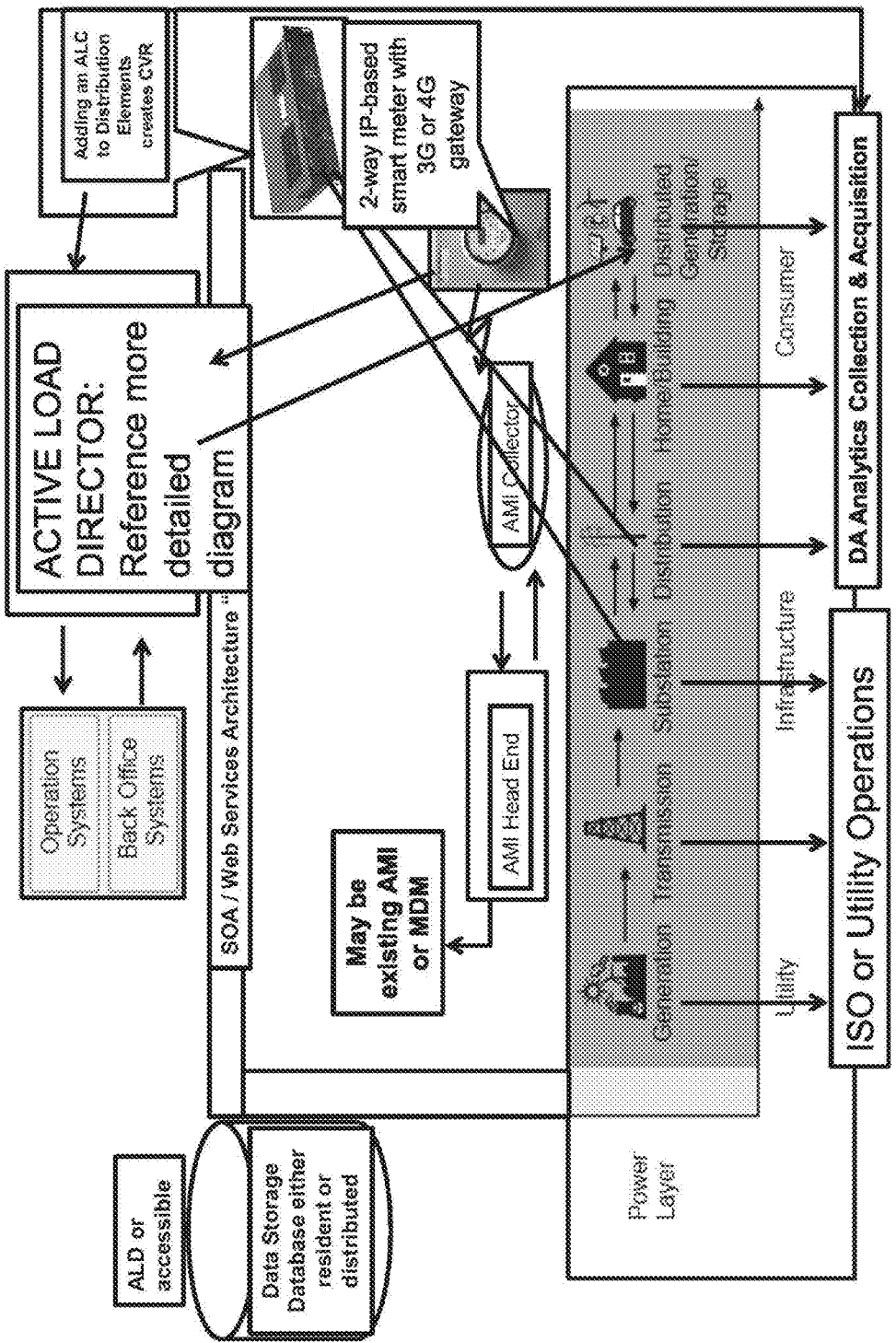
FIG. 20 is another schematic diagram that illustrates smart grid with decentralized networks according to systems and methods of the present invention.
Figure 21:
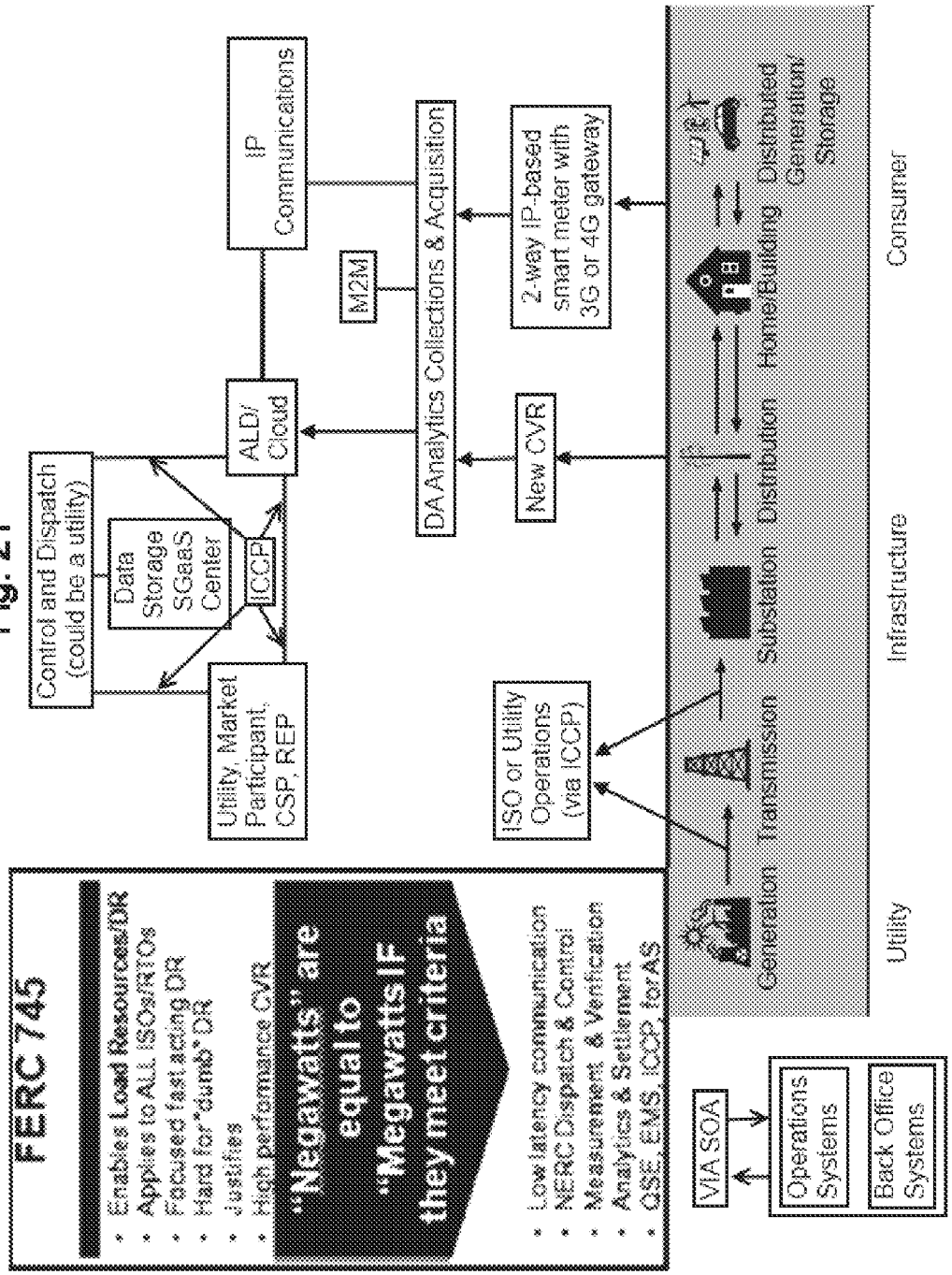
FIG. 21 is yet another schematic diagram that illustrates smart grid with decentralized networks according to systems and methods of the present invention.

Smart grid configurations including active grid elements are preferred under systems and methods of the present invention. By way of example, consider embodiments in FIGS. 19-21, which provide schematic diagrams that illustrate active grid elements within smart grid with decentralized networks according to systems and methods of the present invention.

Figure 22:
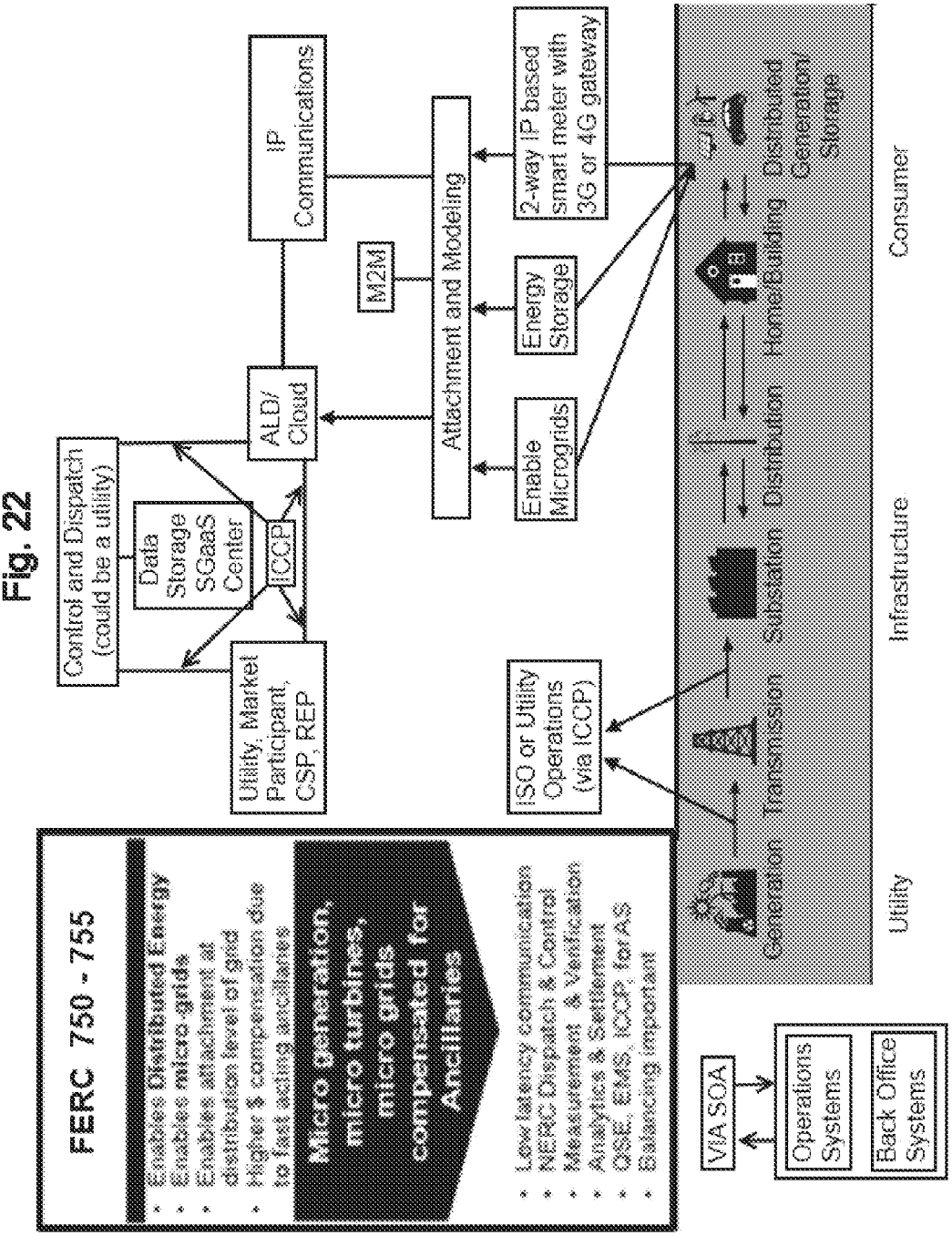
FIG. 22 shows a schematic diagram for supply from utility, market participant, CSP, and/or REP, ALD/cloud layer, ICCP, control and dispatch, and micro-grid enablement according to systems and methods of the present invention.

FIG. 22 shows a schematic diagram for supply from utility, market participant, CSP, and/or REP, ALD/cloud layer, ICCP, control and dispatch, and micro-grid enablement according to systems and methods of the present invention.

Figure 23:
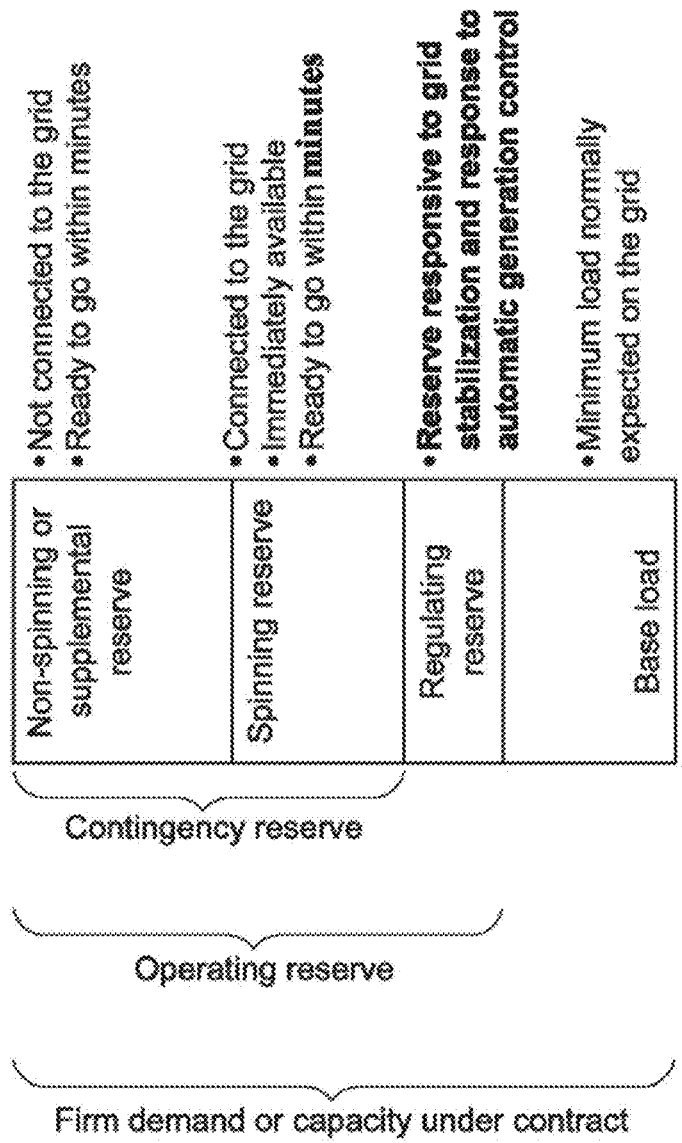
FIG. 23 is a graphic illustration of operating reserves categories and base load.
Figure 24:
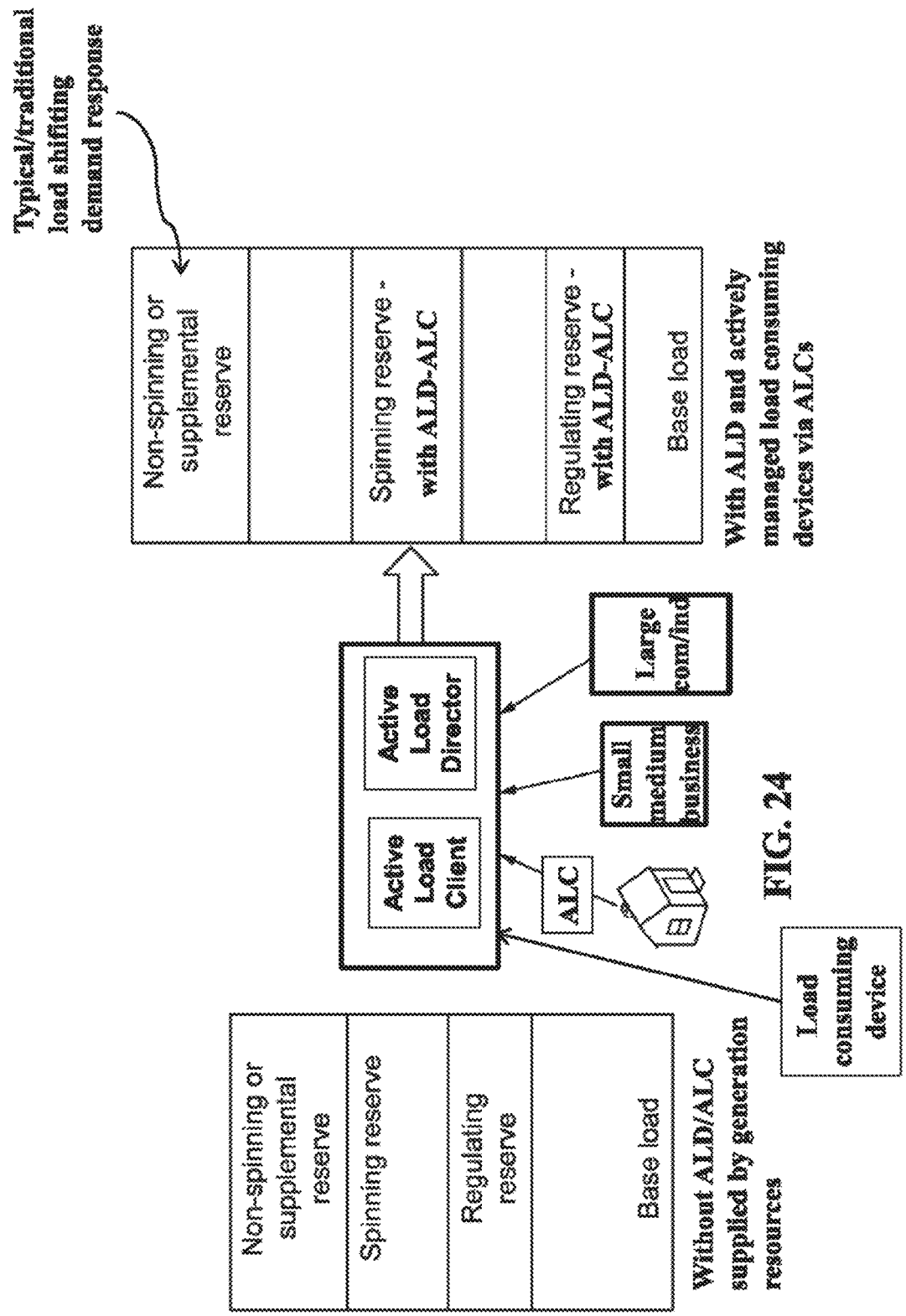
FIG. 24 is a schematic diagram representing operating reserves for supply side generation of electric power for a grid, active load director (ALD), active load client (ALC), power consuming devices, and other components of the systems and methods of the present invention for generating operating reserves of different categories.

As set forth hereinabove, the present invention provides systems and methods for generating operating reserves for an electric power grid. Correspondingly, FIG. 23 provides a graphic illustration of operating reserves categories and base load; FIG. 24 is a schematic diagram representing operating reserves for supply side generation of electric power for a grid, active grid elements, including ALD, ALC, power consuming devices, and other components of the systems and methods of the present invention for generating operating reserves of different categories.

Figure 25:
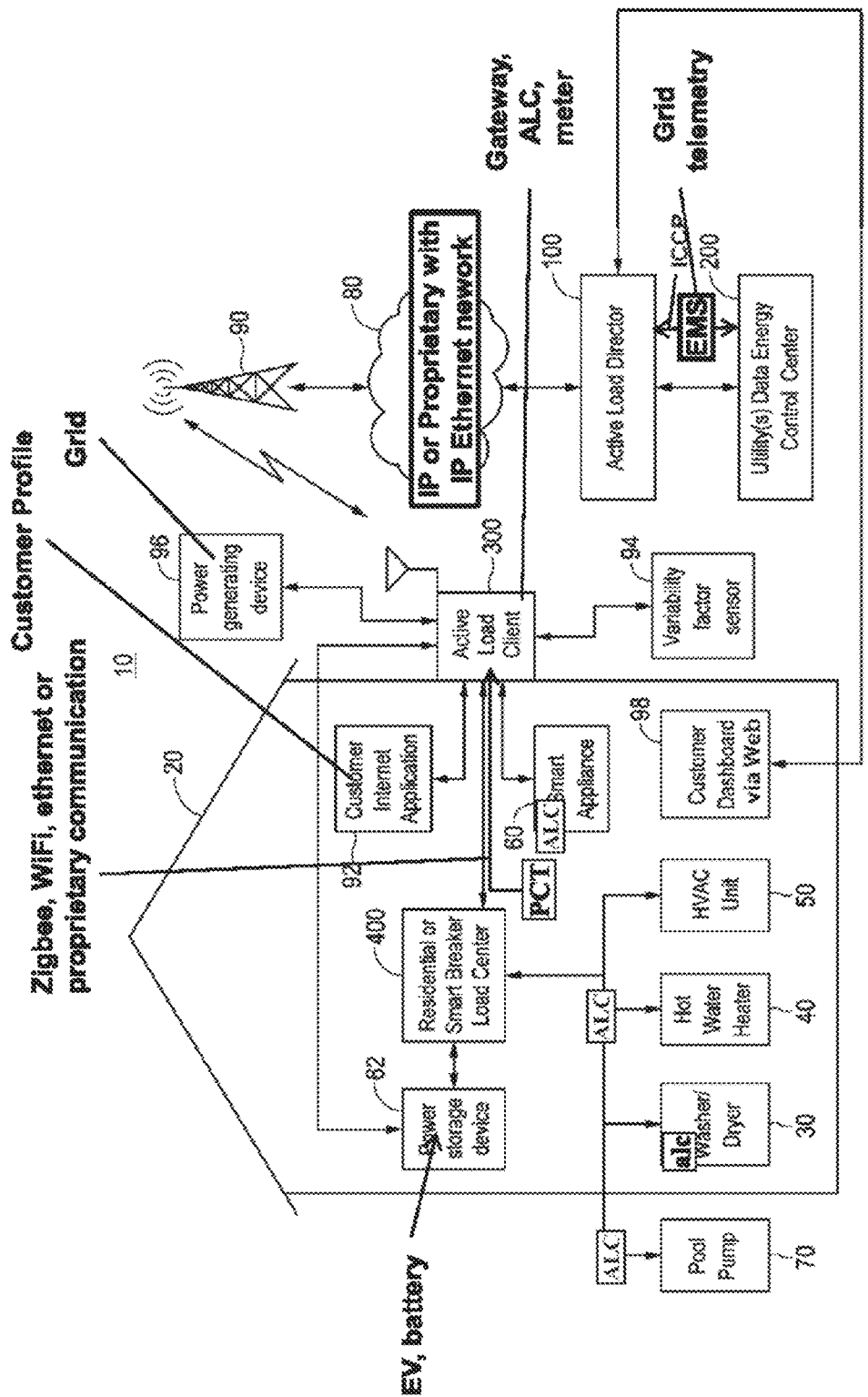
FIG. 25 is a schematic diagram showing one embodiment of the present invention including power consuming devices, control devices, ALC, ALD, customer profile, IP communication network, and grid telemetry components of systems and methods of the present invention.

FIG. 25 is a schematic diagram showing one embodiment of the present invention with active grid elements, including power consuming devices, control devices, ALC, ALD, customer profile, IP communication network, and grid telemetry components of systems and methods of the present invention.

Figure 26:
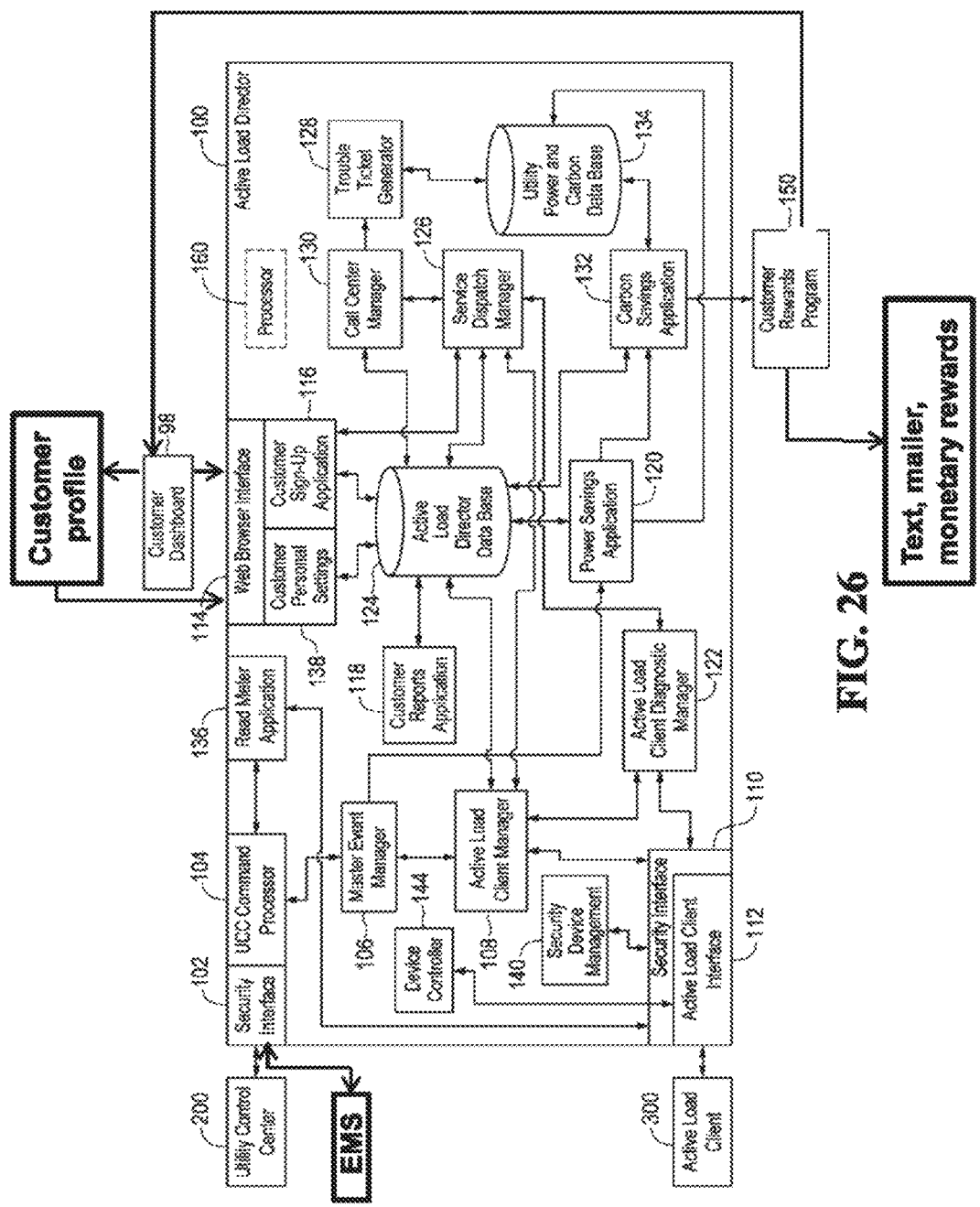
FIG. 26 is a schematic diagram showing one embodiment of the present invention including energy management system (EMS), power consuming devices, control devices, ALC, ALD, customer profile, IP communication network, and grid telemetry components of systems and methods of the present invention.
Figure 27:
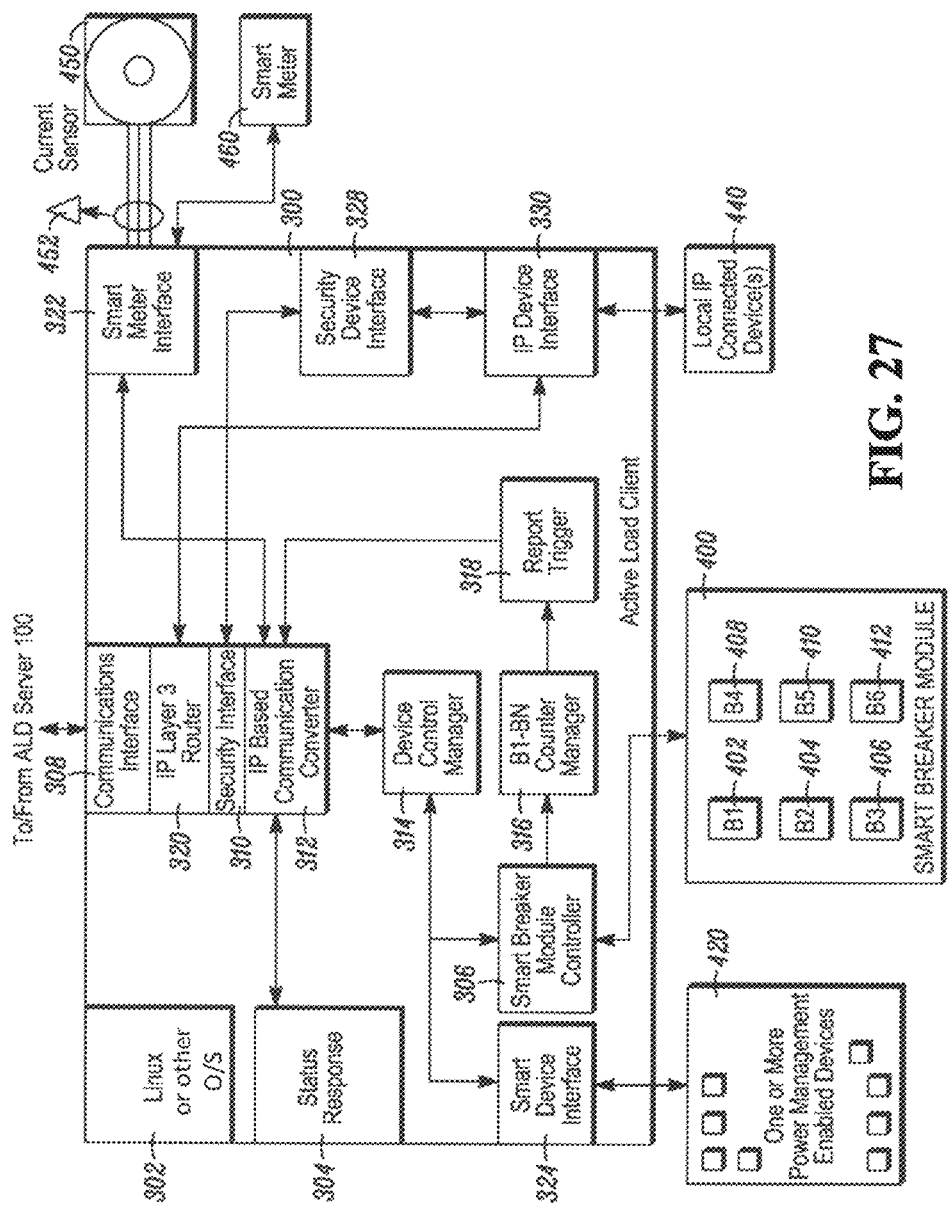
FIG. 27 is a schematic diagram showing one embodiment of the present invention including EMS, power consuming devices, control devices, ALC, ALD, customer profile, IP communication network, and grid telemetry components of systems and methods of the present invention.

FIG. 26 is a schematic diagram showing one embodiment of the present invention with active grid elements including EMS, power consuming devices, control devices, ALC, ALD, customer profile, IP communication network, and grid telemetry components of systems and methods of the present invention. In another illustration, FIG. 27 shows a schematic diagram for one embodiment of the present invention with active grid elements including EMS, power consuming devices, control devices, ALC, ALD, customer profile, IP communication network, and grid telemetry components of systems and methods of the present invention.

Figure 29:
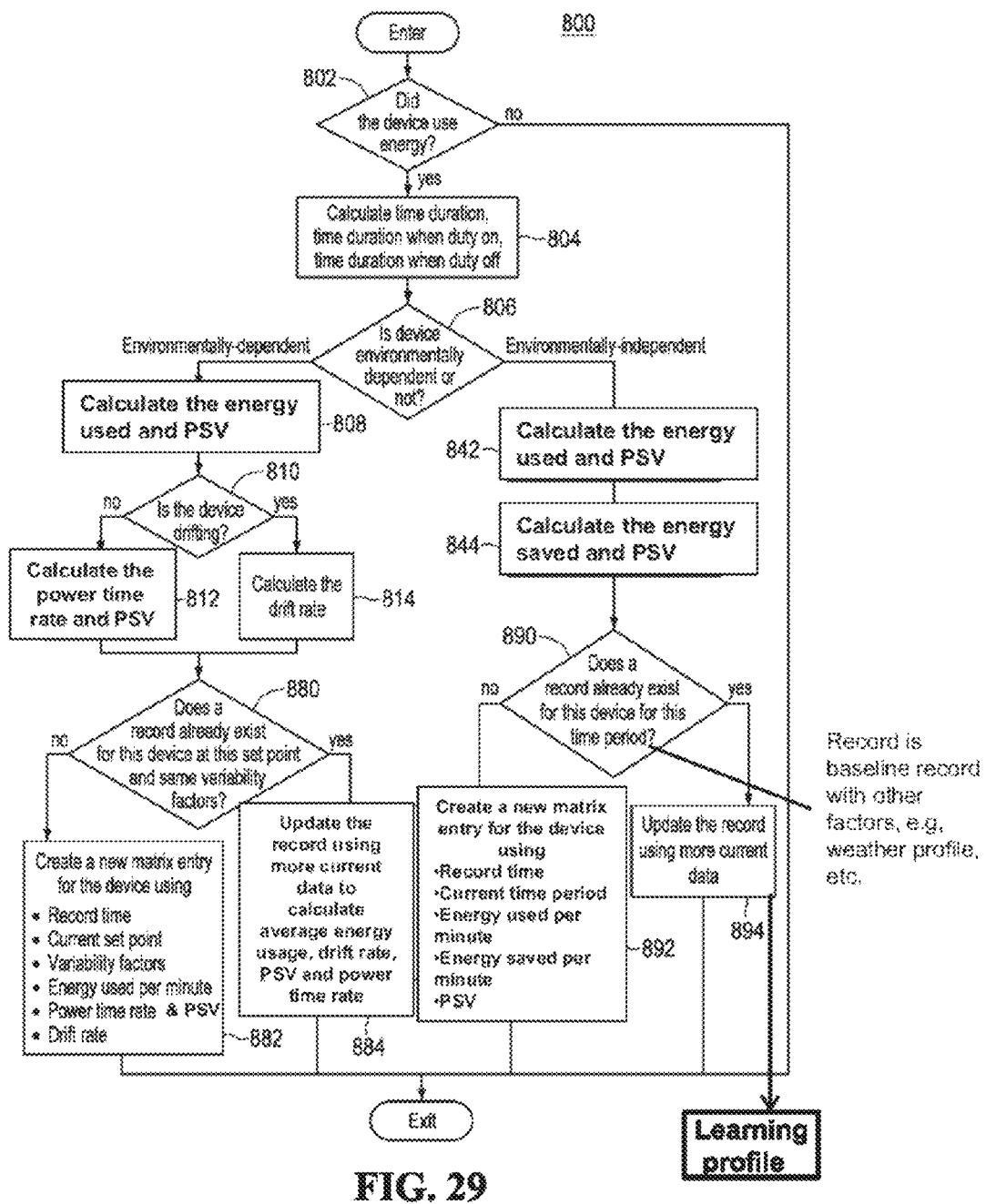
FIG. 29 is a flow diagram illustrating method steps for energy consuming devices and the generation of power supply value (PSV) according to embodiments of the present invention, including learning profile.
Figure 30:
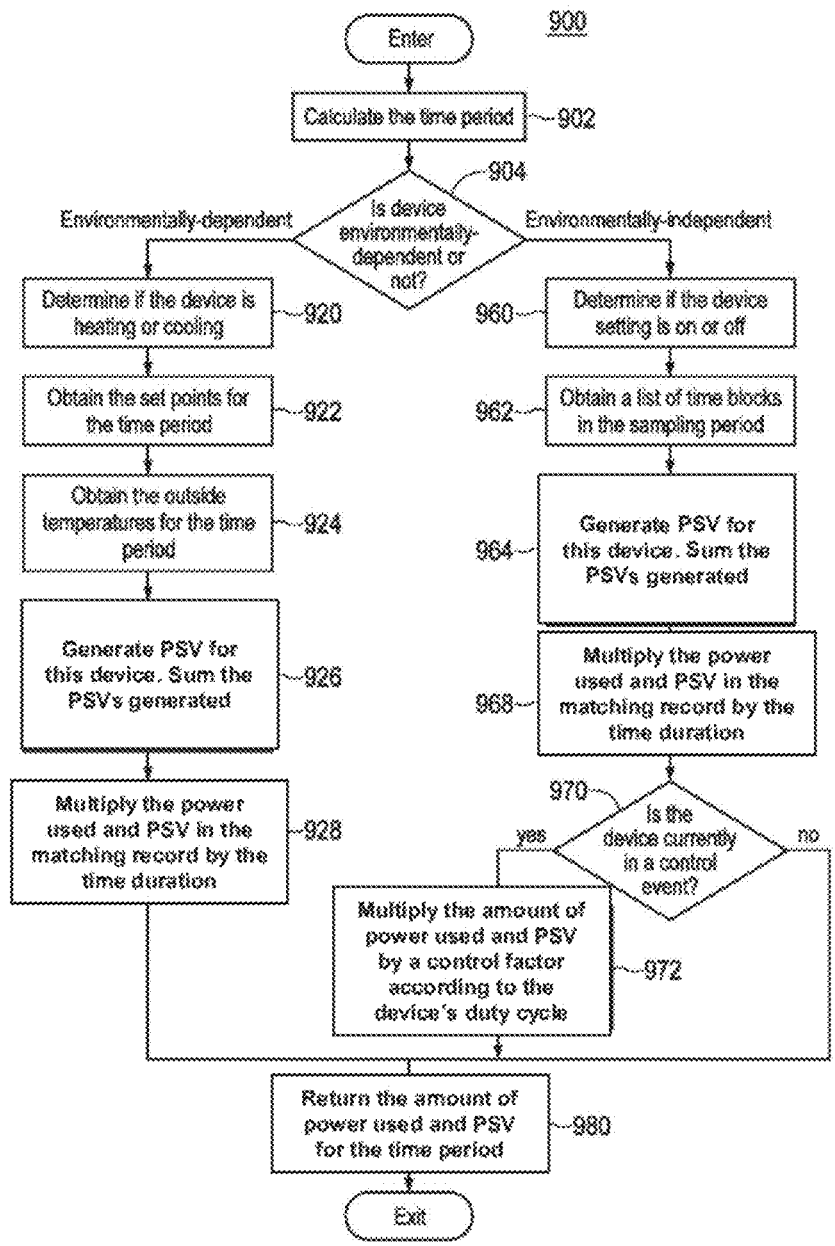
FIG. 30 is a flow diagram for methods of the present invention for calculating the time period for environmentally dependent and independent devices and determining or generating power supply value (PSV) for those power-consuming devices.

FIG. 28 is a table of consumer-adjustable parameters as examples for systems and methods components according to the present invention. FIG. 29 is a flow diagram illustrating method steps for energy-consuming devices and the generation of power supply value (PSV) for those devices, according to embodiments of the present invention, including learning profile. Furthermore, FIG. 30 shows a flow diagram for methods of the present invention for calculating the time period for environmentally dependent and independent devices and determining or generating power supply value (PSV) for those power-consuming devices.

Figure 31:
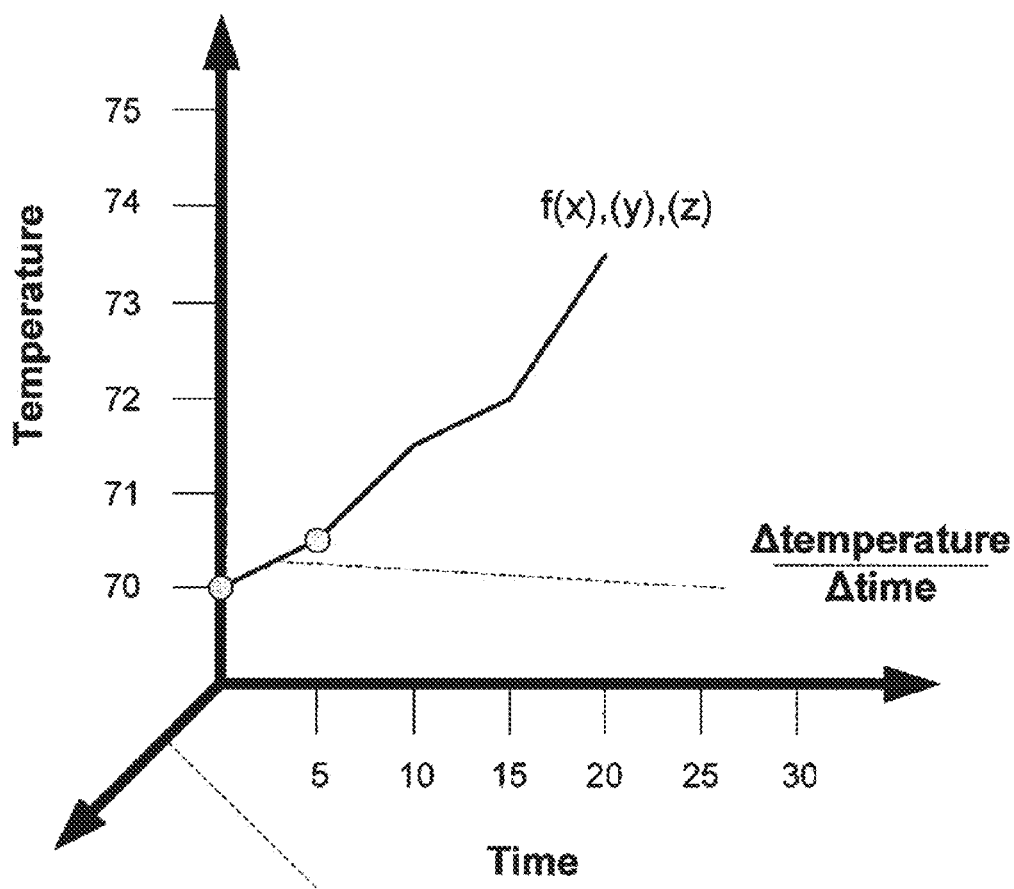
FIG. 31 is a graph showing at least three (3) dimensions for factors associated with load consumption and devices managing temperature control for corresponding power consuming devices, including the change in factors over time.
Figure 32:
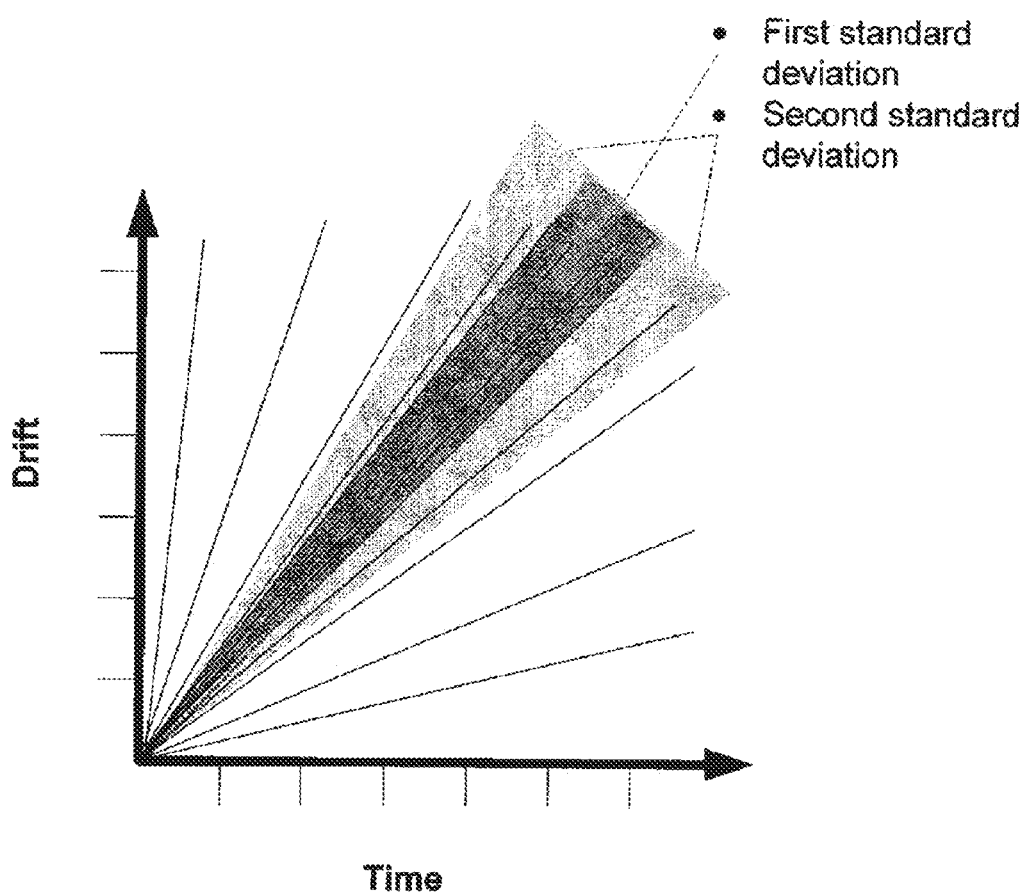
FIG. 32 is a graph showing first, second, and additional standard deviations of for the chart of drift versus time, for use with the systems and methods of the present invention.

By way of example, for active grid elements that function for temperature or environmental-factor controlling devices as power consuming devices, FIG. 31 provides a graph showing at least three (3) dimensions for factors associated with load consumption and devices managing temperature control for corresponding power consuming devices, including the change in factors over time. FIG. 32 is a graph showing first, second, and additional standard deviations of for the chart of drift versus time, for use with the systems and methods of the present invention. When active grid elements, including the coordinator and/or ALD is automatically considering load curtailment, preferably a search algorithm provides the most load against the least amount of consumers impacted. Based upon the thermal drift of structures, additional structures are identified and selected, to provide required curtailment for grid stability. Each structure has its own factors, as illustrated in FIG. 31. Thus, the ALD selects and provides instructions to the ALCs and/or power consuming devices based upon profiles and attributes. Alternatively, least-cost algorithms may be used by the coordinator for determining communications routing and energy routing through the active grid elements registered and updated within the systems and methods of the present invention.

Preferably, the system stores in memory on the server computer associated with the database for storing information relating to the energy management system and its various active grid elements, as described in the specification, e.g., identification of the last power consuming device(s) used for satisfying a load curtailment event, and automatically shifts their categorization for the ALD for purposes of selection for the next curtailment event.

Figure 33:
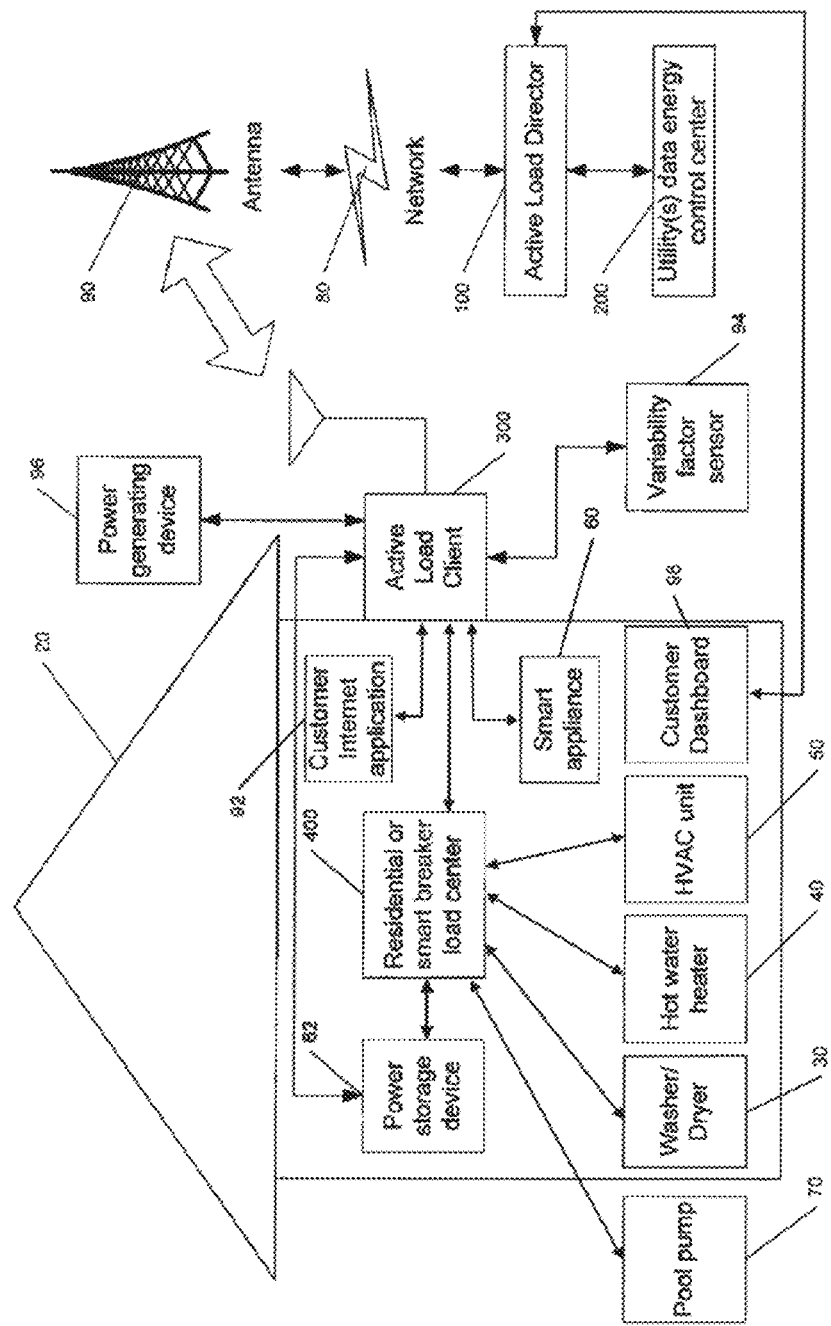
FIG. 33 is a schematic diagram illustrating exemplary IP-based active power management system in accordance with one embodiment of the present invention.

FIG. 33 depicts an exemplary IP-based active power management system 10 in accordance with one embodiment of the present invention. The exemplary power management system 10 monitors and manages power distribution to a multiplicity of active grid elements via a coordinator and/or an active load director (ALD) server 100 connected between one or more utility control centers (UCCs) 200 (one shown) and one or more active load clients (ALCs) 300 (one shown). The ALD server 100 may communicate with the utility control center 200 and each active load client 300 either directly or through a network 80 using the Internet Protocol (IP) or any other connection-based protocols. For example, the ALD server 100 may communicate using RF systems operating via one or more base stations 90 (one shown) using one or more wireless communication protocols, such as Global System for Mobile communications (GSM), Enhanced Data GSM Environment (EDGE), High Speed Packet Access (HSDPA), Time Division Multiple Access (TDMA), or Code Division Multiple Access data standards, including CDMA 2000, CDMA Revision A, and CDMA Revision B. Alternatively, or additionally, the ALD server 100 may communicate via a digital subscriber line (DSL) capable connection, cable television based IP capable connection, or any combination thereof. In the exemplary embodiment shown, the ALD server 100 communicates with one or more active load clients (ALCs) 300 using a combination of traditional IP-based communication (e.g., over a trunked line) to a base station 90 and a wireless channel implementing the WiMax protocol for the "last mile" from the base station 90 to the active load client 300.

Each active grid element 300 is accessible through a specified address (e.g., IP address), and for the case of ALCs, each one controls and monitors the state of other active grid elements associated with them, for example, individual smart breaker modules or intelligent appliances 60 installed in the business or residence 20 to which the ALC 300 is associated (e.g., connected or supporting). Each ALC 300 is associated with a single residential or commercial customer. In one embodiment, the ALC 300 communicates with a residential load center 400 that contains smart breaker modules, which are able to switch from an "ON" (active) state to an "OFF" (inactive), and vice versa, responsive to signaling from the ALC 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance and may be embedded in circuits or individual appliances or appliance controls or appliance control devices, whether internal to the device housing, or external thereto (e.g., a washer/dryer 30, a hot water heater 40, an HVAC unit 50, or a pool pump 70).

Additionally, the ALC 300 may control other active grid elements, e.g., individual smart appliances, directly (e.g., without communicating with the residential load center 300) via one or more of a variety of known communication protocols (e.g., IP, Broadband over PowerLine (BPL) in its various forms, including through specifications promulgated or being developed by the HOMEPLUG Powerline Alliance and the IEEE, Ethernet, Bluetooth, ZigBee, Wi-Fi, WiMax, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off). All of these various active grid elements are automatically managed and provide for automatic messaging with the Coordinator and/or other active grid elements with which they are associated, as described herein.

There are several types of messages that the active grid elements (for example, an ALC manager 108) may receive from a coordinator and process accordingly. By way of example and not limitation, a security alert message, a priority message, a report trigger message, a status response message, a status update message, a power savings message, and combinations thereof. A security alert message originates from an optional security or safety monitoring system installed in the residence or business and coupled to the active grid element(s) (e.g., wirelessly or via a wired connection). When a security alert message is received by the Coordinator, it accesses the database to obtain routing information for determining where to send the alert, and then sends the alert as directed to those active grid elements affected or associated with the alert messaging. For example, the Coordinator may be programmed to send the alert or another message (e.g., IP-based message, an electronic mail message, a pre-recorded voice message, and combinations thereof) to a security monitoring service company and/or the owner of the residence or business.

A report trigger message alerts the Coordinator that a predetermined amount of power, PSV, PTB, and combinations thereof has been consumed by a specific device monitored by an active grid element. When a report trigger message is received from the active grid element(s), the Coordinator logs the information contained in the message in the database for the active grid element(s) associated with the information supplied. The power consumption information, including PSV, PTB, and combinations thereof, is then used by the Coordinator to determine the active grid elements (ALDs/ALCs) to which to send a power reduction or "Cut" or reduce message during a power reduction event to satisfy the operating reserve requirement.

A status response message reports the type and status of each active grid element in communication with the Coordinator. When a status response message is received from an active grid element, the Coordinator automatically logs the information contained in the message in the database.

In another embodiment, a power savings message and/or application may be optionally included to calculate the total amount of power saved by each utility or market participant during a power reduction event (referred to herein as a "Cut event" or "reduce event"), as well as the amount of power saved, PSV, PTB, and combinations for each active grid element that reduced the amount of power delivered, PSV, PTB, and combinations thereof, and matched against a baseline associated with that active grid element. The power savings application 120 accesses the data stored in the database 124 for each customer serviced by a particular utility and stores the total cumulative power savings, or PSV (e.g., in megawatts per hour, or kWH/MWH) aggregated by participating active grid elements and/or accumulated by each utility for each Cut or reduce event, i.e., curtailment or load control event, in which the active grid elements and/or utility participated as an entry in the database.

Figure 34:
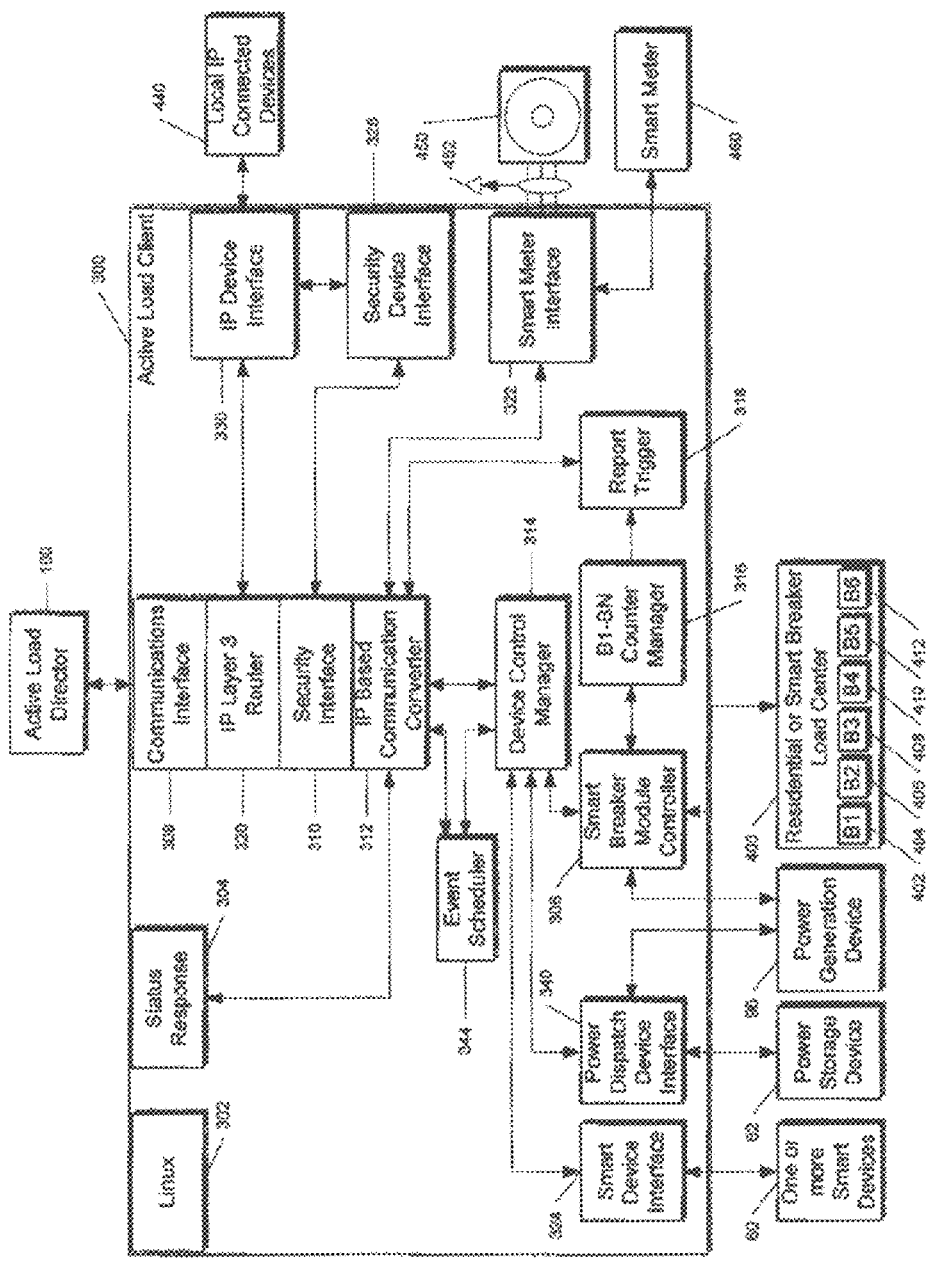
FIG. 34 is a schematic diagram illustrating a schematic diagram of an exemplary active load client in accordance with one embodiment of the present invention.

FIG. 34 illustrates a schematic diagram of an exemplary active load client 300 in accordance with one embodiment of the present invention. The depicted active grid element (here functioning as an active load client (ALC) 300) includes a Linux-based operating system 302, a status response generator 304, a smart breaker module controller 306, a smart device interface 324, a communications interface 308, a security interface 310, an IP-based communication converter 312, a device control manager 314, a smart breaker (B1-BN) counter manager 316, a report trigger application 318, an IP router 320, a smart meter interface 322, a security device interface 328, and an IP device interface 330. The active grid element as ALC, in this embodiment, is a computer or processor-based system located on-site at a customer's residence or business. The primary function of the active grid elements/ALCs is to manage the power load levels of controllable devices located at the residence or business, which the active load client 300 oversees on behalf of the customer. In an exemplary embodiment, the software running on the active grid element operates using the Linux embedded operating system 302 to manage the hardware and the general software environment. One skilled in the art will readily recognize that other operating systems, such as Microsoft's family of operating systems, Mac OS, and Sun OS, C++, machine language, among others, may be alternatively used. Additionally, the active load client 300 may include DHCP client functionality to enable the active grid elements to dynamically request IP addresses for themselves and/or one or more controllable devices 402-412, 420, 460 (which may be other active grid element s) associated therewith and/or managed thereby from a DHCP server on the host IP network facilitating communications between the active load client 300 and the ALD server 100. The active grid element may further include router functionality and maintain a routing table of assigned IP addresses in a memory of the active grid element to facilitate delivery of messages from the active grid elements to the controllable devices 402-412, 420, 460 and/or also for messaging via the network with the Coordinator.

A communications interface 308 facilitates connectivity between the active grid elements and the Coordinator(s), which may also include ALDs/ASDs. Communication between the active grid elements and the Coordinator and/or server and/or processor coupled with memory (functioning as server) may be based on any type of IP or other connection protocol, including but not limited to, the WiMax protocol, and equivalents or alternatives, as discussed in the foregoing. Thus, the communications interface 308 may be a wired or wireless modem, a wireless access point, or other appropriate interface for any and all of the active grid elements.

A standard IP Layer-3 router 320 routes messages received by the communications interface 308 to both the active grid element sand to any other locally connected devices 440, which may include other active grid elements that are registered with the system and/or energy router (coordinator). The router 320 and/or coordinator including routing functions determines if a received message is directed to the active grid element and, if so, passes the message to a security interface 310 to be decrypted (if encrypted messaging). The security interface 310 provides protection for the contents of the messages exchanged between the Coordinator, server, and the active grid elements. The message content is encrypted and decrypted by the security interface 310 using, for example, a symmetric encryption key composed of a combination of the IP address and GPS data for the active grid elements or any other combination of known information. If the message is not directed to the active grid elements, then it is passed to the IP device interface 330 for delivery to one or more locally connected active grid elements, as determined by the coordinator. For example, the IP router 320 may be programmed to route power management system messages (including any type of messaging relevant to the active grid elements) as well as conventional Internet messages. In such a case, the active grid elements and Coordinator(s) may function as a gateway for Internet service supplied to the residence or business, or to other active grid elements, instead of using separate Internet gateways or routers.

An IP based communication converter 312 opens incoming messages from the server and/or Coordinator and directs them to the appropriate function within the designated active grid elements. The converter 312 also receives messages from various active grid element functions (e.g., a device control manager 314, a status response generator 304, and a report trigger application 318), packages the messages in the form expected by the Coordinator and/or server 100, and then passes them on to the security interface 310 for encryption.

The Coordinator routes and/or processes power management commands and/or command messages for various active grid elements logically connected. The active grid elements may include, by way of example and not limitation, smart breakers, smart meters, load control appliances, building control systems, and the like, 402-412 or other IP-based devices 420, such as smart appliances with individual control modules (not shown). Preferably, the Coordinator also processes "Query Request" or equivalent commands or messages from the server by querying a status response generator (which may be included within the Coordinator processing and/or database associated therewith) which maintains the type and status of each active grid element associated with the Coordinator, and providing the statuses to the server and/or database for retention, analysis, and other processing or reporting. The "Query Request" message may include information other than mere status requests, including settings for active grid elements, by way of example and not limitation, such as temperature set points for thermally controlled devices, time intervals during which load control is permitted or prohibited, dates during which load control is permitted or prohibited, and priorities of device control (e.g., during a power reduction event, hot water heater and pool pump are turned off before HVAC unit is turned off), PSV, PTB, and/or combinations thereof.

The Coordinator messaging with the active grid elements also preferably includes status response generator 304 that receives status messages from the server and, responsive thereto, polls each active grid element and/or controllable device 402-412, 420, 460 to determine whether they are functioning and in good operational order. Each active grid element responds to the polls with operational information (e.g., activity status and/or error reports) in a status response message. The Coordinator stores the status responses in a memory (or routes them to the database for storage) associated with the status response generator for reference in connection with power management events for supply and/or load curtailment.

Preferably, the Coordinator and each of the active grid elements further includes a smart device interface 324 that facilitates IP or other address-based communications with and from individual active grid elements 420 (e.g., smart appliance power control modules). The connectivity can be through one of several different types of networks, including but not limited to, BPL, ZigBee, Wi-Fi, Bluetooth, or direct Ethernet communications. Thus, the smart device interface 324 is a modem adapted for use in or on the network connecting the active grid elements with other active grid elements, including smart devices and appliances. The smart device interface 324 also allows the Coordinator to manage those devices that have the capability to sense temperature settings and respond to temperature variations.

By way of describing another embodiment, all active grid elements, including but not limited to smart breakers, smart meters, load control appliances, building control systems, and the like, module controller 306 formats, sends, and receives messages, including power control, PSV, PTB, and/or combinations thereof, instructions, to and from the smart breaker module 400. In one embodiment, the communications is preferably through a BPL connection. In such embodiment, the smart breaker module controller 306 includes a BPL modem and operations software. The smart breaker module 400 contains individual smart breakers, smart meters, load control appliances, building control systems, and the like, 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power or PSV, PTB, and/or combinations used by each smart breaker 402-412 and stores the counted amounts of power in a memory of the active load client 300 associated with the counter manager 316. When the counter for any breaker 402-412 reaches a predetermined limit, the counter manager 316 provides an identification number corresponding to the smart breaker 402-412 and the corresponding amount of power (power number), PSV, PTB, and combinations thereof, to the report trigger application 318. Once the information is passed to the report trigger application 318, the counter manager 316 resets the counter for the applicable breaker 402-412 to zero so that information can once again be collected. The report trigger application 318 then creates a reporting message containing identification information for the active load client 300, identification information for the particular smart breaker 402-412, and the power number, and sends the report to the IP based communication converter 312 for transmission to the server 100.

Preferably, the systems and methods of the present invention provide for automated remote updating of active grid elements via communications through the network with the Coordinator(s), including but not limited to software, firmware, chipsets, kernels, and combinations thereof. Updating through the Coordinator(s) and/or central server, and/or dedicated server for updating active grid elements is provided by the present invention. Also, commands are sent for purposes for updating any and all attributes of the active grid elements, including PSV, and/or PTB by a central and/or remote device or server, or processor, meant to enhance for update PSV, PTB, or location of PTB server point ASIC within an IP message or proprietary message that deal with table spaces, pricing, changes in acceptable time increments, status messages, location of market (LMP, node, electrical bus, etc.) for the load for marketing, aggregated, settled, and combinations thereof. The updating is for purposes of PSV, PTB, or ability to know the health and/or status of any active grid elements within any zone within the electric power grid. Thus, the systems and methods of the present invention provide for automatic updating of any and all active grid elements by remote server or dedicated device(s), through Coordinator(s) and/or directly to active grid elements that affect any aspect of updating of active grid elements relating to software, firmware, rules, metrology, ASICs, chipsets, machine code, operating systems, and combinations thereof. Furthermore, active grid elements may be updated for improved or increased accuracy of active grid elements to qualify PSV and PTB associated therewith. Also, the present invention provides for active grid elements with smart cross-communication that provide for at least one active grid element to transmit commands to at least one other active grid element within the network associated with the electric power grid.

Figure 35:
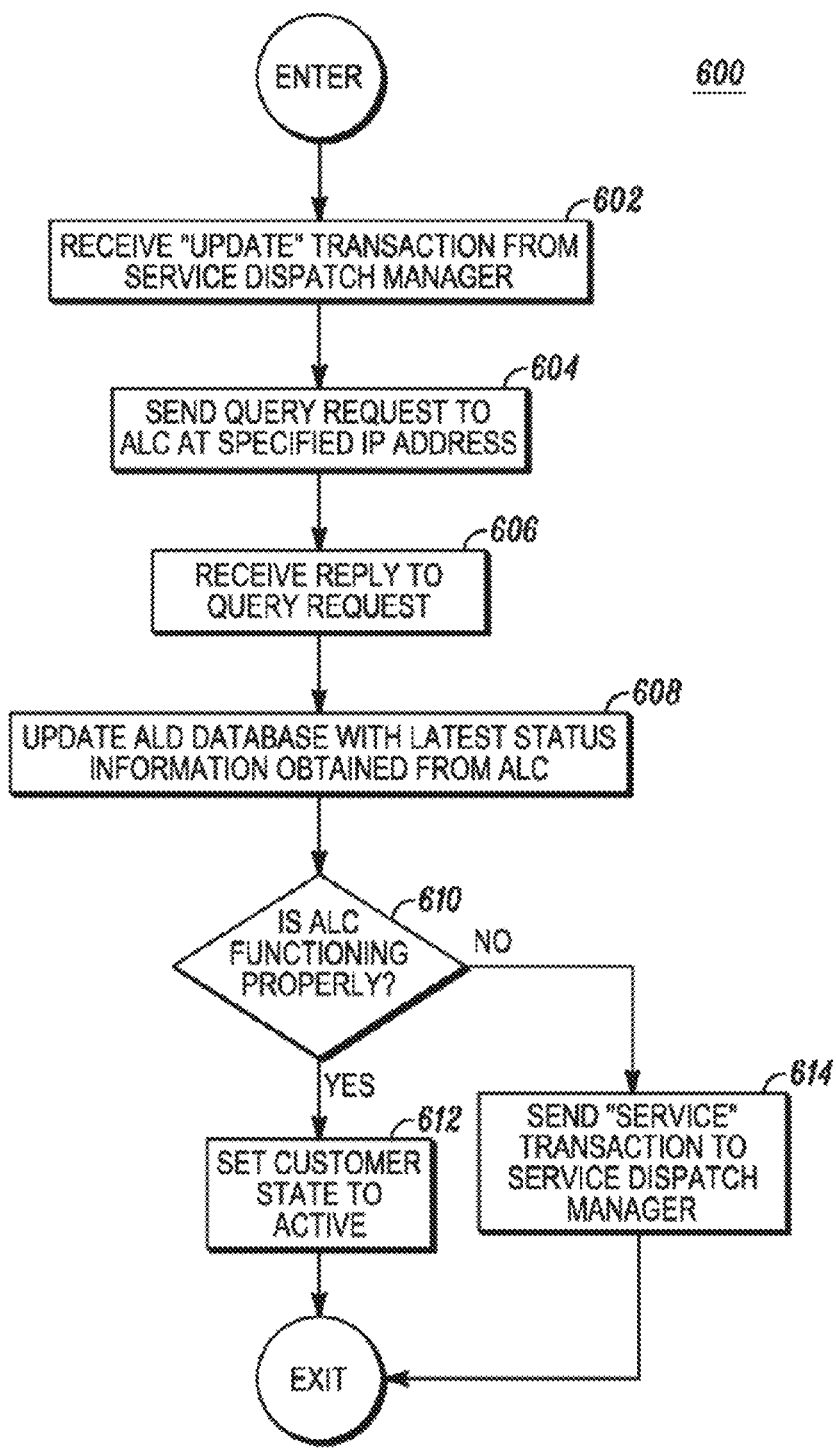
FIG. 35 is a flow diagram illustrating steps in a method for updating information relating to ALCs and/or ALD database.

FIG. 35 illustrates an exemplary operational flow diagram 600 providing steps executed by the server (e.g., as part of the Coordinator) to confirm automatically the registration of any grid element to the power management system 10 associated with the electric power grid, in accordance with one embodiment of the present invention. The steps are preferably implemented as a set of computer instructions (software) stored in a memory (not shown) of the server and/or Coordinator and executed by one or more processors (not shown) of the server. In accordance with the logic flow, the Coordinator 108 receives (602) an automated messaging from any grid element that is energized, but not already registered with the system; the messaging includes attributes of the grid element as set forth hereinabove. The Coordinator responds with messaging to confirm the registration of the grid element, which then transforms it into an active grid element, thereby providing its functionality to be associated with the electric power grid. An "Update" or similar transaction message or command from the Coordinator that uses the IP address specified in the "Update" message to send (604) out a "Query Request" or similar message or command to the active grid element. The "Query Request" message includes a list of active grid elements the server 100 expects to be managed automatically. Updating software, firmware, or any code embodiment via communication network via IP messages after the active grid elements are registered via the Coordinator or other operations processor/database. The Coordinator also receives (606) a query reply containing information about the active grid elements (e.g., current IP network, operational state (e.g., functioning or not), setting of all the counters for measuring current usage (e.g., all are set to zero at initial set up time), status of active grid elements or other devices being controlled (e.g., either switched to the "on" state or "off" state)). The Coordinator updates (608) the database with the latest status information obtained from the active grid element. If the Coordinator detects (610), from the query reply, or as indicated in the messaging from the active grid element that the active grid element is functioning properly, it sets (612) the active grid element state to "registered" and/or "active" to allow participation in Coordinator server activities within the electric power grid and power management system associated therewith. However, if the Coordinator detects (610) that the active grid element is not functioning properly, it sends (614) a "Service" or similar transaction message or command to a service dispatch manager 126.

Figure 36:
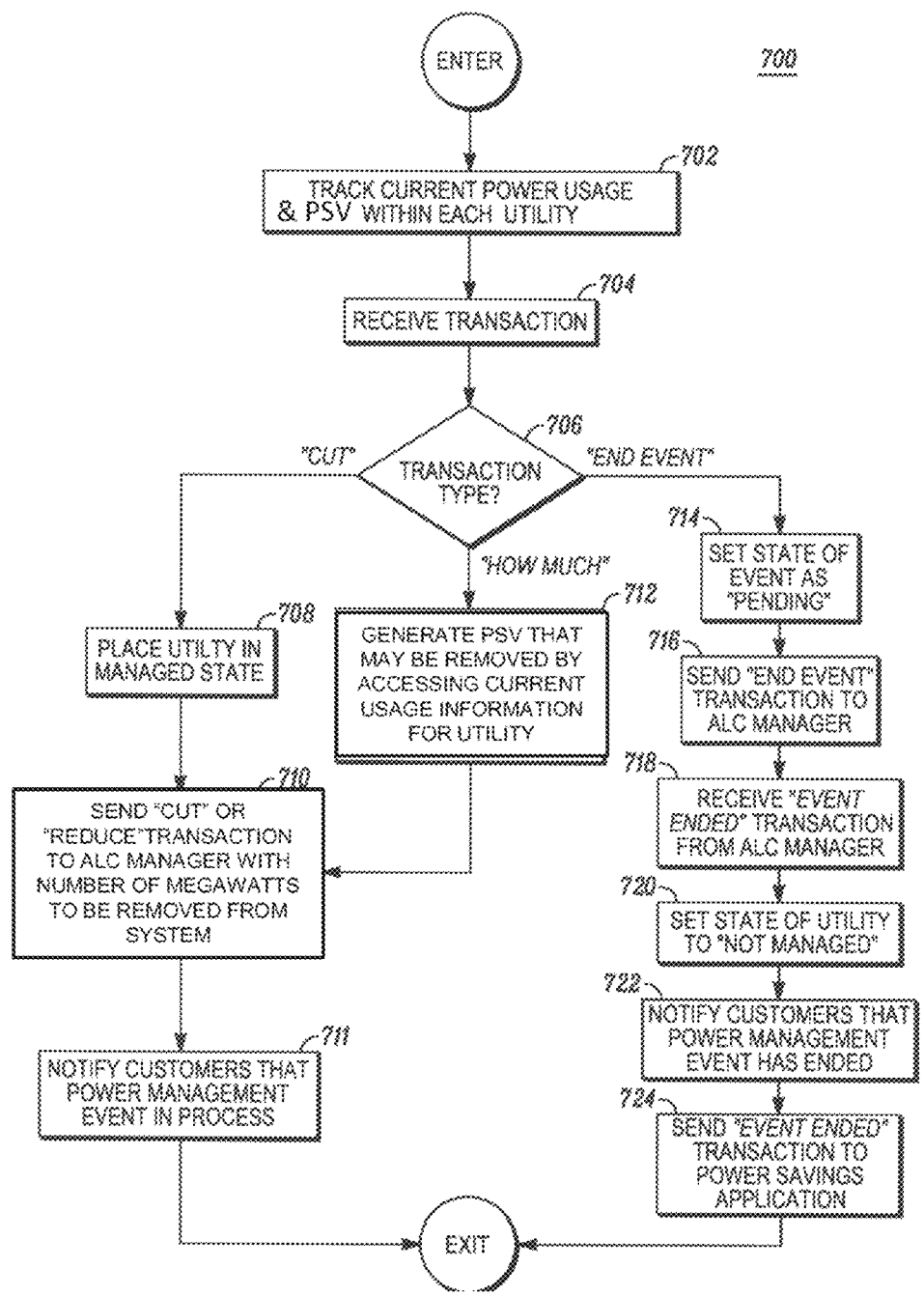
FIG. 36 illustrates a flow diagram of methods according to the present invention for tracking power usage and power supply value (PSV) generation.

Referring now to FIG. 36, an exemplary operational flow diagram 700 is illustrated providing steps executed by the Coordinator and/or server 100 (e.g., as part of the master event manager 106) to manage activities and/or events in the exemplary power load management system 10 and communication about them with registered and active grid elements, in accordance with one embodiment of the present invention. The steps are preferably implemented as a set of computer instructions (software) stored in a memory (not shown) of the server and executed by one or more processors (not shown) of the server and/or Coordinator. Pursuant to the logic flow, the Coordinator tracks (702) current power usage and/or PSV within each utility and/or active grid element associated with the Coordinator and/or server.

Additionally, active grid element profiles for power consumption are included in the present invention. The embodiments described utilize concepts disclosed in published patent application US 2009/0062970, entitled "System and Method for Active Power Load Management" which is incorporated by reference in its entirety herein. The following paragraphs describe the Active Management Load System (ALMS), which includes at least one Active Load Director (ALD), and at least one Active Load Client (ALC) in sufficient detail to assist the reader in the understanding of the embodiments described herein. More detailed description of the ALMS, ALD, and ALC can be found in US 2009/0062970, which is incorporated herein by reference in its entirety.

By way of example, based upon the reduction in consumed power, the systems and methods of the present invention provide for generating at the control center a power supply value (PSV) corresponding to the reduction in consumed power by the active grid elements. Importantly, the PSV is an actual value that includes measurement and verification of the reduction in consumed power; such measurement and verification methods may be determined by the appropriate governing body or authority for the electric power grid(s). Power Supply Value (PSV) is calculated at the meter or submeter or at building control system or at any active grid element that measures power within the standard as supplied by the regulatory body(ies) that govern the regulation of the grid. PSV variations may depend on operating tolerances, operating standard for accuracy of the measurement. The PSV enables transformation of curtailment or reduction in power at the active grid element level by any system that sends or receives an IP message to be related to or equated to supply as presented to the governing entity that accepts these values and award supply equivalence, for example of a power generating entity or an entity allowed to control active grid elements such as power consuming devices as permitted by the governing body of the electric power grid, e.g., FERC, NERC, etc.

PSV associated with active grid elements may be provided in units of electrical power flow, monetary equivalent, and combinations thereof. Thus, the PSV provides an actual value that is confirmed by measurement and/or verification, thereby providing for a curtailment value as a requirement for providing supply to the power grid, wherein the supply to the power electric power grid is provided for grid stability, voltage stability, reliability, and combinations thereof, and is further provided as responsive to an energy management system or equivalent for providing grid stability, reliability, frequency as determined by governing authority for the electric power grid and/or grid operator(s).

Energy consumption patterns associated with active grid elements are subject to analysis that may be used for a variety of different types of activities. For example, based on the energy consumption patterns created from this data, the Coordinator will derive performance curves and/or data matrices for each service point to which the active grid elements are attached and determine the amount of energy reduction that can be realized from each active grid element and its functionality within the electric power grid. The Coordinator(s) create a list of service points associated with the active grid elements through which energy consumption can be reduced via demand side management, interruptible load, or spinning/regulation reserves. This information can be manipulated by the Coordinator and/or ALD processes to create a prioritized, rotational order of control, called "intelligent load rotation" which is described in detail below. This rotational shifting of the burden of the interruptible load has the practical effect of reducing and flattening the utility load curve while allowing the serving utility to effectively group its customers within the ALD or its own databases by energy efficiency.

Generally, the embodiments described encompass a closed loop system and method for creating a profile, calculating and deriving patterns of energy usage and supply, and making use of those patterns when implemented through the machinery of a system comprised of active grid elements combined with the physical communications link and when these inputs are manipulated through a computer, processor, memory, routers and other necessary machines as those who are skilled in the art would expect to be utilized.

The present invention also considers the concept of "drift" as applied to electric power grids and active grid elements associated therewith. The data gathered for the active grid element profile is used to empirically derive the decay rate or drift, temperature slope, or a dynamic equation ($f\{x\}$) whereby the service point (or device) will have a uniquely derived "fingerprint" or energy usage pattern for individual and/or aggregated active grid element(s).

The embodiments disclosed also make use of the "intelligent load rotation" concept. Intelligent load rotation uses machine intelligence to ensure that the same active grid elements are not always selected for control events, but distributes control events over a service area in some equitable way and/or least cost analysis-applied manner, or other analytical approach for optimizing the electric power grid resources and functions of the associated active grid elements registered for automated intercommunication therewith.

In another embodiment, energy consumption patterns in active grid elements profiles are used to identify active grid elements that are the best targets for excess power sharing. This would occur when renewable energy such as solar or wind is added to the grid, resulting in power that cannot be compensated for by the grid. This could occur, for example, on very windy days. When this happens, utilities or market participant, grid operator, EMS, or equivalent are faced with the problem of what to do with the excess energy. Instead of cutting power to service points in order to affect power savings, a utility, market participant, grid operator, EMS, or equivalent could add energy to service points and through active grid elements associated with those services points in order to effect power dissipation. The service points and/or active grid elements selected by the Coordinator may be different (or even the inverse) of those selected for power savings. The devices at these service points would be turned on if they were off or set points for climate-controlled devices would be adjusted to heat or cool more than normal. Spread out over many control points, this can provide the energy dissipation needed.

In a further embodiment, energy consumption patterns within active grid elements profiles could be used to identify opportunities for up selling, down selling, or cross selling. These opportunities may be determined by the power utility or by its partners. Data from active grid elements profiles may be used to provide insights on inefficient devices, defective devices, or devices that require updating to meet current standards. Active grid elements profiles data, individually or collectively (or selectively) in the aggregate, may also be used to identify related power grid participation opportunities.

According to the present invention, PSV for any of the active grid elements may be generated by methods including information relating to baselining historical load, estimating based upon curves, real-time or near-real-time value, and combinations thereof. Advantageously, the present invention provides active load and/or supply management metrics for each of the active grid elements, including PSV, much better than merely statistical estimate for a command as with prior art; PSV also further provides for steps of measurement and settlement. FERC requires that the settlement credits provide at point where it occurs; so then settlement information follows the transaction; most preferably, according to the present invention, settlement occurs in real time or near real time, as in financial transactions or other commodity transactions, such as for natural gas supply. Also, preferably, there is a defined interval that is accepted or acceptable by the governing entity for the electric power grid, wherein each transaction is recorded as it occurs. Furthermore, the present invention provides for IP real-time communications that provide for settlement of the curtailment by load-consuming devices at or approximate to the time of the transaction, i.e., the curtailment. Also, preferably, there is data that provides supporting evidence attached with the IP real-time communication of the acceptance of the power event, and then automatically recorded in a settlement database and associated with each active grid elements registered within the system through the Coordinator(s). Also, some information related to this transaction and its settlement is transmitted to the energy/curtailment purchaser, and then also the seller is paid according to the PSV and/or PTB related to the curtailment event.

Power Trading Blocks (PTBs) are dependent upon the grid operator or ISO; there must be enough curtailment or supply for the grid operator to accept, settle, and monetize, including individual and/or collective or selectively aggregated data for active grid elements registered with the system. At this time, the PTB is 100 kWatts in most electric power grids, such as a conventional utility or independent system operator or grid or microgrid operator. Generally, the power available as operating reserves is traded in larger amounts, PTB size, to be significant enough to beneficially stabilize the grid and its operating reserves. At this time, the regional trading organization or geographic-specific grid and corresponding regulations therefor, determine the PTB size, which typically requires the aggregation of load from a multiplicity of consumers, residential or commercial, to reach a minimum PTB size or PTB unit. The PTB unit, combined with the PSV, and the real-time secure communications used with ALC/ALD function to lower the size of the minimum PTB required to form a PTB unit for grid reception and settlement purposes. The commercial impact determines the minimum PTB size, which corresponds to a PTB unit, due to cost and timing of communication of the information related to the curtailment event(s) and response by the device(s), and how aggregation of load curtailment by the multiplicity of devices is managed to ensure maximum compensation to the customer(s) associated with the device(s) for the curtailment event, with minimum negative physical impact to those consumers and/or devices from the curtailment event.

Active grid elements profiles may also be dynamic. An example of this would be the ability for active grid elements to utilize real time communications from an electric utility grid, market, market participant, utility, REP, CSP or any other entity authorized on behalf of the owner to act on their behalf to control load consuming devices owned by the consumer and connected to the electric utility grid. The active grid elements receive this information automatically through a plurality of methods utilizing IP-based communications methods and web based devices such as smart phones, computers, text messages, paging messages, or even voice response units or live customer service agents. Under this real time scenario, active grid elements could dynamically "Opt In" to a pre-determined profile or "Opt Out" or more importantly change the profile dynamically to take advantage of real time market pricing of electricity being sold by the utility, market participant, REP or any entity authorized to buy, sell and trade electric commodity or demand response products on behalf of the owner.

The present invention has adequately described in great detail how the active grid elements are associated with the Coordinator the employment of computer assisted apparatus that include, but are not limited to processors, ASICS, memory, analytics, communications interfaces and methodologies, databases, both relational, high performance "historian" databases, persistence and cache layers, metadata layers, analytics engines, monitoring and reporting active grid elements, Internet Protocal, Ethernet, carrier grade wired and wireless networks, proprietary networks, TDM wireless and wired networks, analog and digital telemetry subsystems, Coordinators, Active Supply Directors and a plurality of the above both centralized, networked together and distributed. While the previous descriptions have been detailed in the embodiment of FERC 745 Load acting as supply, one skilled in the art will correlate those functions previously described as they apply to the supply side for FERC 750 and 755, including settlement.

These highly decentralized networks must be capable of operating directly under the control of an EMS, through a Coordinator, and for active grid elements autonomously if they are disconnected from the macro electric grid or have voluntarily opted to disconnect themselves from the electric grid temporarily or permanently. The present invention provides through software, hardware and advanced communications methodologies the capabilities of many small DER resources associated with the active grid elements to perform and deliver their energy resource directly to the electric grid interconnected as they were a macro resource with aggregated PSV values that build up to minimum PTB blocks that can be both presented, operated and monetized by a Market Participant, REP, Utility, IPP, a Company acting as their own energy agent or a plurality of all of the above.

The present invention also provides for intermittent resources previously described the ability to be balanced, regulated and offered to the grid as reliably as DER resources. Balancing DER resources would suggest that a plurality of these resources may be collocated at the same service point/attachment or be themselves disaggregated from each other physically, but interconnected via the present invention and its attributes. An embodiment of this type of DER would be a commercial building that has installed solar film, panels or combinations thereof, a wind or water turbine, and a back-up generator at the same installation. These different resources with their different DER attributes must all be combined through an ASC that would have the capability of providing for primary frequency control per supply source, voltage control, meet the appropriate attachment regulations that may be different based upon the location of the DER supply on the distribution or transmission system and operating those systems either through a coordinator and an EMS or autonomously from both while still offering its supply to the interconnected electric grid. The present invention functions to communicate and control the DER resources based upon availability of the resource, what the grid's energy needs are at the moment of the energy being presented by or through a Market Participant or if permitted by the governing entity an individual consumer utilizing the present invention or the economic incentives that are profile based, sold in advance through an approved trading organization approved by the governing entity, or supplied in real time at the attachment point on the grid and supplied through the present invention as directed by an Energy Management System or providing those EMS services due to an EMS not being available at the time the resource is delivered and whereby the apparatus of the present invention is providing energy and grid stabilizing resources from the available sources, balanced upon what each resource can provide reliably to the interconnection of the electric grid.

Other embodiments of DER that can be used with the present invention would be communication facilities such as wireless communications towers owned by carriers, tower leasing companies such as American Tower, Crown Castle Inc. SBA Inc etc. whereby standby generation, batteries, solar, wind or other forms of backup generation including fuel cells are present to insure reliability. Wireline facilities such as data centers, central offices, television, cable and other communications critical infrastructure are all examples of micro and macrogrid interconnections whereby latent standby generation and DER resources may already be present and whereby the use of the described invention would be used to interconnect these DER resources to the electric power grid.

It should be noted that many terms and acronyms are used in this description that are well-defined in the telecommunications and/or computer networking industries and are well understood by persons skilled in these arts, and in electric power management arts. Complete descriptions of these terms and acronyms, whether defining a telecommunications standard or protocol, can be found in readily available telecommunications standards and literature and are not described in any detail herein.

It will be appreciated that embodiments or components of the systems described herein may be comprised of one or more conventional processors and unique stored program instructions that control the one or more processors to implement, in conjunction with certain non-processor circuits, some, most, or all of the functions for managing power load and/or supply distribution, and tracking and controlling individual subscriber power consumption and savings, and power supply in one or more power load and/or supply management systems. The non-processor circuits may include, but are not limited to, radio receivers, radio transmitters, antennas, modems, signal drivers, clock circuits, power source circuits, relays, meters, sub-meters, smart breakers, current sensors, and customer input devices. As such, these functions may be interpreted as steps of a method to distribute information and control signals between devices in a power load and/or supply management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Additionally, measurement, verification, settlement for the PSV for those market participants involved in the power management of the system is further included in the application of the present invention. Also, the systems, methods, and apparatus of the present invention may further include a database, a processor, software operable thereon, and interfaces to outside market participants that provide for capacity reservation of the distribution and transmission systems.

In embodiments of the present invention, supply and/or load curtailment as supply active grid elements may further include additional components to facilitate their automatic registration with the systems, methods, and apparatus of the present invention. Furthermore, messaging for registration between these active grid elements and the Coordinator and/or ASD may include an initial messaging for the first registration communication that provides information necessary for activation, operation, and integration with the electric power grid, including all future messaging, prioritization, profiles, updates, upgrades, modifications, settlement, security, and combinations thereof. The Coordinator, following the initial messaging from the active grid elements, may optionally provide a "energy cookie" that functions to facilitate the activities of the Coordinator for management, control, messaging, and matching to maintain and balance the EMS requirements with those of the electric power grid and all of the registered grid elements that are transformed into active grid elements thereon.

In the foregoing specification, the present invention has been described with reference to specific embodiments. However, one of ordinary skill in the art will appreciate that various modifications and changes may be made without departing from the spirit and scope of the present invention as set forth in the appended claims. For example, the present invention is applicable for managing the distribution of power from utility companies to subscribing customers using any number of IP-based or other communication methods. Additionally, the functions of specific modules within the server and/or active grid elements may be performed by one or more equivalent means. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any active grid elements that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An apparatus for electric power grid communication comprising:
    an active grid element having a function or a participation within an electric power grid, the active grid element constructed and configured within a housing for electrical connection and IP-based network communication with a server associated with the electric power grid;
    wherein the active grid element is automatically and/or autonomously updated and is operable to transmit or receive an update message with the server;
    wherein the update message, if received by the active grid element from the server, transforms the function or the participation of the active grid element within the electric power grid by updating at least one attribute of the active grid element;
    wherein the update message, if transmitted to the server, includes information about the at least one updated attribute;
    wherein the at least one attribute of the active grid element is selected from a revenue grade metrology for the active grid element, capacity or demand of the active grid element, security of the active grid element, settlement of the active grid element for its participation in the electric power grid, an active grid element profile, and combinations thereof; and
    wherein the at least one attribute of the active grid element corresponds to the function or the participation of the active grid element.

2. The apparatus of claim 1, wherein the active grid element includes a unique identifier.

3. The apparatus of claim 1, wherein the active grid element transmits a signal to the server for registering with the electric power grid.

4. The apparatus of claim 1, wherein the active grid element profile includes information about the consumption or supply of electric power by the active grid element.

5. The apparatus of claim 1, wherein the active grid element is a device having the function or the participation for consuming electric power from an electric power grid, supplying power to an electric power grid, and/or measuring power relating to an electric power grid.

6. The apparatus of claim 1, wherein the at least one attribute further includes at least one attribute corresponding to the active grid element and improving its function or participation within the electric power grid that is selected from a group consisting of: a status, table information, pricing, metrology, telemetry, changes in time, status messages, location of market, attachment point information, geodetic information, status, capacity, grid element identifier, power consumption, power flows, grid element information accuracy, software, firmware, upgrades, prioritization, security, settlement, and combinations thereof.

7. An apparatus for electric power grid communication comprising:
    an active grid element having a function or a participation within an electric power grid, the active grid element constructed and configured within a housing for electrical connection and IP-based network communication with a server associated with the electric power grid;
    wherein the active grid element is automatically and/or autonomously updated and is operable to transmit or receive an update message with the server;
    wherein the update message, if received by the active grid element from the server, transforms the function or the participation of the active grid element within the electric power grid by updating at least one attribute of the active grid element;
    wherein the update message, if transmitted to the server, includes information about the at least one updated attribute;
    wherein the at least one attribute of the active grid element is selected from a revenue grade metrology for the active grid element, security of the active grid element, settlement of the active grid element for its participation in the electric power grid, an active grid element profile, and combinations thereof; and
    wherein the at least one attribute of the active grid element corresponds to the function or the participation of the active grid element.

8. The apparatus of claim 7, wherein the active grid element is a device that consumes electric power from an electric power grid, supplies power to an electric power grid, and/or measures power relating to an electric power grid.

9. The apparatus of claim 7, wherein the active grid elements a control device that operates, programs, and/or updates the other active grid elements.

10. The apparatus of claim 7, wherein the active grid element is selected from a group consisting of a sensor, a power-consuming device, an appliance, a meter, a switch, a controller, a control device, a thermostat, a building control system, a security device, and combinations thereof.

11. The apparatus of claim 7, wherein the active grid elements a unique grid element identifier.

12. The apparatus of claim 7, wherein the update message improves, modifies, enhances, changes, and combinations thereof, characteristics of the active grid element in memory, ASIC, metrology, location, security, status, change-in-state, and combinations thereof, including power supply values (PSV) and/or power trade block (PTB) corresponding to the active grid element.

13. The apparatus of claim 7, wherein the update message improves, modifies, enhances, changes, and combinations thereof, characteristics of the active grid element corresponding to activities of the active grid element, including grid stability enhancement, load curtailment, real-time energy management, supply availability, transmission capacity information, revenue grade metrology tables, device assignment, and combinations thereof.

14. The apparatus of claim 7, wherein the update message further includes at least one of: status of device(s), supply source(s), and/or demand; location of attachment; line losses; distribution and transmission capacity information; grid stability information; and combinations thereof.

15. The apparatus of claim 7, wherein the update message further includes information about power supply value (PSV), power trade block (PTB), and/or kilo-watt packet (KWP) units associated with each of the active grid element.

16. The apparatus of claim 7, wherein the active grid element further includes a security interface operable to receive security messages.

17. The apparatus of claim 7, wherein the update message further includes a delivery priority, the delivery priority including at least one of priority access flags, virtual private networks, independent identifying addresses (MAC, IP, Electronic Serial Numbers), manufacturers specific identifying codes, or combinations thereof, wherein the delivery priority complies with standards as determined by a governing entity that regulates grid operations for utilities, market participants or grid operators.

18. The apparatus of claim 7, wherein the update message further includes at least one of: a grid element geodetic reference, a grid element identifier, a grid element authentication, a grid element type, a grid element function, a grid element capacity, a grid element profile, a grid element attachment point reference, a grid element power supply value (PSV), a grid element power trade block (PTB) value, a grid element balancing authority association, a grid element owner identifier, a grid element compatibility identifier, and combinations thereof.

19. The apparatus of claim 7, wherein the active grid element transmits a signal to the server for registering with the electric power grid.

20. The apparatus of claim 7, wherein the active grid element profile includes information about the consumption or supply of electric power by the active grid element.

21. An apparatus for electric power grid communication comprising:
an active grid element having a function or a participation within an electric power grid, the active grid element constructed and configured within a housing for electrical connection and IP-based network communication with a server associated with the electric power grid;
wherein the active grid element is automatically and/or autonomously updated and is operable to transmit or receive an update message with the server;
wherein the update message, if received by the active grid element from the server, transforms the function or the participation of the active grid element within the electric power grid by updating at least one attribute of the active grid element;
wherein the update message, if transmitted to the server, includes information about the at least one updated attribute;
wherein the at least one attribute includes a profile that corresponds to performance of the at least one grid element; and
wherein the profile provides programming for determining a role and for providing automated participation of the active grid element in the electric power grid.

22. The apparatus of claim 21, wherein at least one attribute of the active grid element further includes a second attribute selected from a revenue grade metrology for the active grid element, a calibration of the active grid element, capacity or demand of the active grid element, security of the active grid element, settlement of the active grid element for its participation in the electric power grid, an active grid element profile, and combinations thereof; the second attribute corresponding to the function or the participation of the active grid element.

23. The apparatus of claim 21, wherein the update message further includes at least one of: a grid element geodetic reference, a grid element identifier, a grid element authentication, a grid element type, a grid element function, a grid element capacity, a grid element profile, a grid element attachment point reference, a grid element power supply value (PSV), a grid element power trade block (PTB) value, a grid element balancing authority association, a grid element owner identifier, a grid element compatibility identifier, and combinations thereof.

24. The apparatus of claim 21, wherein the active grid element further includes a security interface operable to receive security messages.

25. The apparatus of claim 21, wherein the update message further includes information about power supply value (PSV), power trade block (PTB), and/or kilo-watt packet (KWP) units associated with the active grid element.

26. An apparatus for electric power grid communication comprising:
an grid element having a function or a participation within an electric power grid, the grid element constructed and configured within a housing for electrical connection and IP-based network communication with a server associated with the electric power grid;
wherein the grid element is automatically and/or autonomously updated and is operable to transmit or receive an update message with the server;
wherein the update message, if received by the grid element from the server, transforms the function or the participation of the grid element within the electric power grid by updating at least one attribute of the grid element;
wherein the update message, if transmitted to the server, includes information about the at least one updated attribute;
wherein the at least one attribute of the grid element is selected from a revenue grade metrology for the grid element, capacity or demand of the grid element, security of the grid element, settlement of the grid element for its participation in the electric power grid, an grid element profile, and combinations thereof; and
wherein the at least one attribute of the grid element corresponds to the function or the participation of the grid element.

27. The apparatus of claim 26, wherein the update message further includes at least one of: a grid element geodetic reference, a grid element identifier, a grid element authentication, a grid element type, a grid element function, a grid element capacity, a grid element profile, a grid element attachment point reference, a grid element power supply value (PSV), a grid element power trade block (PTB) value, a grid element balancing authority association, a grid element owner identifier, a grid element compatibility identifier, and combinations thereof.

28. The apparatus of claim 26, wherein the grid element further includes a security interface operable to receive security messages.

29. The apparatus of claim 26, wherein the update message further includes information about power supply value (PSV), power trade block (PTB), and/or kilo-watt packet (KWP) units associated with the grid element.

30. The apparatus of claim 26, wherein the grid element includes a unique identifier.

* * * * *